US010676375B2

(12) United States Patent
Lee et al.

(10) Patent No.: US 10,676,375 B2
(45) Date of Patent: Jun. 9, 2020

(54) WATER PURIFICATION SYSTEM USING ULTRAVIOLET LEDS

(71) Applicant: Seoul Viosys Co., Ltd., Ansan-si (KR)

(72) Inventors: Seong Min Lee, Ansan-si (KR); Chung Hoon Lee, Ansan-si (KR); Daewoong Suh, Ansan-si (KR); Young Hwan Son, Ansan-si (KR)

(73) Assignee: SEOUL VIOSYS CO., LTD., Ansan-si (KR)

( * ) Notice: Subject to any disclaimer, the term of this patent is extended or adjusted under 35 U.S.C. 154(b) by 524 days.

(21) Appl. No.: 14/386,770

(22) PCT Filed: Mar. 21, 2013

(86) PCT No.: PCT/KR2013/002319
§ 371 (c)(1),
(2) Date: Feb. 9, 2015

(87) PCT Pub. No.: WO2013/141615
PCT Pub. Date: Sep. 26, 2013

(65) Prior Publication Data
US 2015/0158741 A1 Jun. 11, 2015

(30) Foreign Application Priority Data

Mar. 21, 2012 (KR) .......................... 10-2012-0028739
Mar. 21, 2012 (KR) .......................... 10-2012-0028740
(Continued)

(51) Int. Cl.
*C02F 1/32* (2006.01)
*C02F 1/00* (2006.01)

(52) U.S. Cl.
CPC ................ *C02F 1/32* (2013.01); *C02F 1/003* (2013.01); *C02F 1/325* (2013.01);
(Continued)

(58) Field of Classification Search
None
See application file for complete search history.

(56) References Cited

U.S. PATENT DOCUMENTS 4,899,057 A * 2/1990 Koji .......................... A61L 2/08
210/748.06
6,217,834 B1 * 4/2001 Hosein .................... B01J 19/123
210/748.1
(Continued)

FOREIGN PATENT DOCUMENTS

CN 201648093 U 11/2010
JP H03-242286 A 10/1991
(Continued)

OTHER PUBLICATIONS

Kim et al., "Machine Translation of KR20100066115", published 2010, 20 total pages.*

(Continued)

Primary Examiner — Jonathan M Peo
(74) Attorney, Agent, or Firm — Perkins Coie LLP

(57) ABSTRACT

The present invention relates to a portable water purification system by means of UV LEDs. Provided according to the present invention is a portable water purification system by means of UV LEDs comprising: a support member; a plurality of LEDs mounted on the surface of the support member; a solid filter provided with a through-path into which the support member is inserted; and a cover, attached to one end of the solid filter, for sealing the through-path of the solid filter.

23 Claims, 27 Drawing Sheets

(30) Foreign Application Priority Data

| Mar. 21, 2012 | (KR) | 10-2012-0028741 |
|---|---|---|
| Mar. 21, 2012 | (KR) | 10-2012-0028742 |
| Mar. 21, 2012 | (KR) | 10-2012-0028743 |
| Jun. 1, 2012 | (KR) | 10-2012-0059074 |
| Mar. 11, 2013 | (KR) | 10-2013-0025825 |

(52) U.S. Cl.
CPC .. *C02F 2201/003* (2013.01); *C02F 2201/328* (2013.01); *C02F 2201/3222* (2013.01); *C02F 2201/3227* (2013.01); *C02F 2301/026* (2013.01); *C02F 2301/028* (2013.01); *C02F 2303/04* (2013.01); *C02F 2305/10* (2013.01); *C02F 2307/04* (2013.01); *C02F 2307/06* (2013.01)

(56) References Cited

U.S. PATENT DOCUMENTS

| 7,270,748 | B1 * | 9/2007 | Lieggi | C02F 1/325 210/198.1 |
|---|---|---|---|---|
| 7,727,406 | B2 | 6/2010 | Lam | |
| 2002/0113022 | A1 * | 8/2002 | Gadgil | B01D 39/2068 210/748.11 |
| 2003/0179548 | A1 * | 9/2003 | Becker | H05K 1/0204 361/704 |
| 2004/0140435 | A1 * | 7/2004 | Nishioka | C02F 1/325 250/436 |
| 2006/0076506 | A1 | 4/2006 | Duthie, Jr. | |
| 2007/0075006 | A1 * | 4/2007 | Watanabe | B67D 3/0009 210/181 |
| 2009/0084734 | A1 * | 4/2009 | Yencho | C02F 1/325 210/741 |
| 2009/0285727 | A1 * | 11/2009 | Levy | C02F 1/325 422/186.3 |
| 2010/0072506 | A1 * | 3/2010 | Bae | H01L 33/56 257/99 |
| 2010/0242192 | A1 * | 9/2010 | Backman | B01F 7/00208 15/4 |
| 2010/0303679 | A1 * | 12/2010 | Kim | B01D 53/885 422/186.3 |
| 2010/0310433 | A1 * | 12/2010 | Nyberg | C02F 1/001 422/186.3 |
| 2011/0226966 | A1 | 9/2011 | Takahashi et al. | |
| 2012/0138545 | A1 * | 6/2012 | Soler | C02F 1/325 210/748.16 |

FOREIGN PATENT DOCUMENTS

| JP | H04-216904 A | 8/1992 | | |
|---|---|---|---|---|
| JP | H07-214053 | 8/1995 | | |
| JP | H08-294687 | 11/1996 | | |
| JP | 2003-144912 A | 5/2003 | | |
| JP | 2005-329366 A | 12/2005 | | |
| JP | 3790672 B2 | 6/2006 | | |
| JP | 2008-519189 | 6/2008 | | |
| JP | 2008-296103 A | 12/2008 | | |
| JP | 2010-194414 | 9/2010 | | |
| JP | 2010-214241 A | 9/2010 | | |
| JP | 2011-016074 A | 1/2011 | | |
| JP | 2011167586 A | 9/2011 | | |
| KR | 10-1997-0006131 A | 2/1996 | | |
| KR | 10-1998-0049350 | 9/1998 | | |
| KR | 10-2003-0039963 A | 5/2003 | | |
| KR | 10-20050094165 A | 9/2005 | | |
| KR | 10-2008-0039355 A | 5/2008 | | |
| KR | 20090002987 A | 1/2009 | | |
| KR | 10-20090011409 A | 2/2009 | | |
| KR | 10-20090019614 A | 2/2009 | | |
| KR | 10-2009-0046211 A | 5/2009 | | |
| KR | 10-2009-0081658 A | 7/2009 | | |
| KR | 10-20090081660 A | 7/2009 | | |
| KR | 10-0927851 B | 11/2009 | | |
| KR | 10-2010-0066115 A | 6/2010 | | |
| KR | 10-2010-0074139 A | 7/2010 | | |
| KR | 10-2010-0101593 A | 9/2010 | | |
| KR | 10-2010-0111537 A | 10/2010 | | |
| KR | 10-2011-0026740 A | 3/2011 | | |
| WO | WO-9903776 A1 * | 1/1999 | | B67D 3/0009 |
| WO | 2003014030 | 2/2003 | | |
| WO | WO 03014030 A1 * | 2/2003 | | C02F 1/325 |
| WO | 2007078302 A1 | 7/2007 | | |
| WO | WO 2010058607 A1 * | 5/2010 | | A01K 63/04 |

OTHER PUBLICATIONS

European Patent Office, Extended European Search Report, European Patent Application No. 13764202, dated Aug. 31, 2015, 5 pages.
The State Intellectual Property Office of P.R. China, The First Office Action (English translation), Chinese Patent Application No. 201380026697.3, dated Sep. 18, 2015, 19 pages.
Office Action in Korean Patent Application No. 10-2012-0028739, dated Aug. 25, 2017.
Office Action in Korean Patent Application No. 10-2012-0028743, dated Aug. 25, 2017.
Office Action in Korean Patent Application No. 10-2012-0028741, dated Aug. 25, 2017.
Office Action in Japanese Patent Application No. 2015-501579, dated Oct. 24, 2017.
Office Action in Japanese Office Action No. 2015-501579, dated Mar. 23, 2017 (with English translation), 9 pages.
Office Action in Korean Patent Application No. 10-2012-0028743, dated Feb. 26, 2018.
Office Action in Japanese Patent Application No. 2015-501579, dated May 8, 2018.
English translation of Korean Office Action from related Korean Patent Application No. 10-2012-0028742, dated Mar. 28, 2018 (7 pages).
English translation of Japanese Office Action from related Japanese Patent Application No. 2018-009927, dated Dec. 18, 2018 (4 pages).
English translation of Japanese Office Action from corresponding Japanese Patent Application No. 2018-009927 dated Dec. 5, 2019 (2 pages).
English translation of Korean Office Action from corresponding Korean Application No. 10-2013-0025825 dated Aug. 19, 2019 (9 pages).
English translation of Japanese Office Action from corresponding Japanese Application No. 2018-009927 dated Aug. 20, 2019 (4 pages).

* cited by examiner

[Fig. 1]
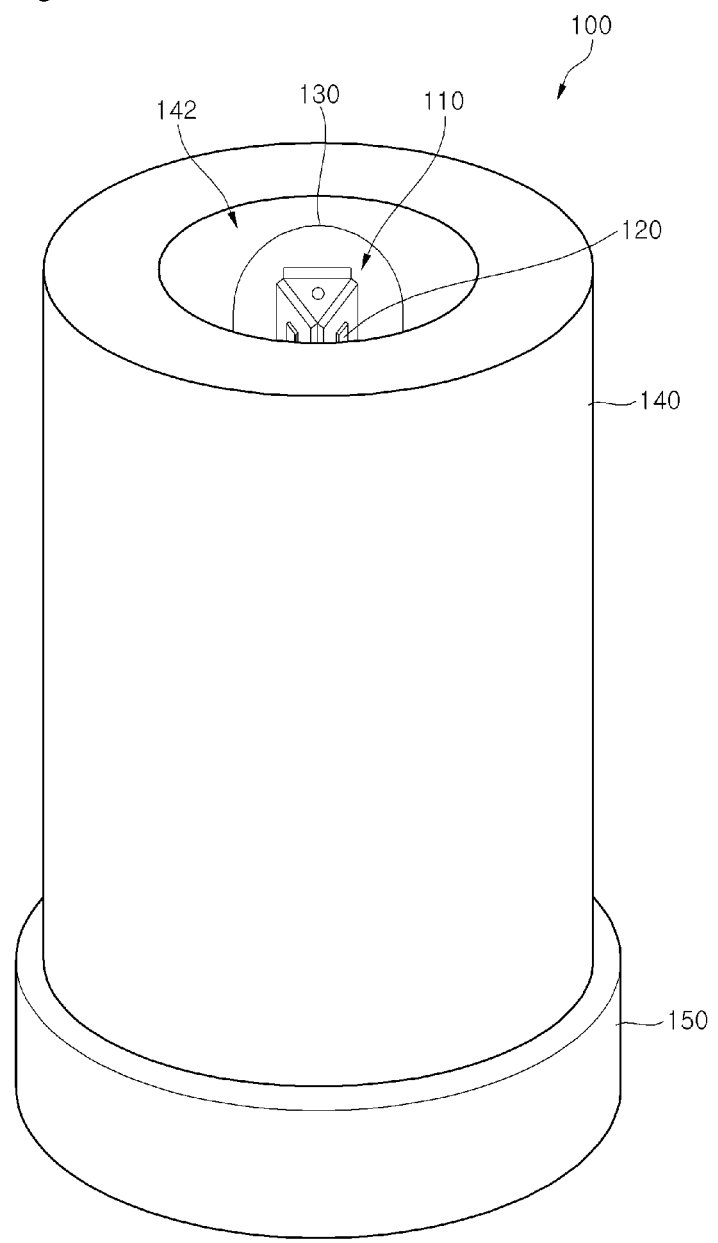

[Fig. 2]
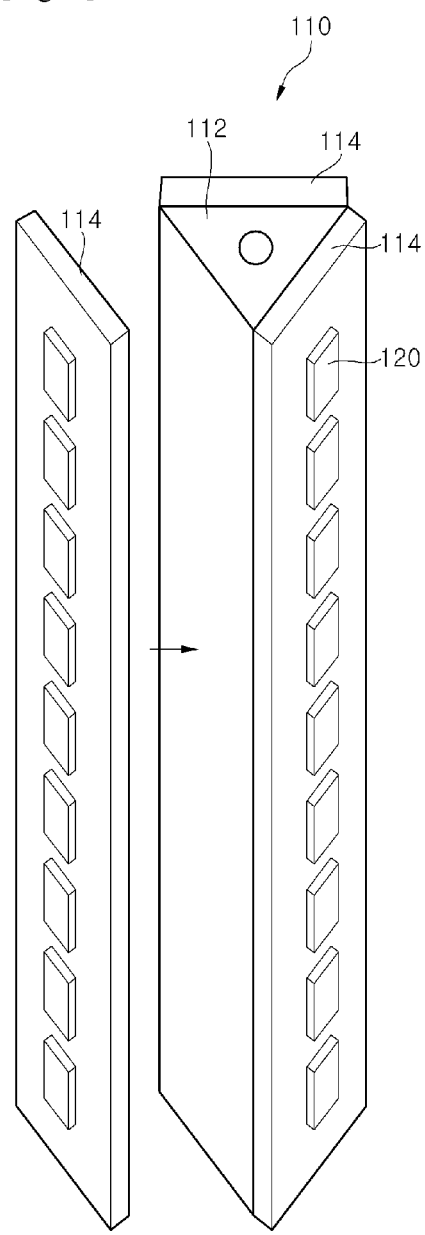

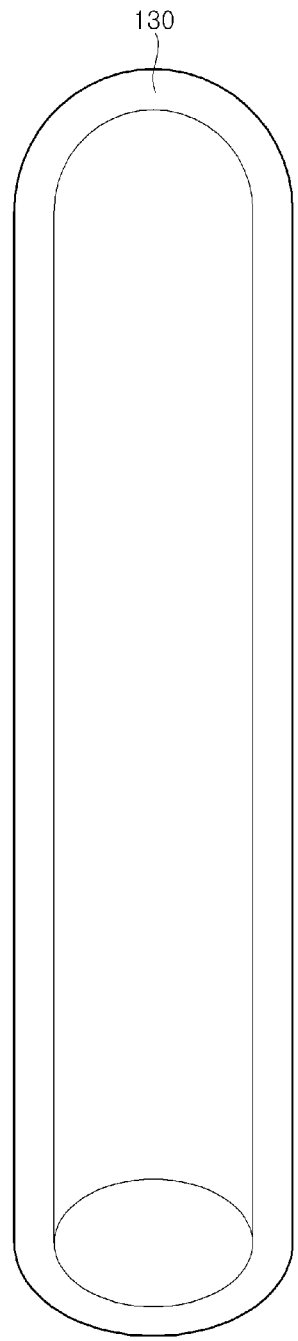
[Fig. 3]

[Fig. 4]
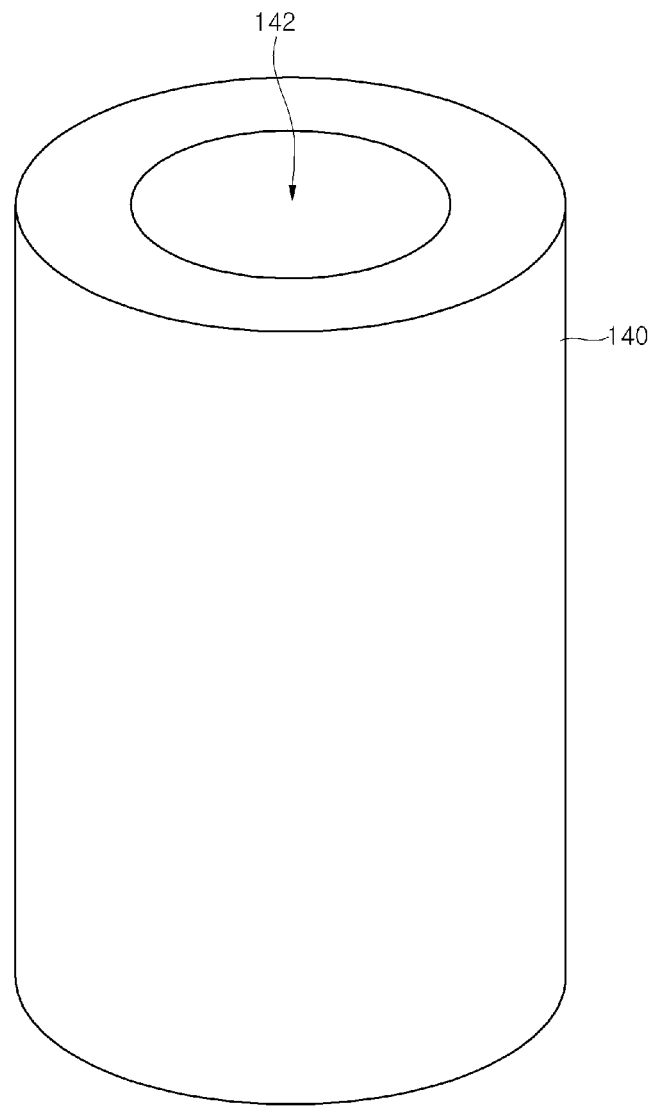
[Fig. 5]
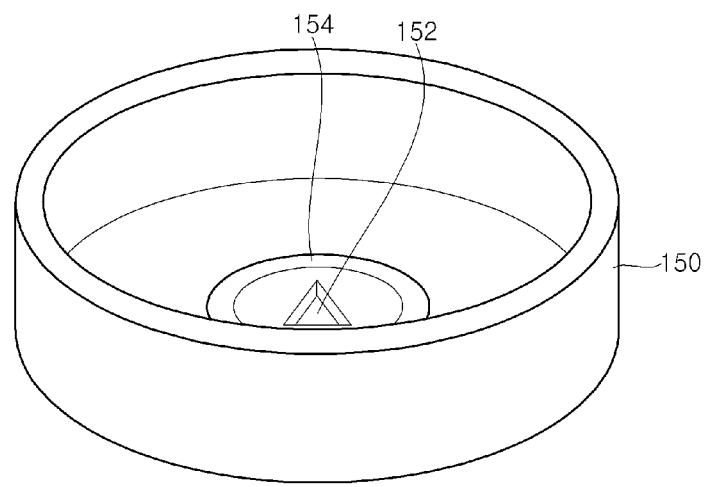

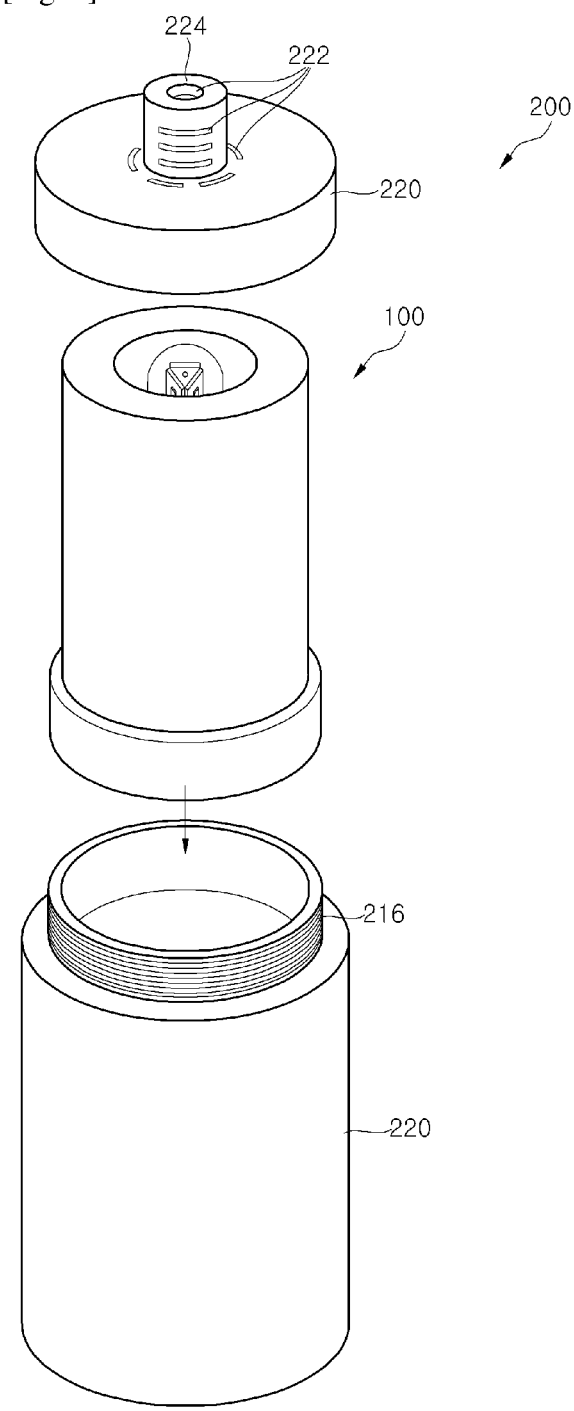

[Fig. 7]
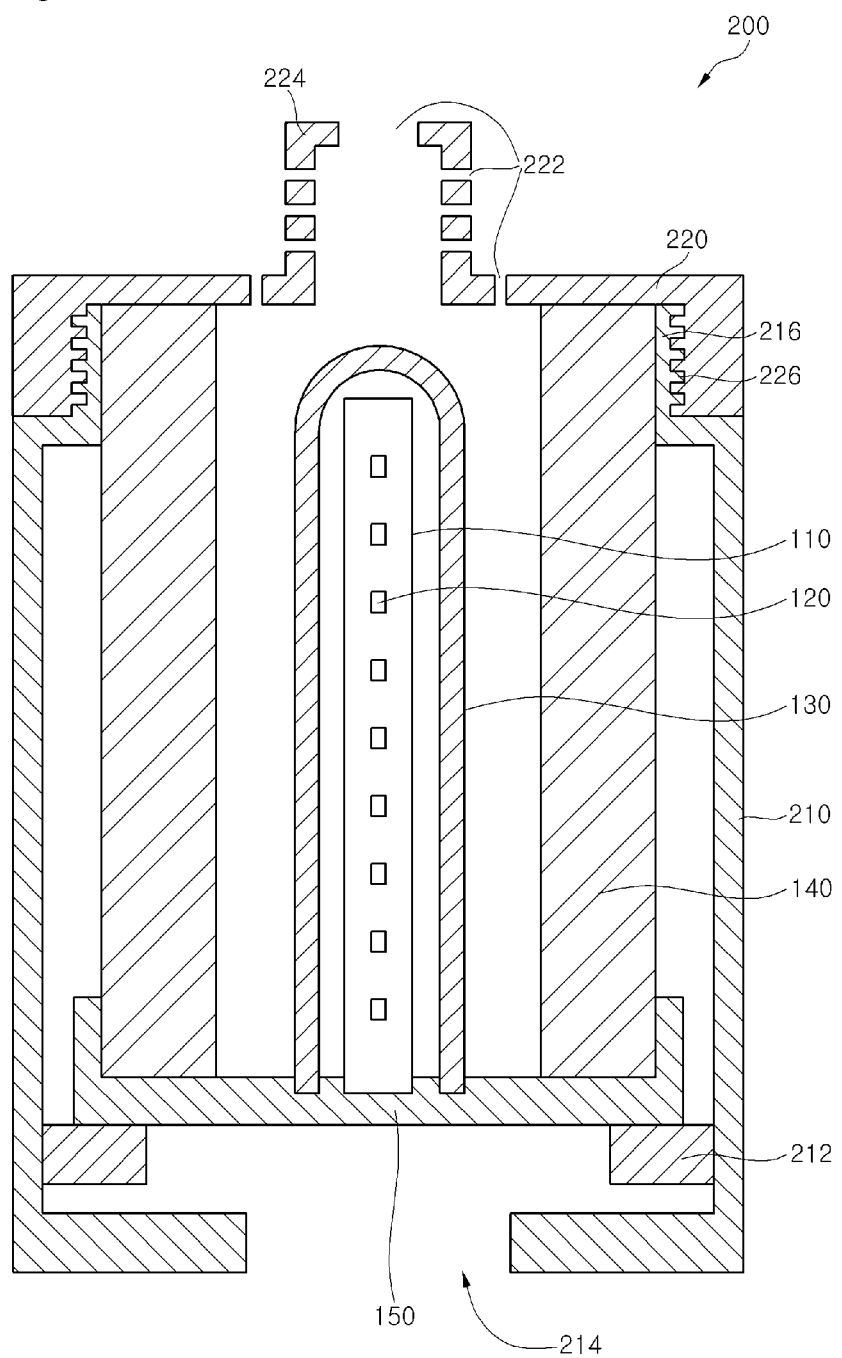

[Fig. 8]
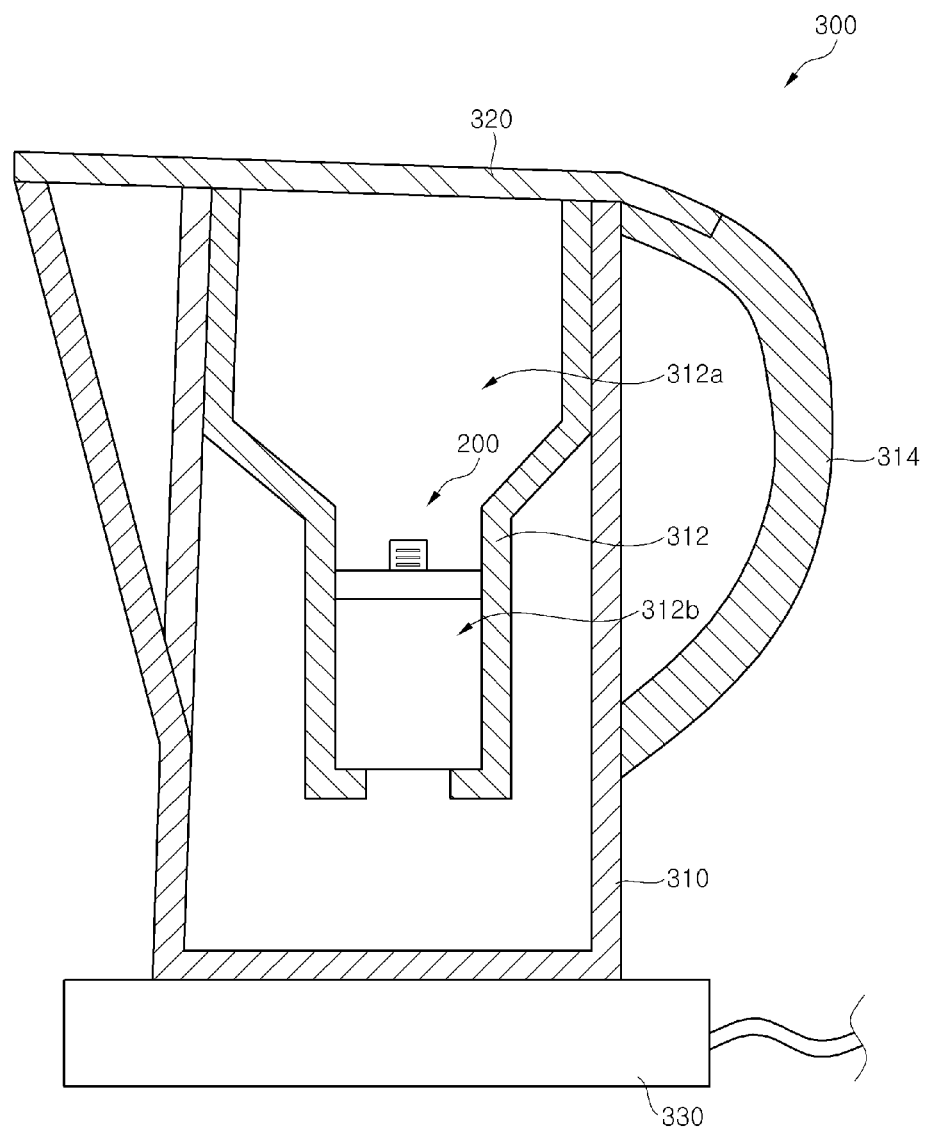

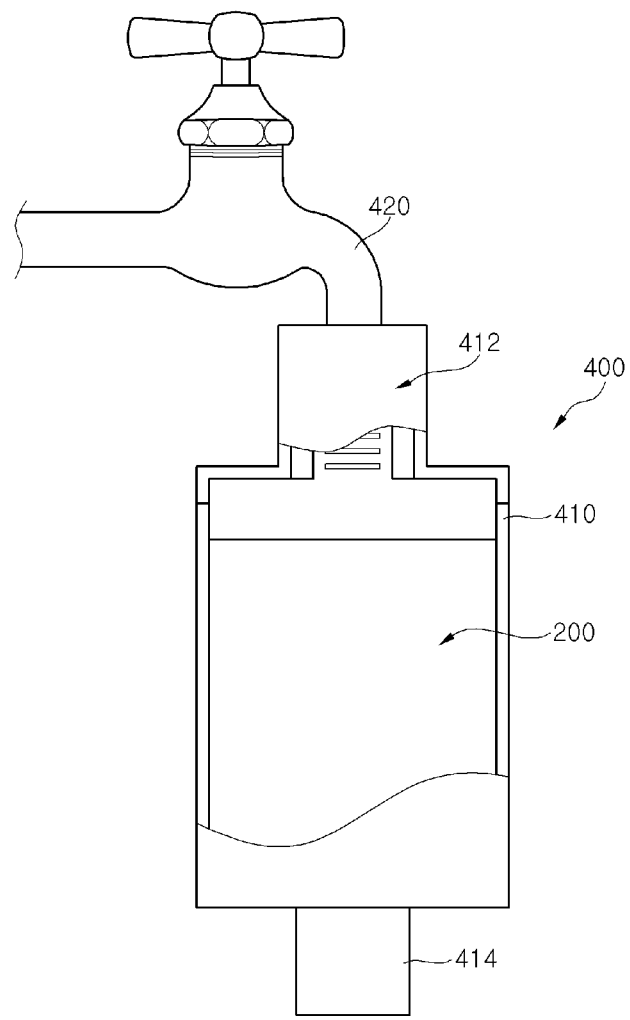
[Fig. 9]

[Fig. 10]
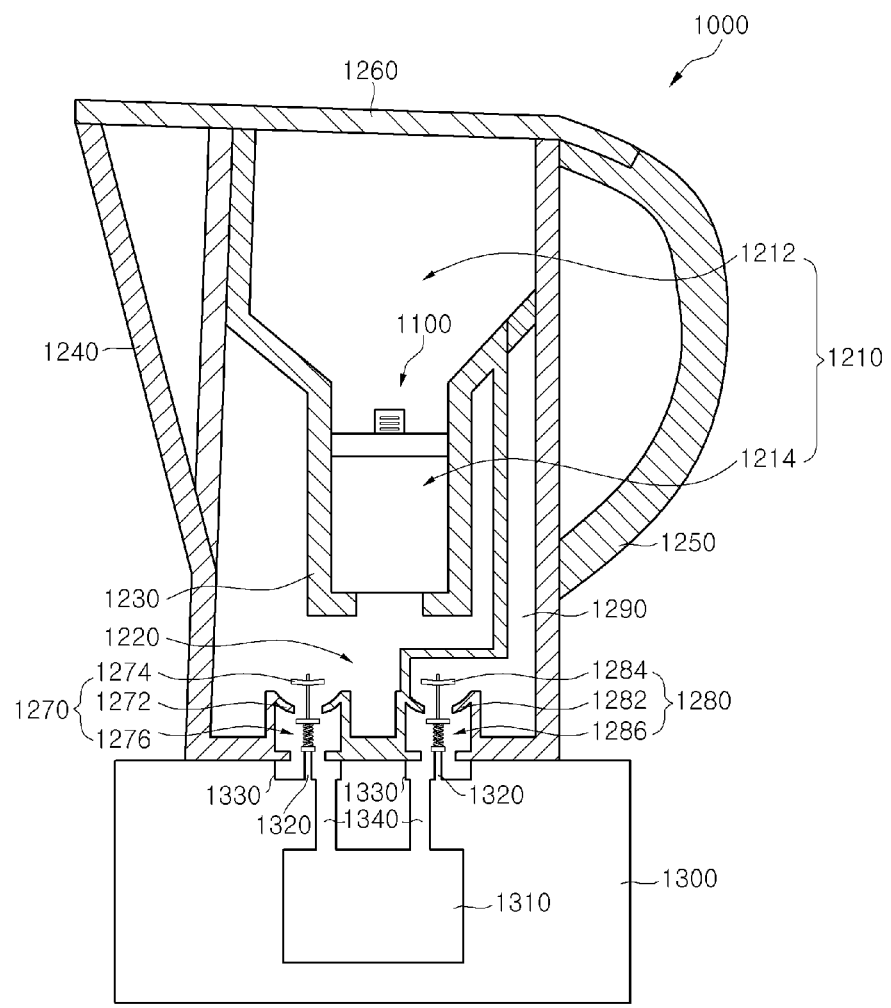

[Fig. 11]
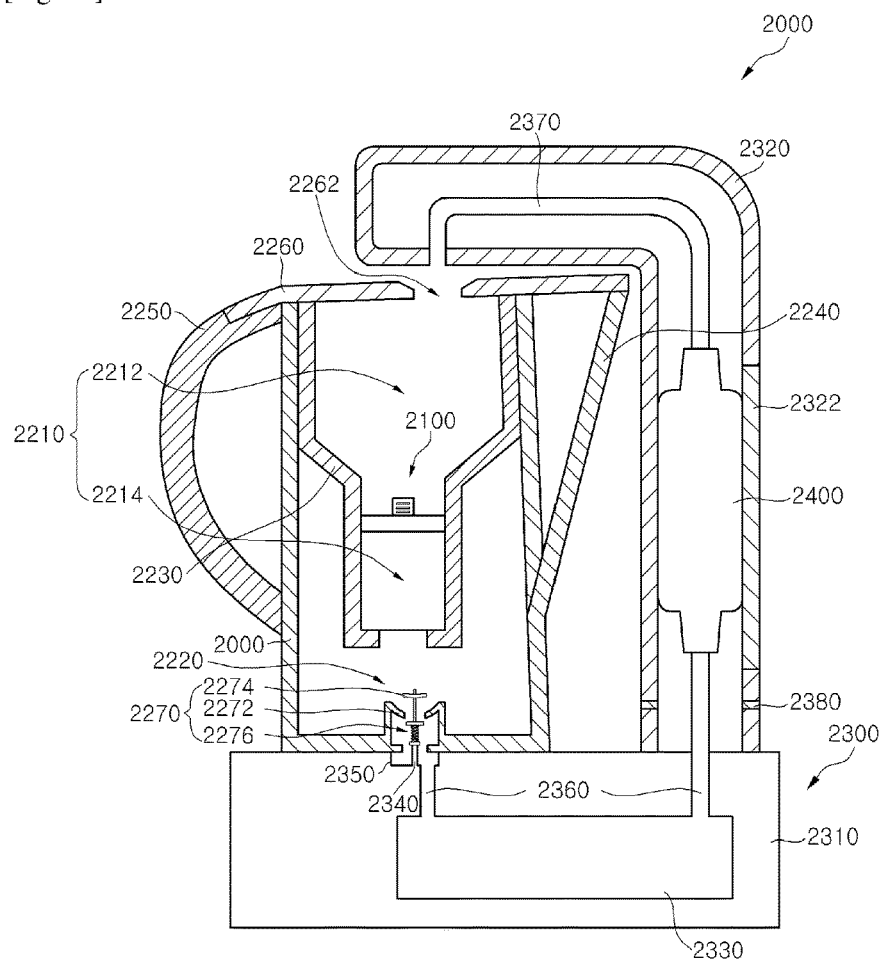
[Fig. 12]
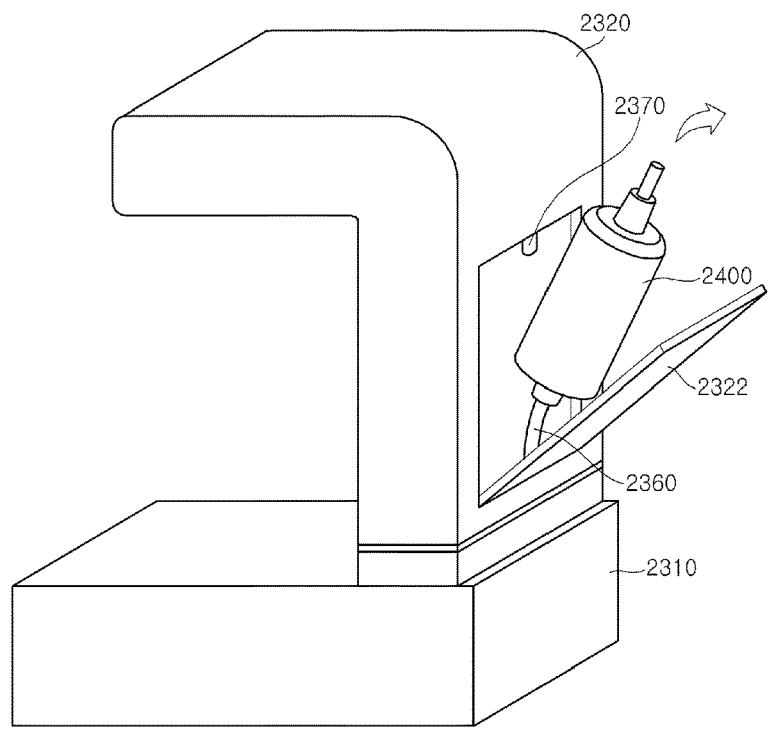

[Fig. 13]
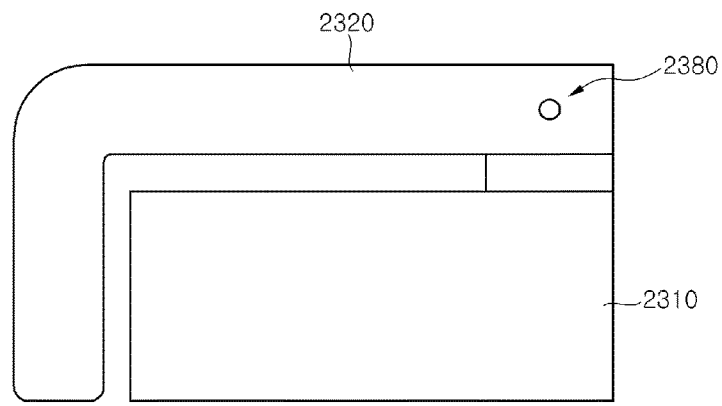
[Fig. 14]
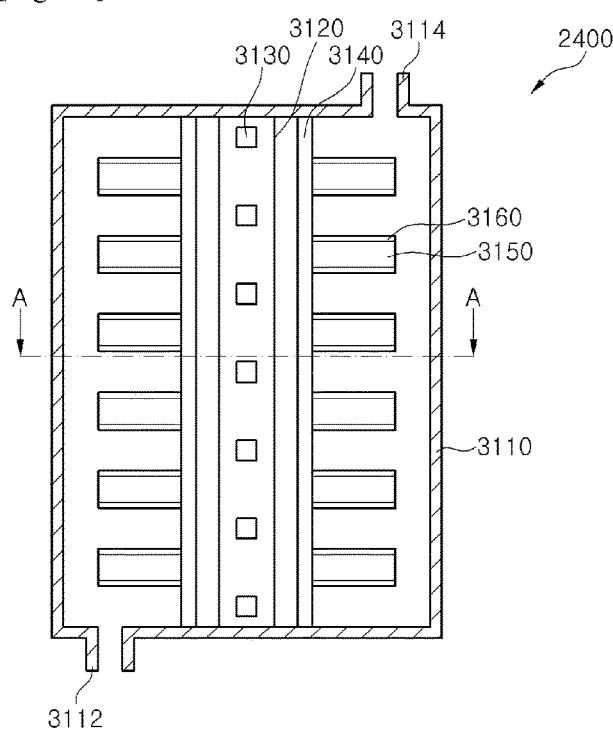
[Fig. 15]
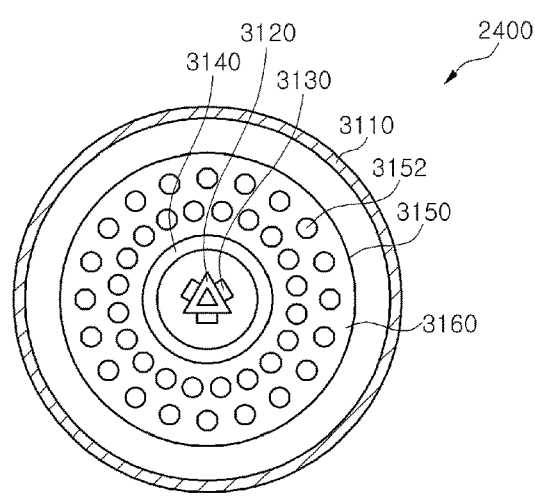

[Fig. 16]
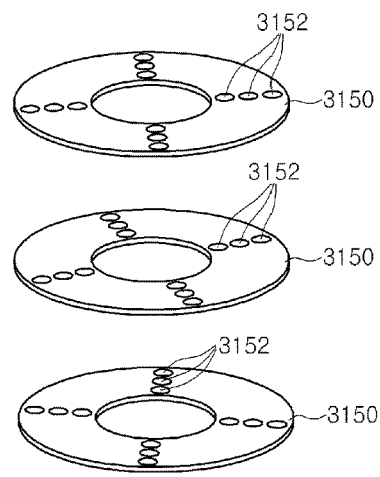
[Fig. 17]
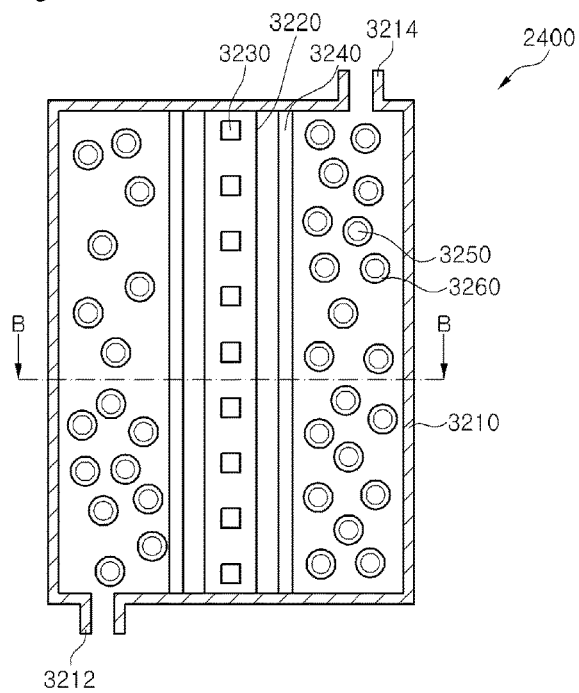
[Fig. 18]
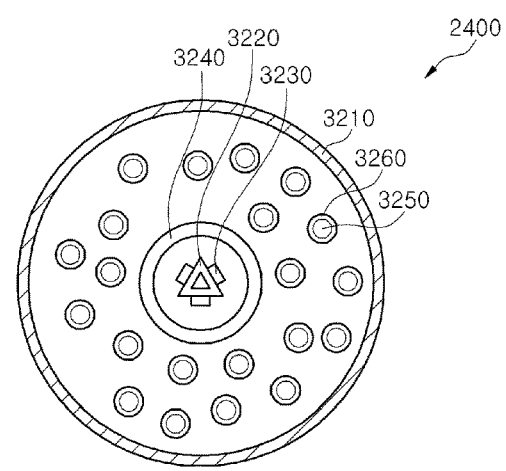

[Fig. 19]
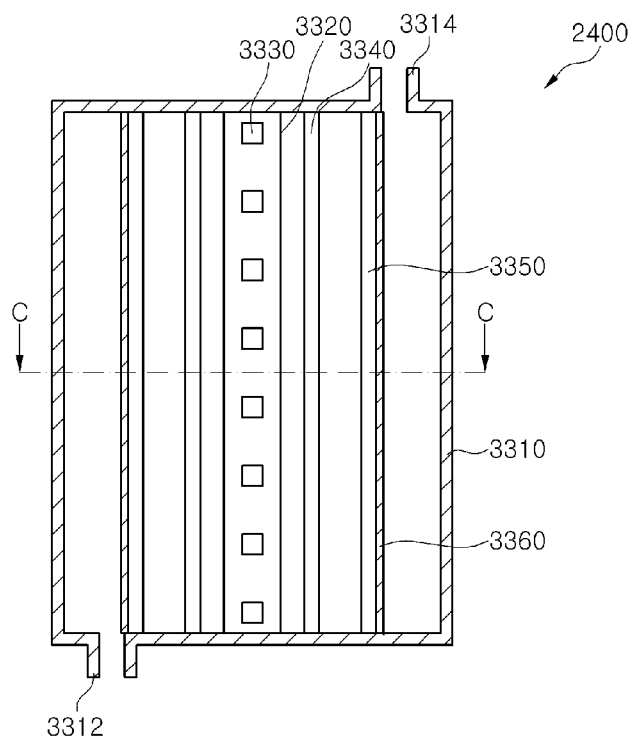
[Fig. 20]
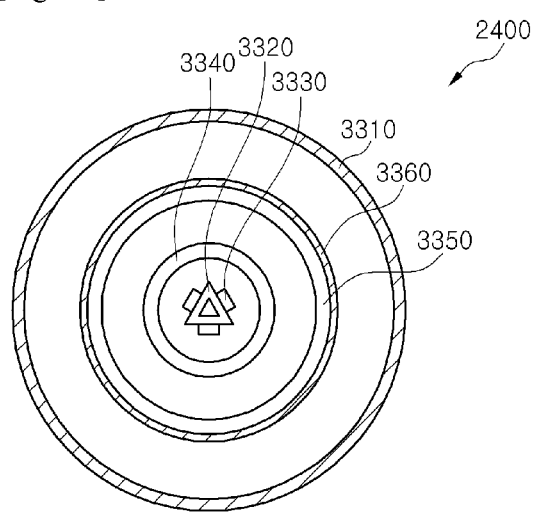

[Fig. 21]
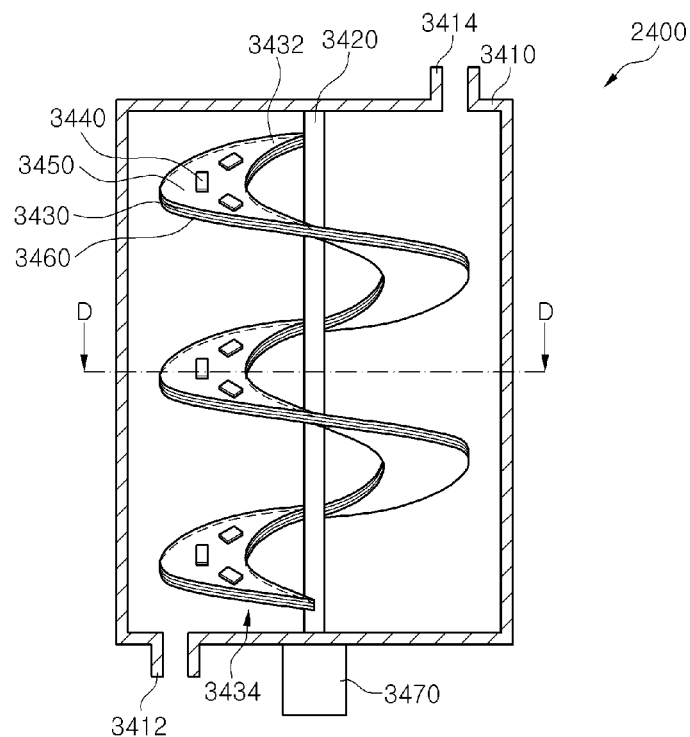
[Fig. 22]
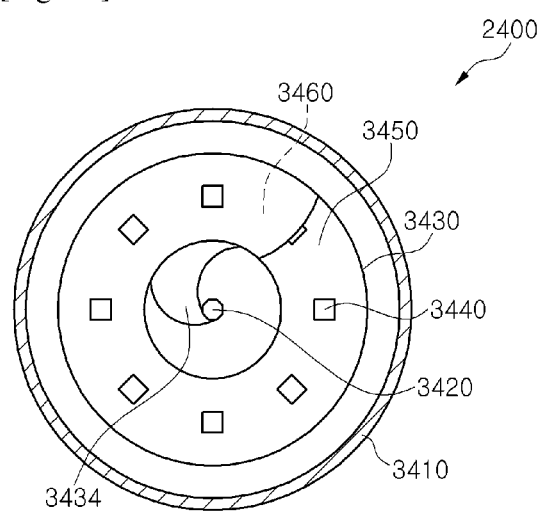

[Fig. 23]
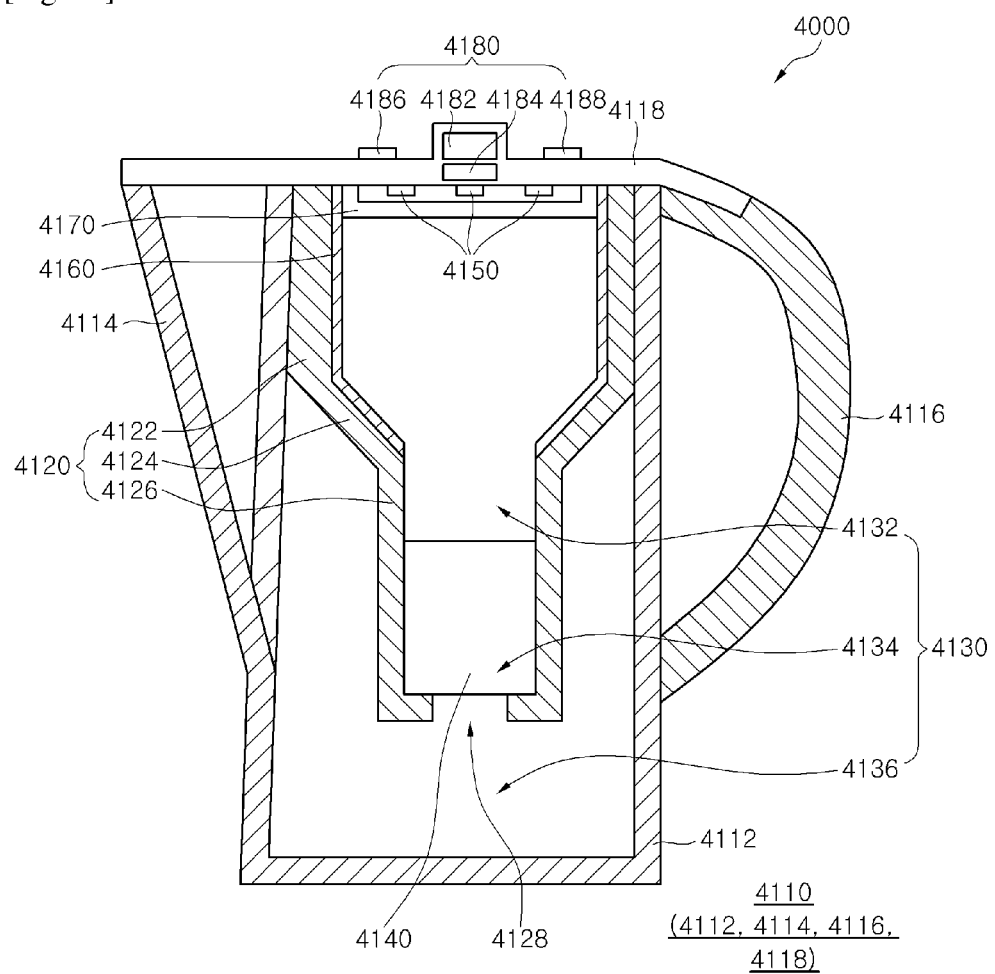

[Fig. 24]
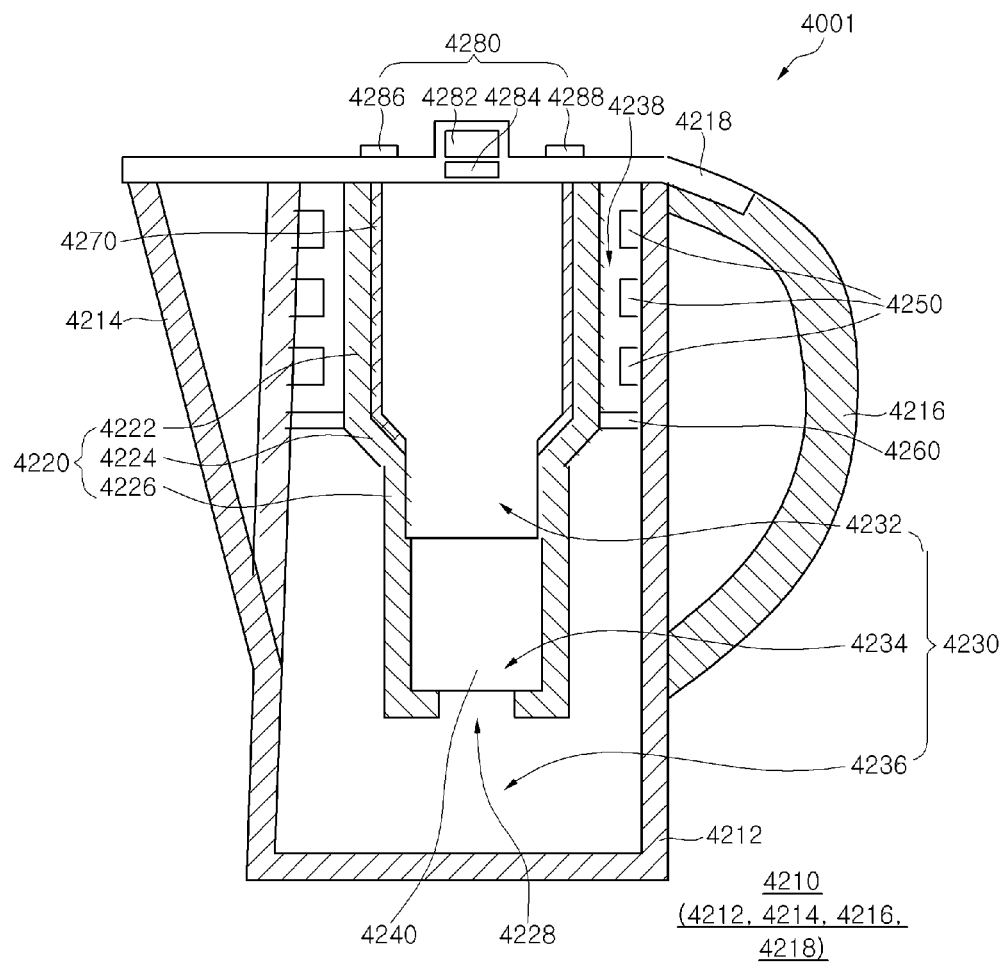

[Fig. 25]
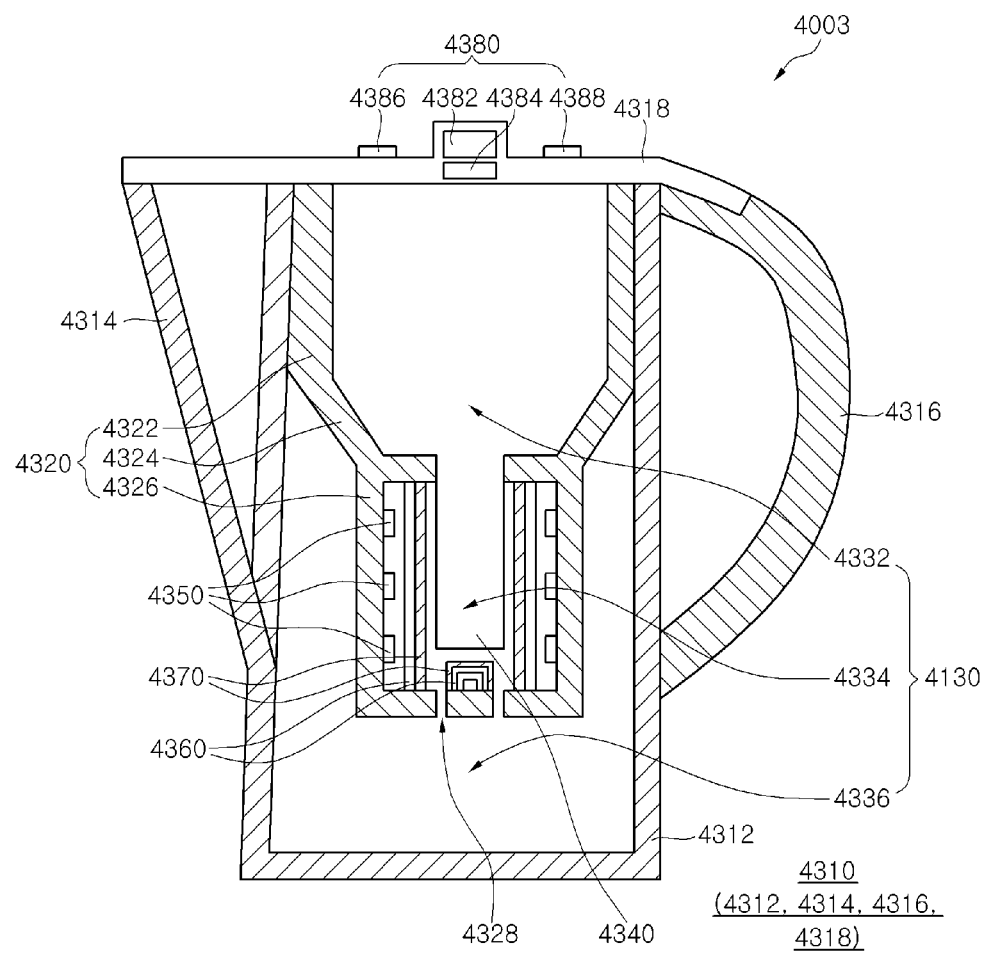

[Fig. 26]
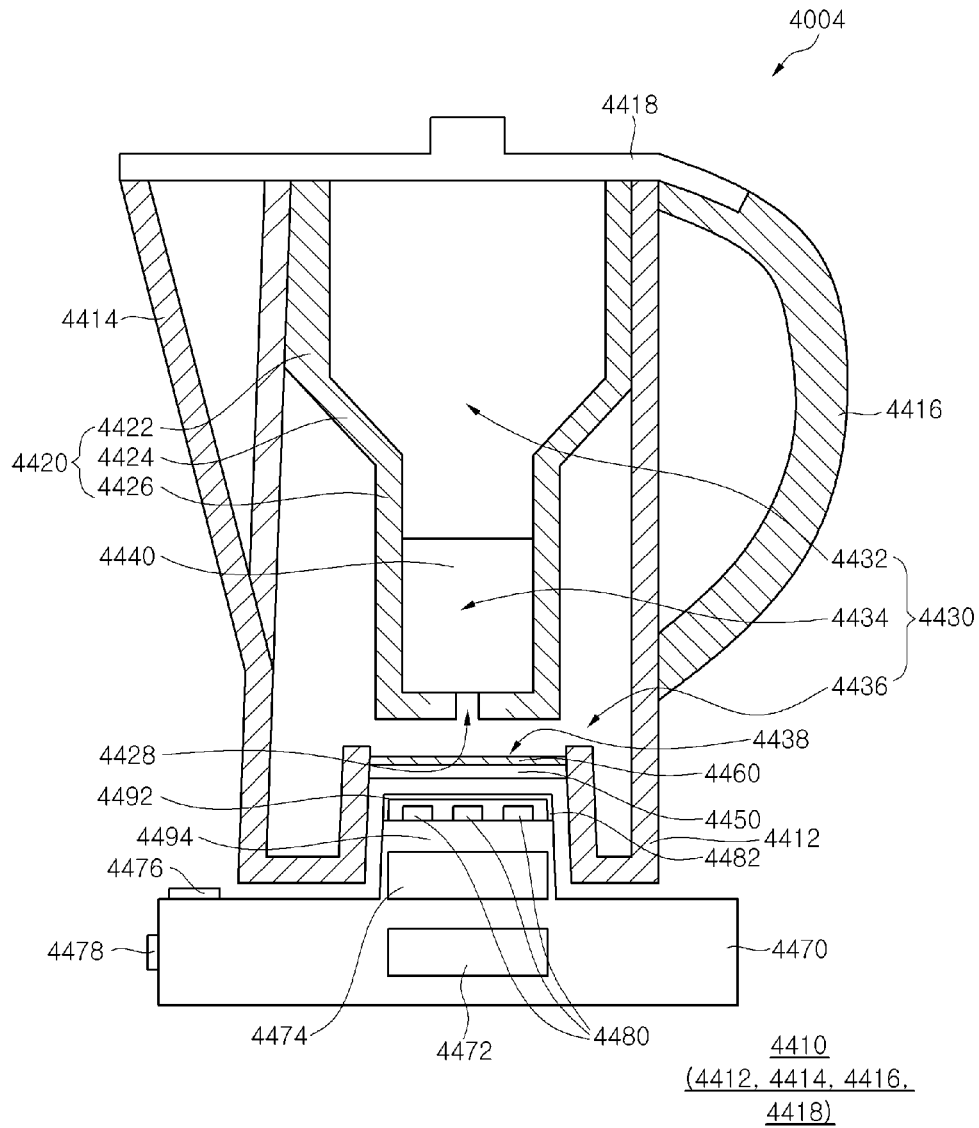
[Fig. 27]
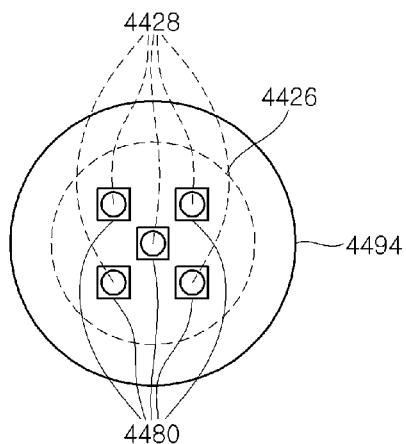

[Fig. 28]
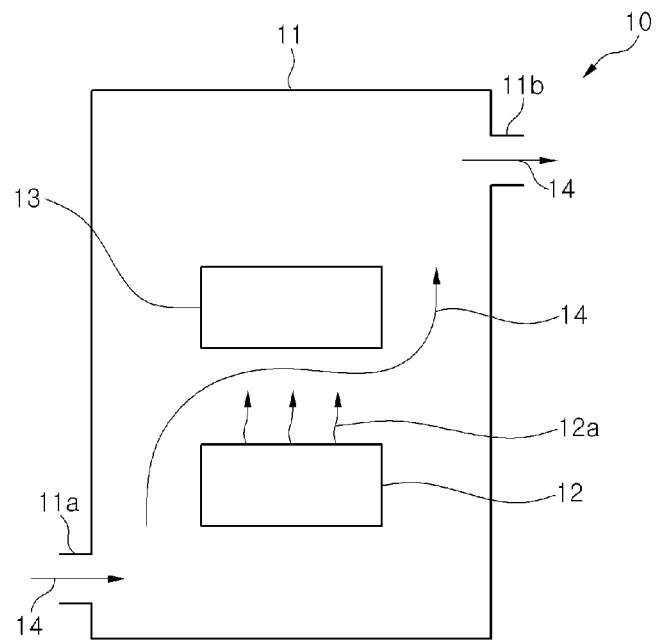
[Fig. 29]
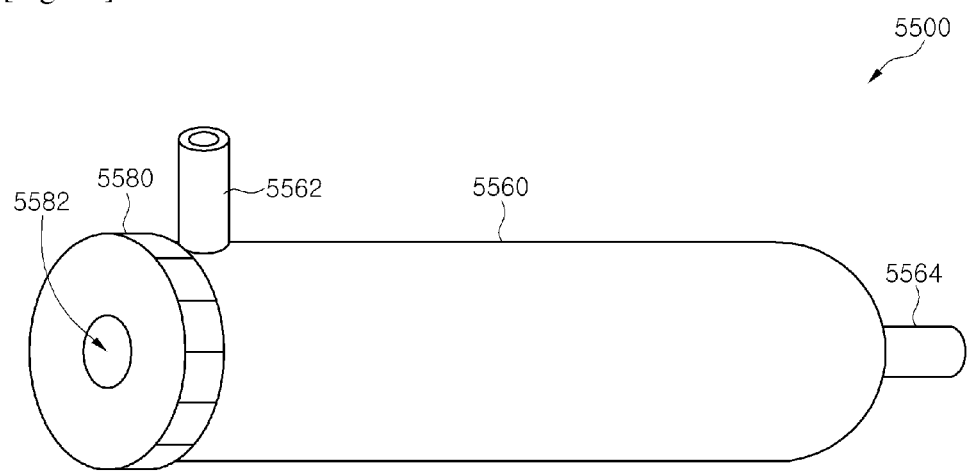

[Fig. 30]
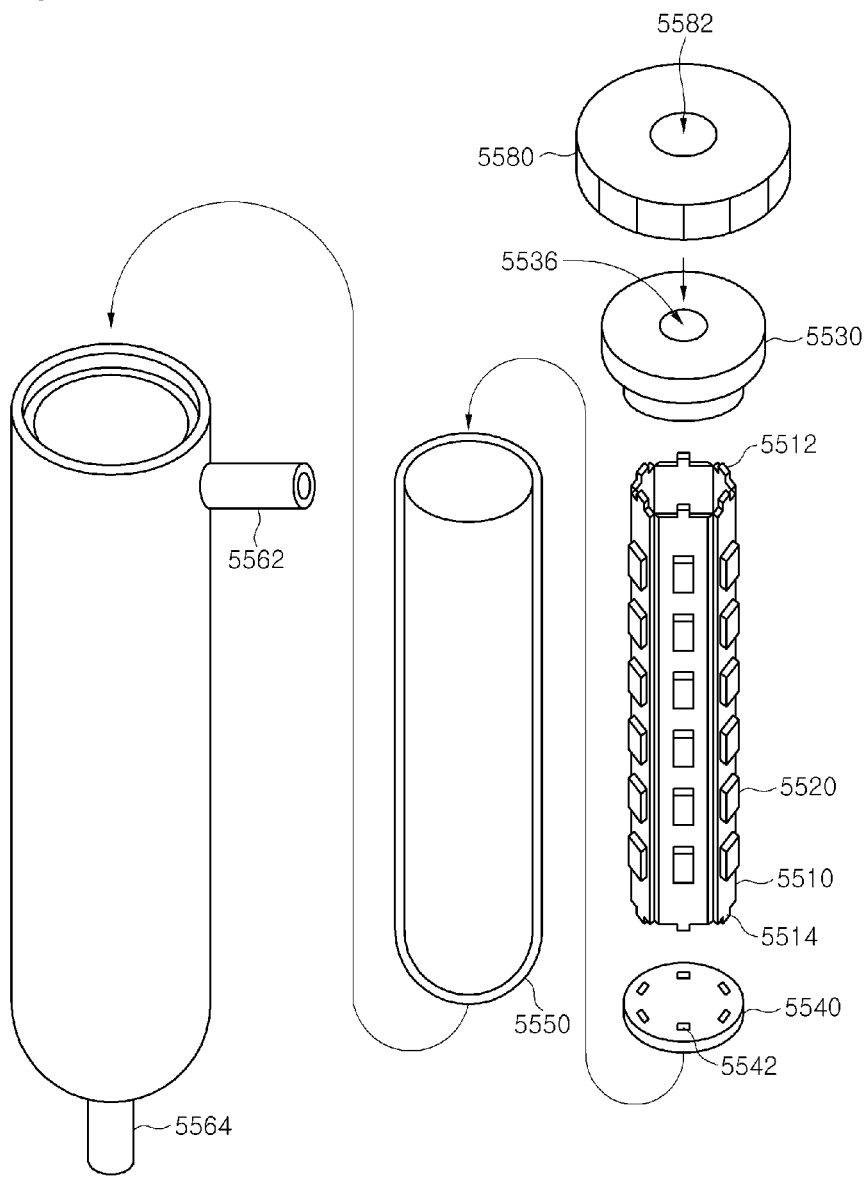
[Fig. 31]
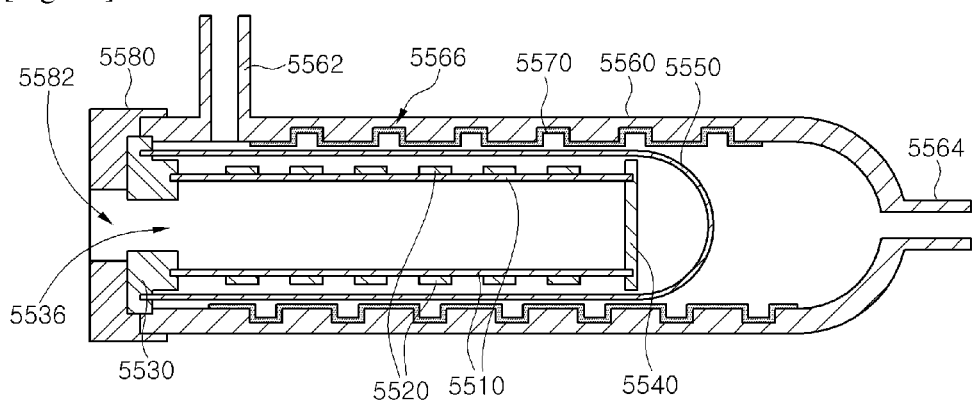

[Fig. 32]
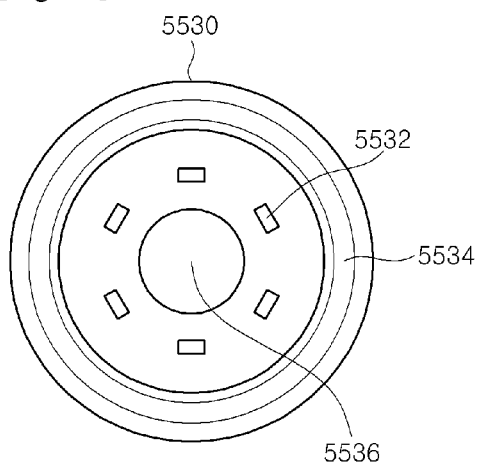
[Fig. 33]
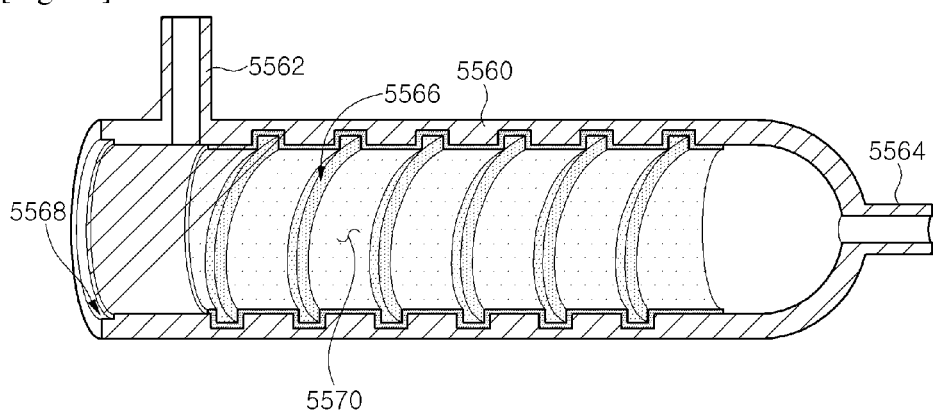

[Fig. 34]
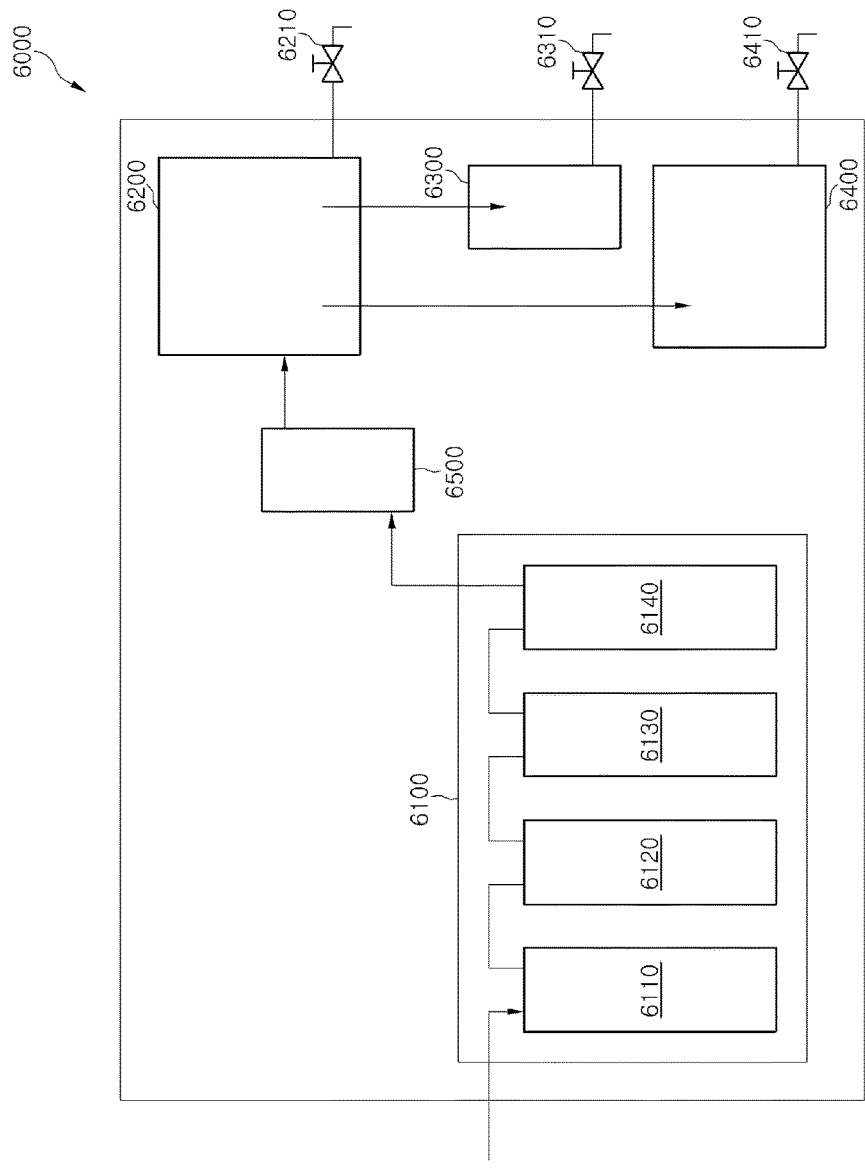
[Fig. 35]
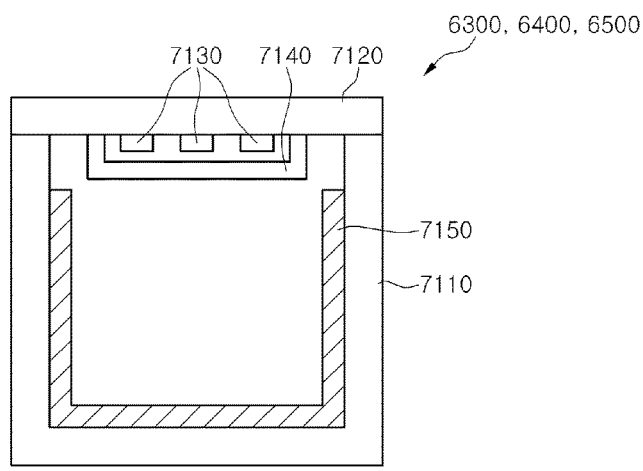

[Fig. 36]
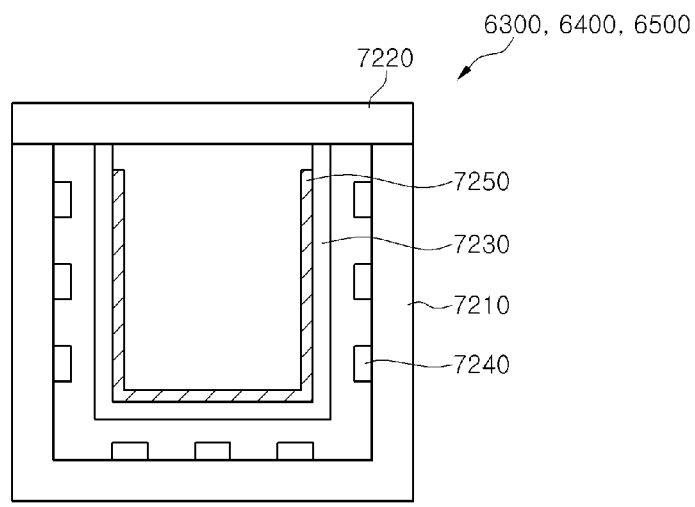
[Fig. 37]
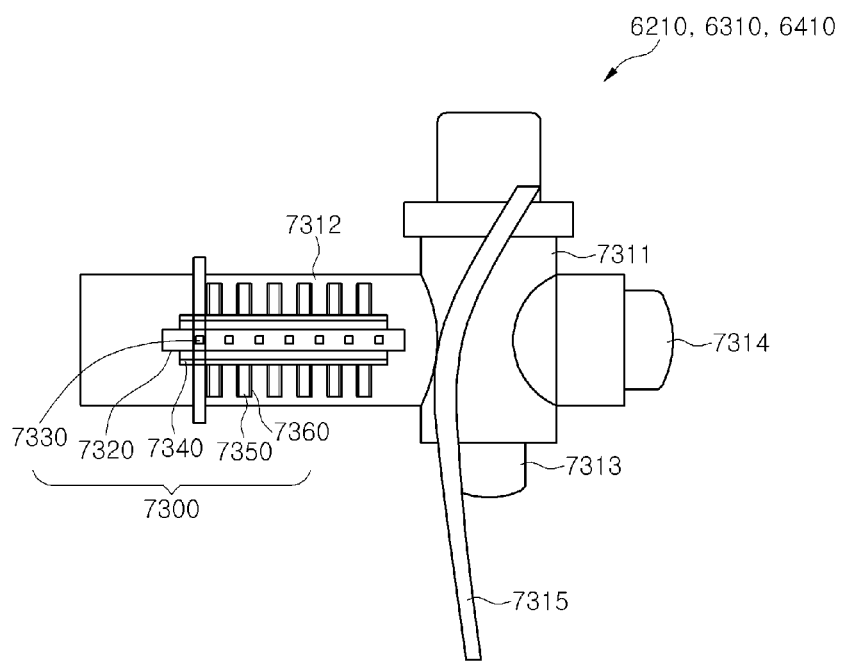

[Fig. 38]
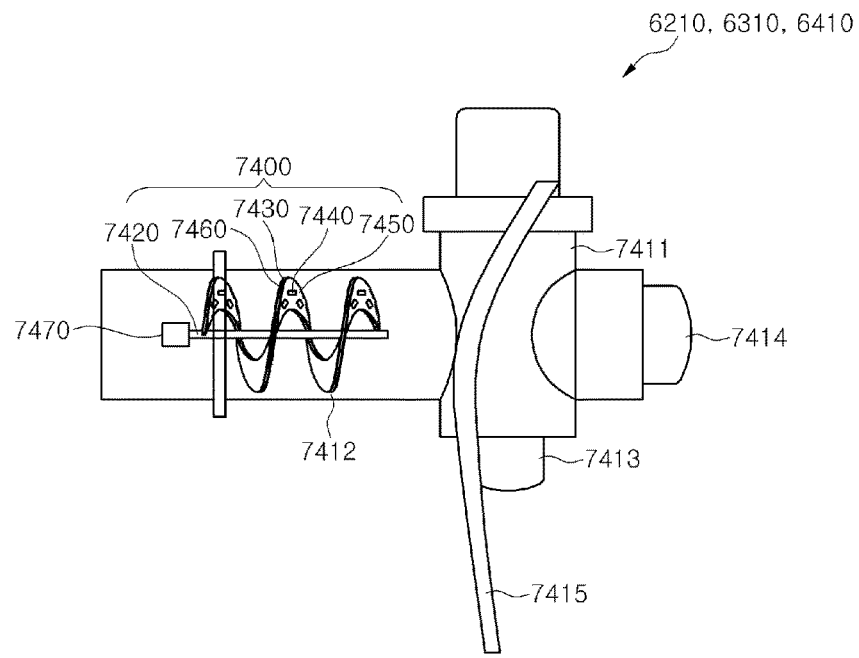
[Fig. 39]
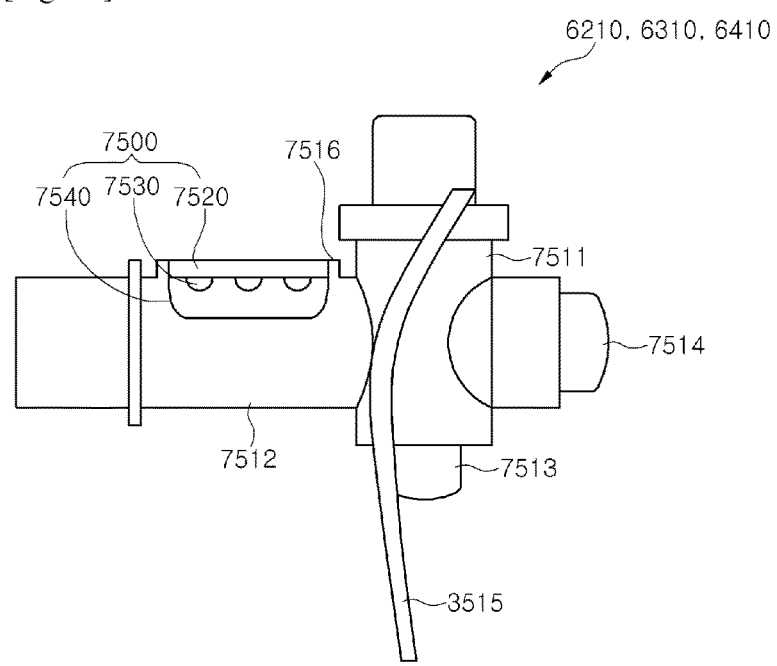
[Fig. 40]
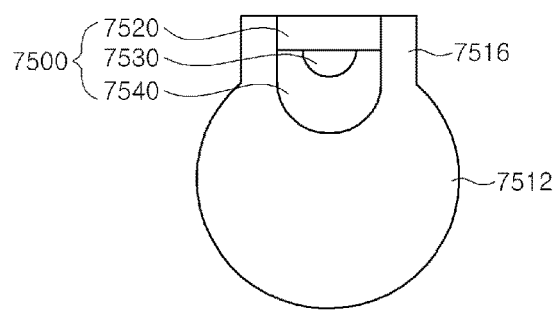

[Fig. 41]
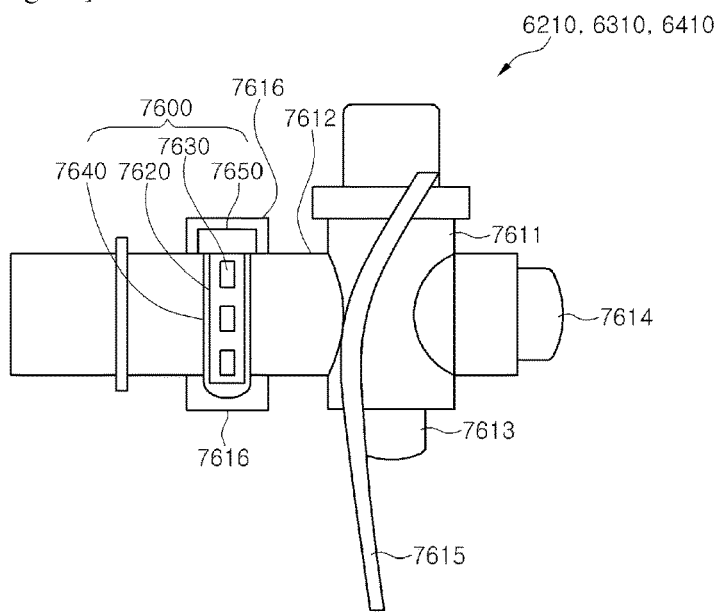
[Fig. 42]
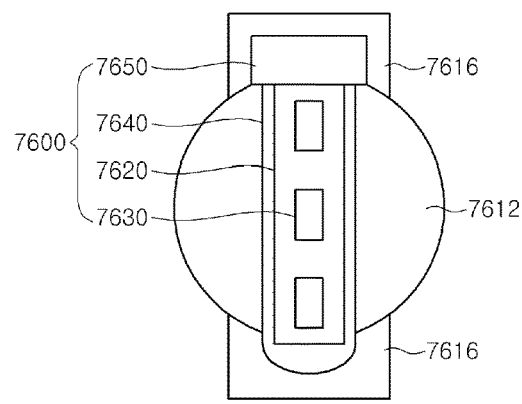
[Fig. 43]
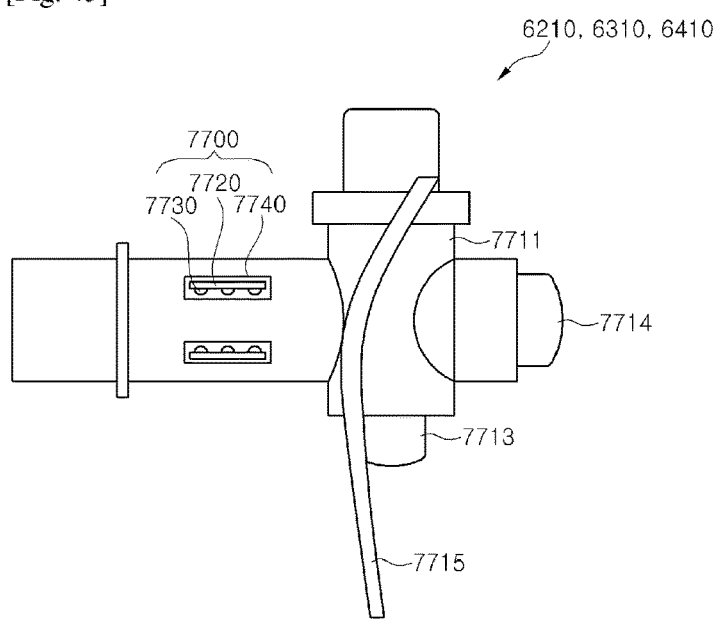

[Fig. 44]
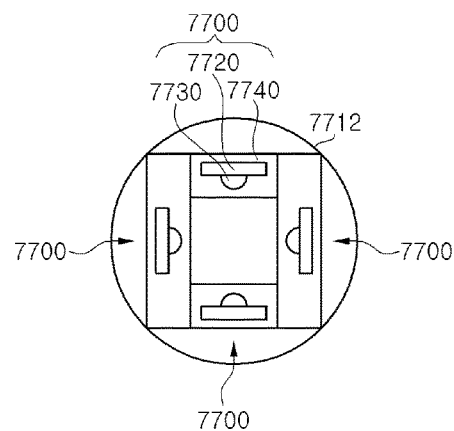
[Fig. 45]
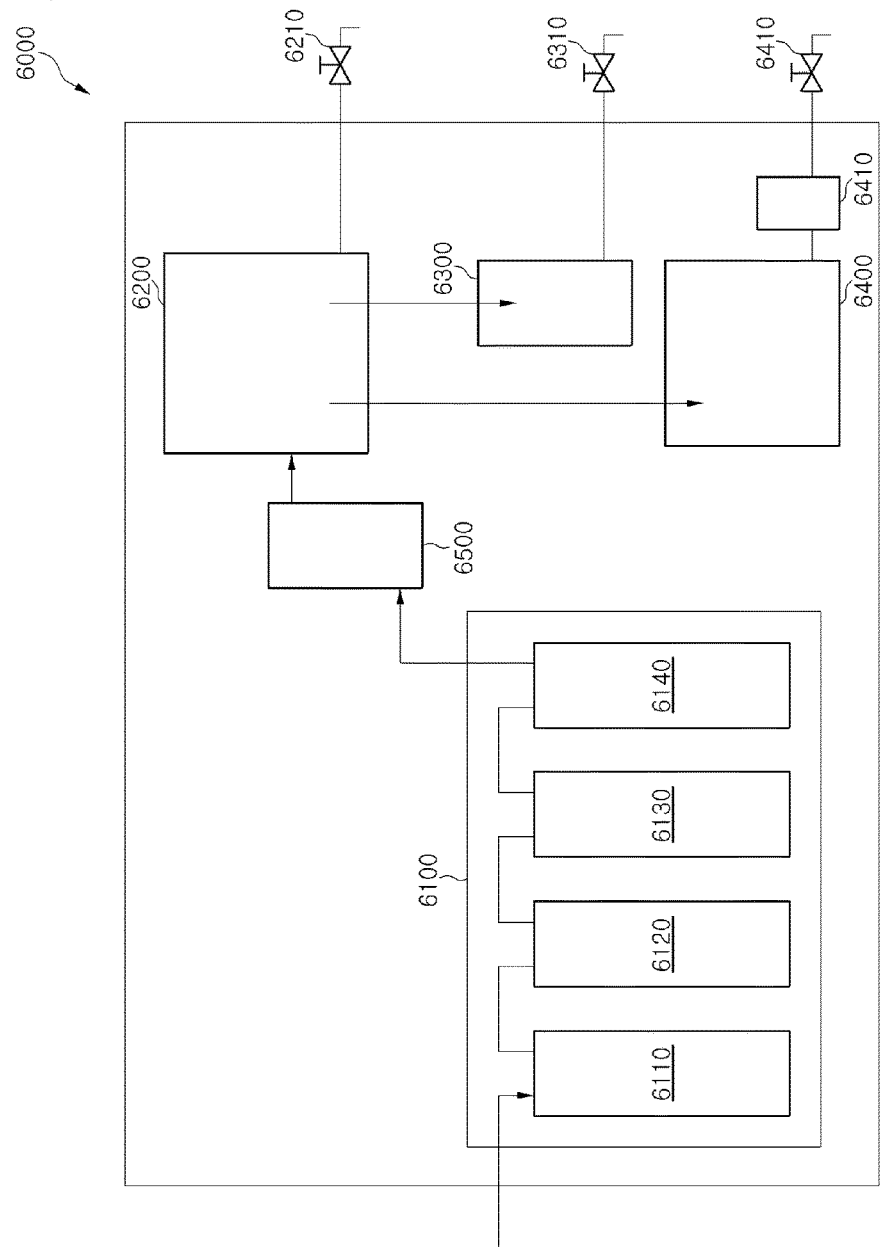

[Fig. 46]
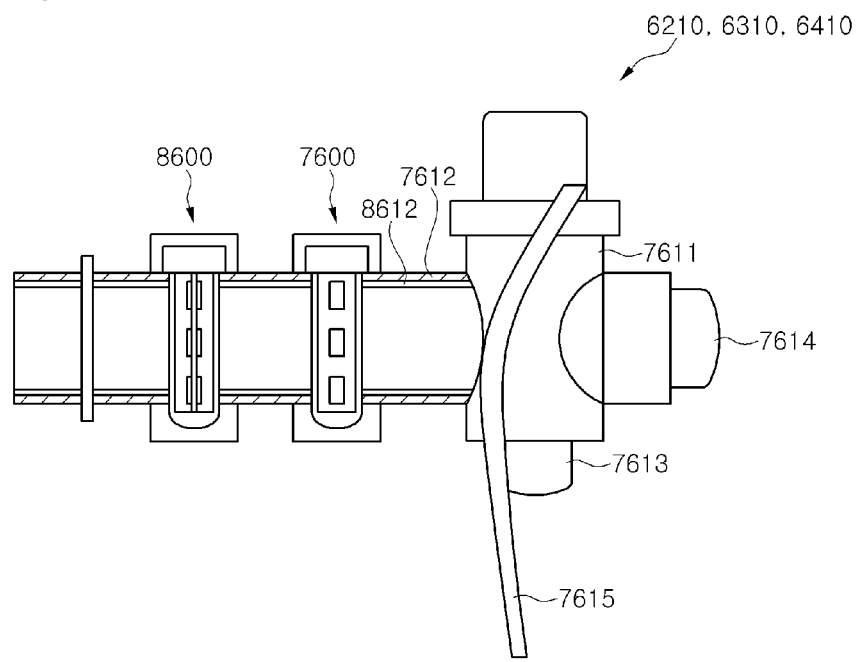
[Fig. 47]
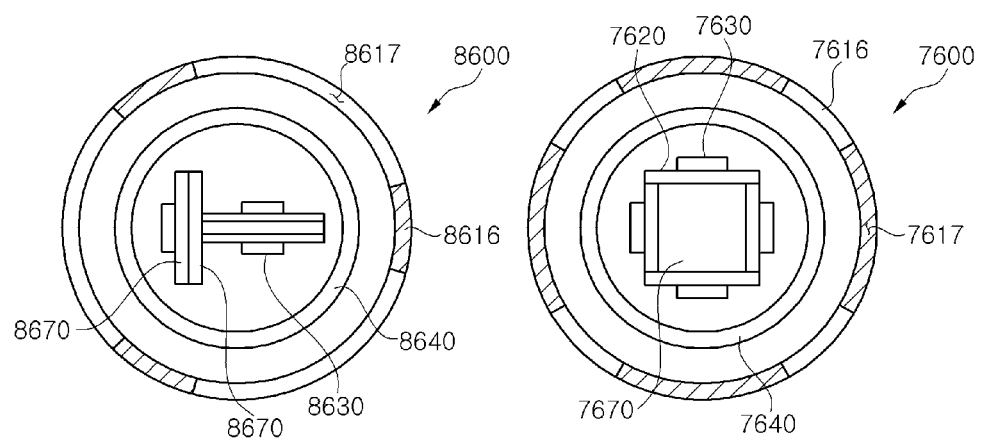

400# WATER PURIFICATION SYSTEM USING ULTRAVIOLET LEDS

CROSS REFERENCE TO RELATED APPLICATIONS

This patent document is a 35 U.S.C. § 371 National Stage application of PCT Application No. PCT/KR2013/002319 entitled "WATER PURIFICATION SYSTEM USING ULTRAVIOLET LEDS," filed on Mar. 21, 2013, which claims the benefit of priority to Korean Patent Application No. 10-2012-0028739 filed on Mar. 21, 2012, Korean Patent Application No. 10-2012-0028740 filed on Mar. 21, 2012, Korean Patent Application No. 10-2012-0028741 filed on Mar. 21, 2012, Korean Patent Application No. 10-2012-0028742 filed on Mar. 21, 2012, Korean Patent Application No. 10-2012-0028743 filed on Mar. 21, 2012, Korean Patent Application No. 10-2012-0059074 filed on Jun. 1, 2012, and Korean Patent Application No. 10-2013-0025825 filed on Mar. 11, 2013. The entire disclosures of the above applications are incorporated by reference as part of this document.

TECHNICAL FIELD

The present invention relates to a water purification system using ultraviolet (UV) LEDs.

BACKGROUND ART

Water purifiers are used to produce pure water by filtering contaminated water.

When water is supplied from a raw water supply unit, water purifiers purify the water by passing the water through various filters, store the purified water in a pure water tank, and drain the purified water through a dispensing stopcock, as needed.

Water purifiers are classified into a filtration type, a distillation type, an ion exchange resin type, a reverse osmosis type, and the like.

Filtration type water purifiers are divided into a microfilter type, an activated carbon filtration type, a hollow fiber filter type, and the like.

Activated carbon filtration type water purifiers use activated carbon having excellent deodorizing effects on residual chlorine.

Reverse osmosis type water purifiers use mass transfer through a membrane and filter out contaminants while passing water molecules through the membrane by pressing one side of the membrane.

Recently, water purifiers are provided with an ultraviolet (UV) filter including UV lamps that emit UV light to sterilize germs remaining in filtered water.

However, a typical UV filter has UV lamps placed at a conduit line through which filtered water flows, and thus does not ensure enough sterilization time for the filtered water, thereby causing deterioration in sterilization efficiency.

DISCLOSURE

Technical Problem

The present invention is aimed at providing a water purification system using UV LEDs, which includes a single system including a solid filter formed with fine pores and UV LEDs therein to increase water contact time by adjusting a flow rate of water without generating any by-products, thereby increasing sterilization efficiency.

In addition, the present invention is aimed at providing a water purification system using UV LEDs, which can sterilize not only germs but also protozoa.

Further, the present invention is aimed at providing a water purification system using UV LEDs, which has excellent sterilization characteristics and is movable to various places without being limited to one particular place.

Furthermore, the present invention is aimed at providing a water purification system using UV LEDs, which can ensure sufficient sterilization time for purified water, thereby improving sterilization efficiency.

Technical Solution

In accordance with one aspect of the present invention, a water purification system using UV LEDs includes: a water purification filter that purifies water supplied from a water source; at least one storage tank that stores the water purified in the water purification filter; and a sterilizer that sterilizes the water with at least one UV LED.

Advantageous Effects

As described above, the present invention provides a portable water purification system using UV LEDs, which can ensure sufficient sterilization time for purified water, thereby improving sterilization efficiency.

In addition, the present invention provides a portable water purification system using UV LEDs, which can sterilize not only germs but also protozoa.

Further, the present invention provides a water purification system using UV LEDs, which has excellent sterilization characteristics and is movable to various places without being limited to one particular place.

DESCRIPTION OF DRAWINGS

FIG. 1 is a perspective view of a solid filter unit according to one embodiment of the present invention.

FIGS. 2 to 5 are a perspective view of individual components of the solid filter unit according to the embodiment of the present invention.

FIGS. 6 and 7 are an exploded perspective view and a sectional view of a sterilizing filter including the solid filter unit according to one embodiment of the present invention, respectively.

FIG. 8 is a sectional view of a portable water purification system using UV LEDs according to one embodiment of the present invention.

FIG. 9 shows a portable water purification system using UV LEDs according to another embodiment of the present invention.

FIG. 10 is a sectional view of a portable water purification system using UV LEDs according to a further embodiment of the present invention.

FIG. 11 is a sectional view of a portable water purification system using UV LEDs according to yet another embodiment of the present invention.

FIGS. 12 and 13 are views showing operation of a cradle of the portable water purification system using UV LEDs according to the embodiment of the present invention.

FIGS. 14 and 15 are sectional views showing examples of a sterilizing filter of the portable water purification system using UV LEDs according to the embodiment of the present invention.

FIG. 16 shows another example of a disc shown in FIGS. 14 and 15.

FIGS. 17 and 18 are sectional views showing another example of the sterilizing filter of the portable water purification system using UV LEDs according to the embodiment of the present invention.

FIGS. 19 and 20 are sectional views showing a further example of the sterilizing filter of the portable water purification system using UV LEDs according to the embodiment of the present invention.

FIGS. 21 and 22 are sectional views showing yet another example of the sterilizing filter of the portable water purification system using UV LEDs according to the embodiment of the present invention.

FIG. 23 is a sectional view of a portable water purification system using UV LEDs according to yet another embodiment of the present invention.

FIG. 24 is a sectional view of a portable water purification system using UV LEDs according to yet another embodiment of the present invention.

FIG. 25 is a sectional view of a portable water purification system using UV LEDs according to yet another embodiment of the present invention.

FIG. 26 is a sectional view of a portable water purification system using UV LEDs according to yet another embodiment of the present invention.

FIG. 27 shows a layout of UV LEDs of the portable water purification system using UV LEDs shown in FIG. 26.

FIG. 28 shows a portable water purification system using UV LEDs according to the present invention.

FIGS. 29 to 33 are views showing a portable water purification system using UV LEDs according to yet another embodiment of the present invention.

FIG. 34 is a diagram of a water purification system using UV LEDs according to yet another embodiment of the present invention.

FIG. 35 is a sectional view showing one example of storage tanks of the water purification system using UV LEDs shown in FIG. 34.

FIG. 36 is a sectional view showing another example of storage tanks of the water purification system using UV LEDs shown in FIG. 34.

FIG. 37 is a sectional view showing one example of stopcocks of the water purification system using UV LEDs shown in FIG. 34.

FIG. 38 is a sectional view showing another example of the stopcocks of the water purification system using UV LEDs shown in FIG. 34.

FIGS. 39 and 40 are sectional views showing a further example of the stopcocks of the water purification system using UV LEDs shown in FIG. 34.

FIGS. 41 and 42 are sectional views showing yet another example of stopcocks of the water purification system using UV LEDs shown in FIG. 34.

FIGS. 43 and 44 are sectional views showing yet another example of stopcocks of the water purification system using UV LEDs shown in FIG. 34.

FIG. 45 is a diagram of a water purification system using UV LEDs according to yet another embodiment of the present invention.

FIG. 46 is a sectional view showing one example of stopcocks of the water purification system using UV LEDs according to the embodiment of the present invention.

FIG. 47 are sectional views of first and second sterilization units shown in FIG. 46.

BEST MODE

FIG. 1 is a perspective view of a solid filter unit according to one embodiment of the present invention.

FIGS. 2 to 5 are a perspective view of individual components of the solid filter unit according to the embodiment of the present invention.

Referring to FIGS. 1 to 5, a solid filter unit 100 according to one embodiment of the present invention may include a support member 110, a plurality of UV LEDs 120, a protective tube 130, a solid filter 140, and a cover 150.

The support member 110 supports the plural UV LEDs 120.

The support member 110 may have a cylindrical or prismatic shape.

The support member 110 may be provided with the UV LEDs 120 on a surface thereof, namely, on a cylindrical surface or prism surface thereof.

The support member 110 may include a heat sink 112 having a cylindrical or polygonal prismatic shape.

The support member 110 is not limited to the cylindrical or prismatic shape. Alternatively, the support member 110 may have a structure in which at least two plates are stacked one above another.

The heat sink 112 may have a variety of prismatic shapes including, for example, a triangular prismatic shape, as shown in FIGS. 1 and 2.

The support member 110 may have a structure in which a plurality of printed circuit boards (PCBs) 114 are attached to surfaces of the heat sink 112. The PCBs 114 may be attached to side surfaces of the heat sink 112. As shown in FIGS. 1 and 2, when the heat sink 112 has a triangular prismatic shape, three PCBs 114 may be attached to three side surfaces of the heat sink 112, respectively.

The PCBs 114 may include metal PCBs. However, it should be understood that the PCBs are not limited to the metal PCBs and may include other various types of substrates.

Although not specifically shown in FIGS. 1 and 2, each of the PCBs 114 may be provided with an electric circuit that electrically connects the LEDs 120, on one side surface of the PCBs or on the other surface of the PCBs contacting the heat sink 112. In addition, interconnection wires are provided on the surface of the heat sink 112 or inside of the heat sink 112 to electrically connect the LEDs 120. Further, at one end of the PCB 114, terminals (not shown) are provided to connect the LEDs 120 to a power source.

The UV LEDs 120 may be mounted on the support member 110, preferably on one side surface of the PCB 114 of the support member 110.

The UV LEDs 120 may emit UV light. The UV lights emitted by the UV LEDs 120 may have the same wavelength band or various wavelength bands.

The UV LEDs 120 may be composed of UV LEDs emitting UV light in a wavelength band of 200 nm to 400 nm.

The support member 110 including the UV LEDs 120 is detachable from the solid filter unit 100. Therefore, when the UV LEDs 120 are damaged or old and stopped working, the support member 110 including the damaged or old UV LEDs 120 can be detached and replaced with another support member including new UV LEDs. The support member including new UV LEDs is attached to the solid filter unit 100.

The protective tube 130 seals the components including the UV LEDs 120 and the support member 110, that are arranged inside of the protective tube 130, to protect these components from an external environment, for example, from water.

The protective tube 130 may be formed of quartz capable of transmitting UV light emitted from the UV LEDs 120.

The protective tube 130 may have a test tube shape with one closed end, as shown in FIGS. 1 and 3.

The protective tube 130 may also be formed of other materials having the aforementioned functions including a sealing function and a UV light transmission function.

The protective tube 130 may be inserted into a through-pathway 142 of the solid filter 140 while being separated from the solid filter 140 without contact. That is, a space is defined between the protective tube 130 and the solid filter 140. When water is introduced into the space between the protective tube 130 and the solid filter 140, the water can be drained from the space while passing through the solid filter 140.

The protective tube 130 may be omitted. For example, the protective tube 130 may be omitted when the UV LEDs 120 are sealed as they are. For example, in fabrication of the UV LEDs 120, if packaging is performed using a material, for example, quartz, having the sealing function and the UV light transmission function, the protective tube 130 may be omitted. In addition, the protective tube 130 may be omitted by individually or collectively coating and sealing the UV LEDs 120.

The solid filter 140 may have a hollow cylindrical shape including the through-pathway 142 at a central portion of the solid filter 140.

The solid filter 140 may be a carbon block or a ceramic block. The carbon block may be prepared by properly mixing a binder including a resin such as polyethylene, with activated carbon powder.

The solid filter 140 may include fine pores smaller than protozoa to prevent passage of protozoa, such as cryptosporidium or giardia having strong resistance to chlorine, injected for sterilization in a water purification plant and the like.

The pores of the solid filter 140 may have a size of less than 5 μm.

A photocatalyst may be coated on a surface of the through-pathway 142 of the solid filter 140. The photocatalyst may react with UV light emitted from the UV LEDs 120 to sterilize protozoa or germs.

The solid filter 140 may be detachable from the solid filter unit 100. Therefore, the dead solid filter 140 (e.g., a solid filter with blocked pores or an expired solid filter) may be separated from the solid filter unit 100 and then, a new solid filter 140 may be mounted on the solid filter unit 100.

The photocatalyst may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, $CdS$, $ZnSCdSe$, $GaP$, $CdTe$, $MoSe_2$, or $WSe_2$.

The solid filter unit 100 according to the embodiment of the invention may filter foreign matter out of water using the solid filter 140. In this case, the solid filter unit 100 filters protozoa, such as cryptosporidium or giardia, out of the water and then sterilizes the protozoa using UV light emitted from the UV LEDs 120. The protozoa filtered by the solid filter 140 are sterilized while being exposed to UV light emitted from the LEDs 120 for a long period of time.

The cover 150 may be coupled to one end of the solid filter 140.

The cover 150 seals the solid filter 140, particularly, one of two inlets at both ends of the through-pathway 142 of the solid filter 140. That is, the cover 150 seals a lower inlet of the through-pathway 142, thereby allowing water introduced through an upper inlet of the through-pathway 142 to pass through and drain from the solid filter 140.

As shown in FIG. 5, the cover 150 may be provided on an inner bottom surface thereof with a support member mounting recess 152 on which the support member 110 is mounted, and a protective tube mounting recess 154 on which the protective tube 130 is mounted.

Although not specifically shown in FIG. 1 or 5, the cover 150 may include terminals (not shown) electrically connected to the support member 110 and interconnection wires that connect the terminals (not shown) to an external power source.

In addition, although not specifically shown in FIG. 1 or 5, the cover 150 may further include a battery (not shown) that supplies electric power to the plural LEDs 120 and a power receiver (not shown) having coils for wireless charging of the battery (not shown). The cover 150 may also include the power receiver (not shown) alone without the cell.

As described above, in the solid filter unit 100 according to one implementation of the disclosed technology, the cover 150 may include the electrical connection member electrically connected to the UV LEDs 120 and interconnection wires formed on the surface thereof or therein for electrical connection to the external power source. In other implementations, the cover 150 may include the battery (not shown) or power receiver (not shown) to charge the battery (not shown) or supply the power to the UV LEDs 120. As one example, the battery may be charged using the power receiver (not shown) with electric power supplied from an external power transmitter (not shown). Although it is explained that the cover 150 includes the above elements for supplying power to the UV LEDs, it is also possible that such elements are included in the inside of the support member.

FIGS. 6 and 7 respectively show an exploded perspective view and a sectional view of a sterilizing filter including the solid filter unit according to one embodiment of the present invention, respectively.

Referring to FIGS. 6 and 7, a sterilizing filter 200 according to one embodiment of the invention may include a solid filter unit 100, a filter casing 210, and a filter cover 220.

The solid filter unit 100 is illustrated in detail with reference to FIGS. 1 to 5 and detailed descriptions of the solid filter unit 100 are omitted.

The solid filter unit 100 may be inserted into the filter casing 210.

As shown in FIG. 7, the filter casing 210 may be provided on an inner wall thereof with at least two stoppers 212 to separate the solid filter unit 100 from the bottom of the filter casing 210. The stoppers 212 may protrude a predetermined distance from the inner wall of the filter casing 210.

The filter casing 210 and the solid filter unit 100 may define a space therebetween. That is, the filter casing 210 may have a region, an inner diameter of which is greater than an outer diameter of the solid filter unit 100 so as to allow water drained from the solid filter 140 of the solid filter unit 100 to flow into the space between the filter casing 210 and the solid filter unit 100.

The filter casing 210 may have an outlet 214 on the bottom thereof. The outlet 214 may be a hole for draining sterilized water in which protozoa or germs have been sterilized by the solid filter unit 100.

As shown in FIG. 7, the filter casing 210 may have an upper end, an inner diameter of which is the same as the outer diameter of the solid filter unit 100.

The filter casing 210 is coupled to the filter cover 220 described below and may be configured to guide water, introduced through the filter cover 220, to the through-pathway 142 of the solid filter 140.

The filter cover 220 may have at least one inlet 222. The inlet 222 may be a hole for introducing water into the sterilizing filter 200.

The filter cover 220 may be formed at the center of the filter cover 220 with a protrusion 224. The protrusion 224 may allow more inlets 222 to be formed on the filter cover 220 and serve as a handle when the sterilizing filter 200 is attached to or detached from another apparatus.

The sterilizing filter 200 may be provided by fastening the filter cover 220 to the filter casing 210. As shown in FIGS. 6 and 7, the filter cover 220 may be fastened to the filter casing 210 by coupling internal threads 226 formed on an inner surface of a lower portion of the filter cover 220 to external threads 216 formed on an outer surface of the upper end of the filter casing 210.

As described above, the sterilizing filter 200 according to the embodiment of the invention includes the solid filter unit 100, the filter casing 210, and the filter cover 220. Water is introduced into the through-pathway 142 of the solid filter unit 100 via the inlet 222 of the filter casing 210. The introduced water passes through the solid filter unit 100 to flow into the space between the solid filter unit 100 and the filter casing 210, and then drains away through the outlet 214 formed in the bottom of the filter casing 210. While water passes through the solid filter 140, protozoa or germs are filtered and sterilized by UV light emitted from the UV LEDs 120, thereby obtaining sterilized water.

FIG. 8 is a sectional view of a portable water purification system using UV LEDs according to one embodiment of the present invention.

Although the sterilizing filter 200 described with reference to FIGS. 6 and 7 is used for a portable water purification system 300 in this embodiment, it should be understood that the sterilizing filter 200 may also be applied to various apparatuses.

Referring to FIG. 8, the portable water purification system 300 using UV LEDs according to the embodiment of the invention may include the sterilizing filter 200, a body 310, a body cover 320, and a cradle 330.

The body 310 may be provided with a filter-mounting part 312. The filter-mounting part 312 has an upper portion in which a temporary storage space 312a is provided to temporarily store water and a lower portion in which a filter mounting space 312b on which the sterilizing filter 200 is mounted is provided. At the lower portion of the body 310 excluding the filter-mounting part 312, a storage space is provided to store water sterilized by the sterilizing filter 200.

The temporary storage space 312a may have a greater inner diameter than the filter mounting space 312b, and an intervening space therebetween may have a gradually decreasing inner diameter from the temporary storage space 312 to the filter mounting space 312b. This structure helps all water stored in the temporary storage space 312a to be naturally introduced into the sterilizing filter 200 by gravity.

The body 310 may be provided on an outer surface thereof with a handle 314.

The body cover 320 may serve to protect the interior of the body 310 from external environments by covering the body 310.

The cradle 330 may be connected to an external power source and may include a power transmitter (not shown) having coils therein.

The cradle 330 may recharge a battery (not shown) in the sterilizing filter 200, or may turn on the LEDs 120 of the sterilizing filter 200 using the power transmitter (not shown).

In addition, the cradle 330 may be provided with a heater to heat water stored in the body 310.

As described above, the portable water purification system 300 using UV LEDs according to the embodiment of the invention includes the sterilizing filter 200, the body 310, the body cover 320, and the cradle 330. When water is introduced into the temporary storage space 312a within the body 310, the sterilizing filter 200 sterilizes protozoa or germs in the water such that the sterilized water is stored in the body 310.

At this time, the UV LEDs 120 included in the sterilizing filter 200 emit UV light to sterilize protozoa or germs filtered by the solid filter 140.

FIG. 9 shows a portable water purification system using UV LEDs according to another embodiment of the present invention.

Although the sterilizing filter 200 described with reference to FIGS. 6 and 7 is used for a portable water purification system 400 in this embodiment, it should be understood that the sterilizing filter 200 may be applied to various apparatuses.

Referring to FIG. 9, the portable water purification system 400 using UV LEDs according to the embodiment of the invention may include the sterilizing filter 200 and an external casing 410.

The external casing 410 may be provided with the sterilizing filter 200. The external casing 410 may be connected to a tap 420 at one end 412 and provided with an outlet for draining purified water at the other end 414.

Although not specifically shown in FIG. 9, a battery (not shown) is provided inside or on a surface of the external casing 410, which supplies electric power to the sterilizing filter 200, or electrical wiring for connection with an external power source.

As described above, the portable water purification system 400 using UV LEDs according to the embodiment of the disclosed technology includes the sterilizing filter 200 and the external casing 410, and may be connected to the tap 420 at one end 412 of the external casing 410.

FIG. 10 is a sectional view of a portable water purification system using UV LEDs according to a further embodiment of the present invention.

Referring to FIG. 10, a portable water purification system 1000 using UV LEDs according to the embodiment of the invention may include a sterilizing filter 1100, a body 1200, and a cradle 1300.

As illustrated in detail with reference to FIGS. 1 to 7, the sterilizing filter 1100 can sterilize germs or protozoa within water using UV LEDs 1120 and a solid filter 1140. The solid filter unit 1100 is illustrated in detail with reference to FIGS. 1 to 7 and detailed descriptions thereof are omitted.

The body 1200 may include an upper end part 1210 that includes a temporary storage space 1212 and a filter-mounting portion 1214, and a partition wall 1230 that distinguishes the upper end part 1210 from a water storage space 1220 under the upper end part 1210.

The partition wall 1230 divides the upper end part 1210, which includes the temporary storage space 1212 and the filter-mounting portion 1214, from the water storage space 1220. The temporary storage space 1212 stores water therein, and the sterilizing filter 1100 is mounted on the filter-mounting portion 1214.

The temporary storage space 1212 for temporarily storing water serves to store water prior to introduction into the sterilizing filter 1100 mounted on the filter-mounting portion 1214.

The temporary storage space 1212 may have a greater inner diameter than the filter-mounting portion 1214, and an intervening space therebetween may have a gradually decreasing inner diameter from the temporary storage space 1212 to the filter-mounting portion 1214. This structure helps all water stored in the temporary storage space 1212 to be naturally introduced into the sterilizing filter 1100 by gravity.

In addition, at an outer region of the body 1200, a water outlet 1240 is provided to be connected to the water storage space 1220 and drain the water stored in the water storage space 1220 to the outside.

At an outer region of the body 1200, a handle 1250 is provided opposite to the water outlet 1240.

The body 1200 may be provided at an upper portion of the temporary storage space 1212 with a body cover 1260 that covers the body 1200 to protect the interior of the body 1200 from external environments.

At a bottom of the body 1200, outlet and inlet valves 1270 and 1280 are provided to be connected to the water storage space 1220 of the body 1200 to the cradle 1300.

As shown in FIG. 10, when the body 1200 is mounted on the cradle 1300, the outlet valve 1270 is open to allow the water in the water storage space 1220 to flow into a pump 1310, and the inlet valve 1280 serves as an inlet through which the water compressed by the pump 1310 is transferred to the temporary storage space 1212.

The outlet valve 1270 may include a valve guide 1272, a rubber packing 1274 and a restoring member 1276, and the inlet valve 1280 may include a valve guide 1282, a rubber packing 1284 and a restoring member 1286.

When the body 1200 is mounted on the cradle 1300, securing protrusions 1320 of the cradle 1300 press the restoring members 1276 and 1286 such that the valve guides 1272 and 1282 and the rubber packing 1274 and 1284 are separated from each other, thereby opening the outlet and inlet valves 1270 and 1280. In contrast, when the body 1200 is detached from the cradle 1300, the securing protrusions 1320 of the cradle 1300 and the restoring members 1276 and 1286 are separated from each other such that the rubber packing 1274 and 1284 closely contact the valve guides 1272 and 1282 by restoring force of an elastic member, for example, a spring, of the restoring member 1276 and 1286, thereby closing the outlet and inlet valves 1270 and 1280.

The outlet valve 1270 is connected at one end to the water storage space 1220 of the body and at the other end to the pump 1310, and the inlet valve 1280 is connected at one end to a water transfer pathway 1290 and at the other end to the pump 1310. The water transfer pathway 1290 may be disposed within the water storage space 1220 and may serve as a water flow path that connects the inlet valve 1280 to the temporary storage space 1212 while being separated from the water storage space 1220. Although the water transfer pathway 1290 is illustrated as being configured as partition walls including a part of the body 1200 in FIG. 10, the water transfer pathway 1290 may be configured as a water pipe (not shown) formed of polyvinyl chloride (PVC) or rubber. That is, the water transfer pathway 1290 may include any type of flow path that connects the inlet valve 1280 to the temporary storage space 1212.

In FIG. 10, the water transfer pathway 1290 allows the water in the water storage space 1220 to flow into the temporary storage space 1212, whereby the water can circulate between the water storage space 1220 and the temporary storage space 1212. However, it is possible to circulate the water within the water storage space 1220 using the pump 1310 instead of the water transfer pathway 1290, thereby solving problems caused by stagnant water in the water storage space 1220 (for example, scales created on an inner surface of the water storage space 1220).

The cradle 1300 may be placed under the body 1200.

The cradle 1300 may include the pump 1310 therein.

The cradle 1300 may include accommodation recesses 1330 provided with the securing protrusions 1320 at locations corresponding to the outlet and inlet valves 1270, 1280 of the body 1200, and water pipes 1340 that connect the accommodation recesses 1330 to the pump 1310.

The cradle 1300 may further include a power transmitter (not shown) connected to an external power source and having coils for supplying electric power to the sterilizing filter 1100, and separate interconnection wires. The cradle 1300 may recharge a battery (not shown) included in the sterilizing filter 1100, or may turn on the LEDs 1120 of the sterilizing filter 1100 using the power transmitter (not shown).

The cradle 1300 may include a heater (not shown) to heat the water stored in the body 1300.

As described above, the portable water purification system 1000 using UV LEDs according to the embodiment of the invention includes the sterilizing filter 1100, the body 1200, and the cradle 1300. Water, introduced into the temporary storage space 1212 within the body 1200, flows into the sterilizing filter 1100 by gravity. The sterilizing filter 1100 sterilizes protozoa or germs in the water, and then the sterilized water flows into the water storage space 1220 of the body 1200. At this time, the UV LEDs 1120 included in the sterilizing filter 1100 emit UV light to sterilize protozoa or germs filtered by the solid filter 1140. The water stored in the water storage space 1220 is introduced into the pump 1310 of the cradle 1300 through the outlet valve 1270, compressed by the pump 1310, and transferred to the temporary storage space 1212 through the inlet valve 1280 and the water transfer pathway 1290. The portable water purification system 100 using UV LEDs repeats the above operation, whereby the water can be repetitively sterilized while circulating through the temporary storage space 1212, the sterilizing filter 1100, and the water storage space 1220, thereby supplying pure water and storing the water for a long period of time.

FIG. 11 is a sectional view of a portable water purification system using UV LEDs according to another embodiment of the present invention.

FIGS. 12 and 13 are views showing operation of a cradle of the portable water purification system using UV LEDs according to the embodiment of the present invention.

Referring to FIGS. 11 to 13, a portable water purification system 2000 using UV LEDs according to the embodiment of the invention may include a water purification filter 2100, a body 2200, a cradle 2300, and a sterilizing filter 2400.

The water purification filter 2100 may include typical filters, such as membrane filters, ceramic filters, carbon filters, ion filters, or composite filters, which are applied to water purifiers. In addition, the water purification filter 2100 may include the sterilizing filter 1100 according to the embodiment of the invention, which are described with reference to FIGS. 2 to 8.

The water purification filter 2100 can be replaced when its life comes to an end (e.g., when the filter is impaired or expired).

The body 2200 may include an upper end part 2210 including a temporary storage space 2212 and a filter-mounting portion 2214 therein, and a partition wall 2230 for dividing the upper end part 2210 from a water storage space 2220 under the upper end part 2210.

The partition wall 2230 divides the upper end part 2210, which includes the temporary storage space 2212 and the filter-mounting portion 2214, from the water storage space 2220. The temporary storage space 2212 stores water and the water purification filter 2100 is mounted on the filter-mounting portion 2214.

The temporary storage space 2212 for temporarily storing water serves to store water prior to introduction into the sterilizing filter 2100 mounted on the filter-mounting portion 2214.

The temporary storage space 2212 may have a greater inner diameter than the filter-mounting portion 2214, and an intervening space therebetween may have a gradually decreasing inner diameter from the temporary storage space 2212 to the filter-mounting portion 2214. This structure helps water stored in the temporary storage space 2212 to be naturally introduced into the sterilizing filter 2100 by gravity.

In addition, at the outer region of the body 2200, a water outlet 2240 is provided to be connected to the water storage space 2220 and drain the water stored in the water storage space 2220 to the outside.

At an outer region of the body 2200, a handle 225 is provided to be opposite to the water outlet 2240.

A body cover 2260 may be provided at an upper portion of the temporary storage space 2212 of the body 2200 to cover the body 1200 to protect the interior of the body 2200 from external environments.

A circulative water inlet 2262 may be provided at a predetermined region of the body cover 2260. A cover (not shown) may be placed on the circulative water inlet 2262. The circulative water inlet 2262 may be closed when water is not circulated by a pump 2330 and be open during circulation of water to allow water sterilized in the sterilizing filter 2400 to flow into the temporary storage space 2212.

At a bottom of the body 2200, an outlet valve 2270 may be provided to connect the water storage space 2220 of the body 2200 to the cradle 2300.

When the body 2100 is mounted on the cradle 2300 as shown in FIG. 11, the outlet valve 2270 is open to serve as an inlet to allow the water in the water storage space 2220 to flow into the pump 2330.

The outlet valve 2270 may include a valve guide 2272, a rubber packing 2274, and a restoring member 2276.

When the body 2200 is mounted on the cradle 2300, a securing protrusion 2340 of the cradle 2300 presses the restoring member 2276 so that the valve guides 2272 and the rubber packing 2274 are separated from each other, thereby opening the outlet valve 2270. In contrast, when the body 2200 is detached from the cradle 2300, the securing protrusion 2340 of the cradle 2300 and the restoring member 2276 are separated from each other so that the rubber packing 2274 closely contacts the valve guide 2272 by restoring force of an elastic member, for example, a spring, of the restoring member 2276, thereby closing the outlet valve 2270.

The outlet valve 2270 is connected to the water storage space 2220 of the body 2200 at one end and to the pump 2330 at the other end.

The cradle 2300 may include a main body 2310 placed under the body 2200 for support and a stand 2320 extending from the main body 2310 to have one end placed above the body 2200.

The main body 2310 may be provided with the pump 2330, and may include an accommodation recess 2350 provided with the securing protrusion 2340 at a location corresponding to the outlet valve 2270 of the body 2200 and a water pipe 2360 that connects the accommodation recess 2350 to the pump 2330.

The main body 2310 may further include a power transmitter (not shown) connected to an external power source and having coils for supplying electric power to the sterilizing filter 2400, and separate interconnection wires. The main body 2310 may recharge a battery (not shown) included in the water purification filter 2100 or the sterilizing filter 2400, or may turn on LEDs of the sterilizing filter 2400 using the power transmitter (not shown).

The main body 2310 may include a heater (not shown) to heat the water stored in the body 2300.

The stand 2320 is provided with the sterilizing filter 2400. The sterilizing filter 2400 is connected to the pump 2330 through the water pipe 2360 and transfers water sterilized by the sterilizing filter 2400 to the temporary storage space 2212 through a water pipe 2370 connected to one end of the stand 2320. The sterilizing filter 2400 will be specifically described below with reference to FIGS. 14 to 22 and thus detailed descriptions thereof are omitted.

A filter opening/closing door 2322 may be provided on one side surface of the stand 2320 to open and close the interior of the stand 2320 for attachment/detachment of the sterilizing filter 2400.

As shown in FIG. 12, the sterilizing filter 2400 may be attached to or detached from the stand 2320 while the filter opening/closing door 2332 is open.

In addition, the stand 2320 may be kept in the least space while being folded through a hinge 2380, as shown in FIG. 11.

The sterilizing filter 2400 uses UV LEDs as will be described below, whereby the stand 2320 may have a significantly small thickness and may be adjusted in thickness, as needed.

As described above, the portable water purification system 2000 using UV LEDs according to the embodiment of the invention includes the water purification filter 2100, the body 2200, the cradle 2300, and the sterilizing filter 2400. Water, introduced into the temporary storage space 2212 within the body 2200, flows into the water purification filter 2100 by gravity. The water purification filter 2100 purifies the water, and the purified water flows into the water storage space 2220 of the body 2200. At this time, at least one filter applied to typical water purifiers or the sterilizing filter 2100 described with reference to FIGS. 1 to 7 may be used as the water purification filter 2100. The water stored in the water storage space 2220 is introduced into the pump 2330 of the cradle 2300 through the outlet valve 2270 and compressed by the pump 2330. The compressed water is sterilized while passing through the sterilizing filter 2400, and then injected through the water pipe 2370 from one end of the stand 2350 to the temporary storage space 2212. The portable water purification system 2000 using UV LEDs repeats the above operation, whereby the water can be repetitively sterilized while circulating through the temporary storage space 2212, the water purification filter 2100, and the water storage space 2220, thereby supplying pure water and storing the water for a long period of time.

FIGS. 14 and 15 are sectional views showing examples of a sterilizing filter of the portable water purification system using UV LEDs according to the embodiment of the present invention. FIG. 15 is a sectional view taken along line A-A' shown in FIG. 14.

FIG. 16 shows another example of a disc shown in FIGS. 14 and 15.

Referring to FIGS. 14 to 16, a sterilizing filter 2400 of the portable water purification system using UV LEDs according to the embodiment of the invention may include a housing 3110, a support member 3120, a plurality of UV LEDs 3130, a protective tube 3140, a plurality of discs 3150, and photocatalyst layers 3160.

The housing 3110 is used to protect the configuration therein. The housing 3110 may include an inlet 3112 for introducing water into the housing 3110 and an outlet 3114 for draining the water from the housing 3110.

The housing 3110 may have a hollow cylindrical or prismatic shape.

The inlet 3112 and the outlet 3114 may be formed on lower and upper surfaces of the housing 3110, respectively, and it is desirable that the inlet 3112 and the outlet 3114 be separated from each other as far as possible. Alternatively, the inlet 3112 and the outlet 3114 may also be placed on a side surface of the housing 3110. This structure helps water to remain in the housing 3110 as long as possible.

The support member 3120 is disposed within the housing 3110 and serves to support the plurality of UV LEDs 3130.

The support member 3120 may have a cylindrical or prismatic shape.

The support member 3120 is not limited to the prismatic shape. Alternatively, the support member 3120 may have a structure in which at least two plates are stacked one above another.

The UV LEDs 3130 may be provided, on a surface of the support member 3120, namely, on a cylindrical surface or prism surface of the support member 3120.

Although shown as a triangular prism having a triangular cross-section in FIGS. 14 and 15, the support member 3120 may have other shapes. The support member 3120 shown in FIGS. 14 and 15 may be formed by coupling three PCBs in a triangular prismatic shape. Although not specifically shown in FIGS. 14 and 15, the support member 3120 may be formed by filling a space among three PCBs with a heat sink (not shown) having a triangular prismatic shape, or by respectively attaching three PCBs to three surfaces of a heat sink (not shown) having a triangular prismatic shape.

In addition, although not specifically shown in FIGS. 14 and 15, on an outer or inner surface of the support member 2130, an electric circuit which electrically connects the UV LEDs 3130 may be provided.

Further, although not specifically shown in FIGS. 14 and 15, at least one end of the support member 3120 may be exposed through the housing 3110, and the electric circuit on the support member 3120 may be connected to an external device through the housing 3110.

The UV LEDs 3130 may emit UV light. The UV LEDs 3130 may include LEDs emitting UV light in the same or various wavelength bands. The UV LEDs 3130 may include LEDs emitting UV light in a wavelength band of 200 nm to 400 nm.

The UV LEDs 3130 may be suitably selected depending upon a state of water purified by the sterilizing filter 2400 of the portable water purification system using UV LEDs according to the embodiment of the invention.

The protective tube 3140 seals the interior components including the UV LEDs 3130 from the outside, particularly, to prevent water flowing into the housing 3110 from contacting the UV LEDs 3130.

The protective tube 3140 may be formed of quartz capable of transmitting UV light emitted from the UV LEDs 3130. The protective tube 3140 may also be formed of other materials having the aforementioned functions including the sealing function and the UV light transmission function.

The discs 3150 may be coupled to an outer surface of the protective tube 3140. Although not shown in FIGS. 14 and 15, the sterilizing filter 2400 may further include a connecting member (not shown) that fastens the discs 3150 to each other while separating the discs 3150 from each other. The connecting member (not shown) may be coupled to the housing 3110 to separate the discs 3150 to have a predetermined distance from each other within the housing 3110, as shown in FIG. 14.

Each of the discs 3150 may have a plurality of through-holes 3152. The through-holes 3152, allowing water to flow therethrough, serves to adjust a flow rate of water within the housing 3110 and provide a complex flow passage of water.

That is, the flow rate of water within the housing 3110 may be controlled by adjusting the diameter of the discs 3150 and the number, size, and location of through-holes 3152 formed in the discs 3150 based on an inner diameter of the housing 3110.

As shown in FIG. 16, each of the discs 3150 may have a plurality of through-holes 3152 such that regions having the through-holes 3152 and regions having no through-holes may be alternately arranged in a circumferential direction.

In addition, the discs 3150 stacked one above another may be arranged such that through-holes of an upper disc are misaligned with those of a lower disc. The structure maximizes a moving distance of water passing through the through-holes 3152 of the discs 3150, controls the flow rate of water, and provides a complex flow passage of water.

The photocatalyst layer 3160 may be formed on one side or the other side of each of the discs 3150. In addition, the photocatalyst layers 3160 may also be formed on surfaces of the through-holes 3152 and an inner surface of the housing 3110. The photocatalyst layers 3160 may be formed on all regions where UV light emitted from the UV LEDs 3130 reaches and water contacts.

The photocatalyst layers 3160 may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, $CdS$, $ZnSCdSe$, $GaP$, $CdTe$, $MoSe_2$, or $WSe_2$.

As described above, the sterilizing filter 2400 of the portable water purification system using UV LEDs according to the embodiment of the invention includes the housing 3110, the support member 3120, the plural UV LEDs 3130, the protective tube 3140, the plural discs 3150, and the photocatalyst layer 3160. Water is introduced into the housing 3130 through the inlet 3112 and flows within the housing 3130. At this time, the flow rate of water is controlled by the discs 3150. At this time, germs or protozoa in the water are sterilized through reaction with the photocatalyst layers 3160 formed on the surface of the discs 3150. Thereafter, the sterilized water is drained from the housing through the outlet 3114.

FIGS. 17 and 18 are sectional views showing another example of the sterilizing filter of the portable water purification system using UV LEDs according to the embodiment of the present invention. FIG. 18 is a sectional view taken along line B-B' shown in FIG. 17.

Referring to FIGS. 17 to 18, a sterilizing filter 2400 of the portable water purification system using UV LEDs according to the embodiment of the invention may include a housing 3210, a support member 3220, a plurality of UV LEDs 3230, a protective tube 3240, a plurality of balls 3250, and photocatalyst layers 3260.

The housing 3210 is used to protect the internal configuration thereof. The housing 3210 may include an inlet 3212 for introducing water into the housing 3210 and an outlet 3214 for draining the water from the housing 3210.

The housing 3210 may have a hollow cylindrical or prismatic shape.

The inlet 3212 and the outlet 3214 may be provided on lower and upper surfaces of the housing 3210, respectively, and it is desirable that the inlet 3212 and the outlet 3214 be separated from each other as far as possible. The inlet 3212 and the outlet 3214 are not limited thereto and may also be placed on a side surface of the housing 3210. This structure helps water to remain in the housing 3210 as long as possible.

The support member 3220 is disposed within the housing 3210 and serves to support the plurality of UV LEDs 3230.

The support member 3220 may have a cylindrical or prismatic shape.

The support member 3220 is not limited to the prismatic shape. Alternatively, the support member 3220 may have a structure in which at least two plates are stacked one above another.

The UV LEDs 3220 may be provided on a surface, namely, on a cylindrical surface or prism surface of the support member 3220.

Although shown as a triangular prism having a triangular cross-section in FIGS. 17 and 18, the support member 3220 may have other shapes. The support member 3220 shown in FIGS. 17 and 18 may be formed by coupling three PCBs in a triangular prismatic shape. Although not specifically shown in FIGS. 17 and 18, the support member 3220 may be formed by filling a space among three PCBs with a heat sink (not shown) having a triangular prismatic shape, or by respectively attaching three PCBs to three surfaces of a heat sink (not shown) having a triangular prismatic shape.

In addition, although not specifically shown in FIGS. 17 and 18, on an outer or inner surface of the support member 3220, an electric circuit which electrically connects the UV LEDs 3230 may be provided.

Further, although not specifically shown in FIGS. 17 and 18, at least one end of the support member 3220 may be exposed through the housing 3210, and the electric circuit on the support member 3220 may be connected to an external device through the housing 3210.

The UV LEDs 3230 may emit UV light. The UV LEDs 3230 may include LEDs emitting UV light in the same or various wavelength bands. The UV LEDs 3230 may include LEDs emitting UV light in a wavelength band of 200 nm to 400 nm.

The UV LEDs 3230 may be suitably selected depending upon a state of water purified by the sterilizing filter 2400 of the portable water purification system using UV LEDs according to the embodiment of the invention.

The protective tube 3240 seals the interior components including the UV LEDs 3230 from the outside, particularly, to prevent water flowing into the housing 3210 from contacting the UV LEDs 3230.

The protective tube 3240 may be formed of quartz capable of transmitting UV light emitted from the UV LEDs 3230. The protective tube 3240 may also be formed of other materials having the aforementioned functions including the sealing function and the UV light transmission function.

The balls 3250 may be disposed within the housing 3210, namely, between the housing 3210 and the protective tube 3240. Although not shown in FIGS. 17 and 18, the sterilizing filter 2400 may further include a cylindrical casing (not shown) inserted between the housing 3210 and the protective tube 3240 and confining the balls 3250 within a predetermined region. The cylindrical casing (not shown) may have a plurality of holes for allowing water to penetrate thereinto.

The housing 3210 may not be completely filled with the balls 3250. That is, when water is introduced into the housing 3210, the balls 3250 may move along with the water within the housing 3210.

The flow rate of water within the housing 3210 may be controlled by adjusting the size, shape, and number of balls 3250. In addition, the balls 3250 serve to provide a complex flow passage of water.

The balls 3250 may be composed of ceramic balls, resin balls, or combinations thereof. In addition, the balls 3250 may be formed of a material constituting the photocatalyst layers 3260.

The photocatalyst layers 3260 may be coated on surfaces of the balls 3250.

The photocatalyst layers 3260 may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, $CdS$, $ZnSCdSe$, $GaP$, $CdTe$, $MoSe_2$, or $WSe_2$.

As described above, the sterilizing filter 2400 of the portable water purification system using UV LEDs according to the embodiment of the invention includes the housing 3210, the support member 3220, the plural UV LEDs 3230, the protective tube 3240, the plural balls 3250, and the photocatalyst layers 3260. Water is introduced into the housing 3210 through the inlet 3212 and flows within the housing 3210. At this time, the water flows within the housing 3210 along with the balls 3250. At this time, germs or protozoa in the water are sterilized through reaction with the photocatalyst layers 3160 formed on the surfaces of the balls 3150. Thereafter, the sterilized water is drained from the housing through the outlet 3214.

FIGS. 19 and 20 are sectional views showing a further example of the sterilizing filter of the portable water purification system using UV LEDs according to the embodiment of the present invention. FIG. 20 is a sectional view taken along line C-C' shown in FIG. 19.

Referring to FIGS. 19 to 20, a sterilizing filter 2400 of the portable water purification system using UV LEDs according to the embodiment of the invention may include a housing 3310, a support member 3320, a plurality of UV LEDs 3330, a protective tube 3340, an inner cylinder 3350, and a photocatalyst layer 3360.

The housing 3310 is used to protect the internal configuration of the housing 3310. The housing 3310 may include an inlet 3312 for introducing water into the housing 3310 and an outlet 3314 for draining the water from the housing 3310.

The housing 3310 may have a hollow cylindrical or prismatic shape.

The inlet 3312 and the outlet 3314 may be provided on lower and upper surfaces of the housing 3310, respectively, and it is desirable that the inlet 3312 and the outlet 3314 be separated from each other as far as possible. The positions of the inlet 3312 and the outlet 3314 are not limited to the lower and upper surfaces of the housing 3310 and may also be placed on a side surface of the housing 3310. This structure of the inlet 3312 and the outlet 3314 helps water to remain in the housing 3310 as long as possible.

The support member 3320 is disposed within the housing 3310 and serves to support the plurality of UV LEDs 3330.

The support member 3320 may have a cylindrical or prismatic shape.

The support member 3320 is not limited to the prismatic shape. Alternatively, the support member 3320 may have a structure in which at least two plates are stacked one above another.

The UV LEDs 3330 may be provided on a surface, namely, on a cylindrical surface or prism surface of the support member 3320.

Although shown as a triangular prism having a triangular cross-section in FIGS. 19 and 20, the support member 3320 may have other shapes. The support member 3320 shown in FIGS. 19 and 20 may be formed by coupling three PCBs in a triangular prismatic shape. Although not specifically shown in FIGS. 19 and 20, the support member 3320 may be formed by filling a space among three PCBs with a heat sink (not shown) having a triangular prismatic shape, or by respectively attaching three PCBs to three surfaces of a heat sink (not shown) having a triangular prismatic shape.

In addition, although not specifically shown in FIGS. 19 and 20, on an outer or inner surface of the support member 3320, an electric circuit which electrically connects the UV LEDs 3330 may be provided.

Further, although not specifically shown in FIGS. 19 and 20, at least one end of the support member 3320 may be exposed through the housing 3310, and the electric circuit on the support member 3320 may be connected to an external device through the housing 3310.

The UV LEDs 3330 may emit UV light. The UV LEDs 3330 may include LEDs emitting UV light in the same or various wavelength bands. The UV LEDs 3330 may include LEDs emitting UV light in a wavelength band of 200 nm to 400 nm.

The UV LEDs 3330 may be suitably selected depending upon a state of water purified by the sterilizing filter 2400 of the portable water purification system using UV LEDs according to the embodiment of the invention.

The protective tube 3340 seals the interior components including the UV LEDs 3330 from the outside, particularly, to prevent water flowing into the housing 3310 from contacting the UV LEDs 3330.

The protective tube 3340 may be formed of quartz capable of transmitting UV light emitted from the UV LEDs 3330. The protective tube 3340 may also be formed of other materials having the aforementioned functions including the sealing function and the UV light transmission function.

The inner cylinder 3350 may be disposed between the protective tube 3340 and the housing 3310. The both ends of the inner cylinder 3350 may be coupled to the housing 3310.

Although not shown in FIGS. 19 and 20, on a surface of the inner cylinder 3350, a plurality of penetration holes (not shown) similar to the through-holes 3352 described with reference to FIGS. 14 and 15 may be formed. That is, when the inner cylinder 3350 has the penetration holes (not shown) formed on the surface of the inner cylinder 3350, water flows between the inner cylinder 3350 and the protective tube 3340, whereas when the inner cylinder 3350 does not have the penetration holes (not shown), water flows between the inner cylinder 3350 and the housing 3310. In addition, the inner cylinder 3350 serves to provide a complex flow passage of water through penetration holes (not shown) formed on the surface of the inner cylinder 3350.

The photocatalyst layer 3360 may be formed on an outer surface of the inner cylinder 3350. When water flows between the inner cylinder 3350 and the protective tube 3340 due to the penetration holes (not shown) on the surface of the inner cylinder 3350, the photocatalyst layer 3360 may also be formed on the inner surface of the inner cylinder 3350, or the surface of the protective tube 3340.

The photocatalyst layer 3360 may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, $CdS$, $ZnSCdSe$, $GaP$, $CdTe$, $MoSe_2$, or $WSe_2$.

As described above, the sterilizing filter 2400 of the portable water purification system using UV LEDs according to the embodiment of the invention includes the housing 3310, the support member 3320, the plural UV LEDs 3330, the protective tube 3340, the inner cylinder 3350, and the photocatalyst layer 3360. Water is introduced into the housing 3310 through the inlet 3312 and flows within the housing 3310. At this time, germs or protozoa in the water are sterilized through reaction with the photocatalyst layer 3360 formed on the surface of the inner cylinder 3350. Thereafter, the sterilized water is drained from the housing 3310 through the outlet 3314.

FIGS. 21 and 22 are sectional views showing yet another example of the sterilizing filter of the portable water purification system using UV LEDs according to the embodiment of the present invention. FIG. 22 is a sectional view taken along line D-D' shown in FIG. 21.

Referring to FIGS. 21 to 22, a sterilizing filter 2400 of the portable water purification system using UV LEDs according to the embodiment of the invention may include a housing 3410, a support member 3420, a spiral blade 3430, a plurality of UV LEDs 3440, a protective cover 3450, a photocatalyst layer 3360, and a drive unit 3470.

The housing 3410 is used to protect the internal configuration of the housing 3410. The housing 3410 may include an inlet 3412 for introducing water into the housing 3410 and an outlet 3414 for draining the water from the housing 3410.

The housing 3410 may have a hollow cylindrical or prismatic shape.

The inlet 3412 and the outlet 3414 may be provided on lower and upper surfaces of the housing 3410, respectively, and it is desirable that the inlet 3412 and the outlet 3414 be separated from each other as far as possible. The positions of the inlet 3412 and the outlet 3414 are not limited to lower and upper surfaces of the housing 3410 and may also be placed on a side surface of the housing 3410. This structure of the inlet 3312 and the outlet 3314 helps water to remain in the housing 3410 as long as possible.

The support member 3420 is disposed within the housing 3410 and serves to support the spiral blade 3430.

That is, as shown in FIGS. 21 and 22, the support member 3420 is coupled at least one end 3432 or 3434 of the spiral blade 3430, whereby the support member 3420 may serve to place the spiral blade 3430 within the housing 3410. In addition, although not shown in FIGS. 21 and 22, the support member 3420 may be coupled at an inner edge of the spiral blade 3430.

Further, although not specifically shown in FIGS. 21 and 22, on the surface or inside of the support member 3420, an electric circuit electrically connected to the LEDs 3440 may be provided, and at least one end of the support member 3420 may be exposed through the housing 3410, whereby the electric circuit on the support member 3420 may be connected to an external device through the housing 3410.

The support member 3420 may be omitted when the spiral blade 3430 is directly coupled to the housing 3410 as will be described below.

The spiral blade 3430 may have a shape such as a screw shape, namely, a shape of a blade twisted in spiral form from an upper end to a lower end of the housing 3410.

As shown in FIGS. 21 and 22, the inner edge of the spiral blade 3430 may not be coupled to the support member 3420, namely, may be separated from the support member 3420. Alternatively, although not shown in FIGS. 21 and 22, the inner edge of the spiral blade 3430 may be coupled to the support member 3420.

As shown in FIGS. 21 and 22, at least one end 3432 or 3434 of the spiral blade 3430 is coupled to the support member 3420, whereby the spiral blade 3430 may be supported by the support member 3420. In addition, although not shown in FIGS. 21 and 22, the support member 3420 may be omitted, and at least one end 3432 or 3434 of the spiral blade 3430 may be coupled to the inner surface of the housing 3410, whereby the spiral blade 3430 may be supported by the housing 3410.

Although not shown in FIGS. 21 and 22, on one surface or an opposite surface of the spiral blade 3430, an electric circuit that electrically connects the LEDs 3440 may be provided, and the electric circuit of the spiral blade 3430 may be connected to a device external to the housing 3410.

The spiral blade 3430 may have the UV LED 3440 mounted on one surface of the spiral blade 3430. The protective cover 3450 may cover the surface of the spiral blade 3430 where the UV LEDs 3440 are mounted, and the photocatalyst layer 3460 may be formed on the other surface of the spiral blade 3430.

The spiral blade 3430 serves to control the flow rate of water within the housing 3410 and provide a complex flow passage of water.

The UV LEDs 3440 may emit UV light. The UV LEDs 3440 may include LEDs emitting UV light in the same or various wavelength bands. The UV LEDs 3440 may include LEDs emitting UV light in a wavelength band of 200 nm to 400 nm.

The UV LEDs 3440 may be suitably selected depending upon a state of water purified by the sterilizing filter 2400 of the portable water purification system using UV LEDs according to the embodiment of the invention.

The protective cover 3450 may serve to seal the UV LEDs 3440 from the outside by covering the surface of the spiral blade 3430 on which the UV LEDs 3440 are mounted, and to prevent water flowing within the housing 3410 from contacting the UV LEDs 3440.

The protective cover 3450 may be formed of quartz capable of transmitting UV light emitted from the UV LEDs 3440. The protective cover 3450 may also be formed of other materials having the aforementioned functions including the sealing function and the UV light transmission function.

The photocatalyst layer 3460 may be formed on the other surface of the spiral blade 3430. That is, due to the spiral form of the blade 3430, the photocatalyst layer 3460 may be formed on the other surface of the spiral blade 3430 which receives UV light emitted from the UV LEDs 3440 mounted on one surface of the spiral blade 3430.

The photocatalyst layer 3460 may be formed of at least one of $TiO_2$, $ZnO$, $Nb_2O_5$, $SnO_2$, $ZrO_2$, $SrTiO_3$, $KTaO_3$, $N_1\text{-}K_4Nb_6O_{17}$, $CdS$, $ZnSCdSe$, $GaP$, $CdTe$, $MoSe_2$, or $WSe_2$.

The drive unit 3470 may be disposed outside the housing 3410 as shown in FIG. 21, or inside the housing 3410, although not shown in FIG. 21. The drive unit 3470 may be connected to the support member 3420 or the spiral blade 3430. The drive unit 3470 may be a rotator that rotates the support member 3420 or the spiral blade 3430, or a vibrator that vibrates the support member 3420 or the spiral blade 3430.

The drive unit 3470 may rotate or vibrate the support member 3420 or the spiral blade 3430 to control the flow rate of water or increase contact time of water, thereby enhancing sterilization efficiency.

The drive unit 3470 may control a rotating direction, the number of revolutions, or a frequency of the support member 3420 or the spiral blade 3430 according to time.

As described above, the sterilizing filter 2400 of the portable water purification system using UV LEDs according to the embodiment of the invention includes the housing 3410, the support member 3420, the spiral blade 3430, the plural UV LEDs 3440, the protective cover 3450, and the photocatalyst layer 3460. Water is introduced into the housing 3410 through the inlet 3412 and flows within the housing 3410. At this time, germs or protozoa in the water are sterilized by reaction of the photocatalyst layer 3460 formed on the other surface of the spiral blade 3430 with UV light emitted from the UV LEDs 3440 mounted on one surface of the spiral blade 3430. Thereafter, the sterilized water is drained from the housing 3410 through the outlet 3414.

FIG. 23 is a sectional view of a portable water purification system using UV LEDs according to yet another embodiment of the present invention.

Referring to FIG. 23, a portable water purification system 4000 using UV LEDs according to the embodiment of the invention may include a main body 4110, a partition wall 4120, a main-body internal space 4130, a water purification filter 4140, a plurality of UV LEDs 4150, a photocatalyst layer 4160, a protective cover 4170, and a peripheral device 4180.

The main body 4110 may include a body 4112, a water outlet 4114, a handle 4116, and a main-body cover 4118.

The partition wall 4120 may include first to third partition walls 4122, 4124, and 4126.

The main-body internal space 4130 may include a temporary storage space 4132, a filter mounting space 4134, and a water storage space 4136.

The peripheral device 4180 may include a power source 4182, a controller 4184, a display and manipulation unit 4186, and an alarm LED 4188.

The main body 4110 has the main-body internal space 4130 defined inside of the main body 4110, and may include the water outlet 4114 at a location on an outer surface of the main body 4110, the handle 4116 at another location on the outer surface of the main body 4110, and the main-body cover 4118 that protects the main-body internal space 4130 from external environments.

For user convenience, the water outlet 4114 and the handle 4116 may be placed opposite each other on the outer surface of the body 4112.

The water outlet 4114 is connected to the main-body internal space 4130, particularly, to the water storage space 4136 of the main-body internal space 4130 such that water stored in the water storage space 4136 can be drained through the water outlet 4114.

Although not specifically shown in FIG. 23, the main-body cover 4118 may be detachably coupled to the main body 4110, or coupled to the handle 4116 through a hinge.

The partition wall 4120 is disposed within the main body 4110 and may divide the main-body internal space 4130 into the temporary storage space 4132, the filter mounting space 4134, and the water storage space 4136. Particularly, the partition wall 4120 may divide the water storage space 4136 from the temporary storage space 4132 and the filter mounting space 4134.

The first and second partition walls 4122, 4124 define the temporary storage space 4132 and the third partition wall 4126 defines the filter mounting space 4134. The partition wall 4120 including the first to third partition walls 4122, 4124 and 4126 defines a lower region of the main-body internal space 4130 as the water storage space 4136 by dividing the water storage space 4136 from the temporary storage space 4132 and the filter mounting space 4134.

In other words, the first partition wall 4122 may refer to a portion of the partition wall 4120 corresponding to the temporary storage space 4132 for storing water supplied by a user, the second partition wall 4124 may refer to a portion of the partition wall 4120 corresponding to a portion of the temporary storage space 432 obliquely formed to allow the water to be easily introduced into the water purification filter 4140 by gravity, and the third partition wall 4126 may refer to a portion of the partition wall 4120 corresponding to the filter mounting space 4134 in which the water purification filter 4140 is placed.

Alternatively, the second partition wall 4124 may be formed horizontally.

The third partition wall 4126 may have a plurality of openings 4128 through which water purified in the water purification filter 4140 flows into the water storage space 4136. The openings 4128 may be formed at the lowest location of the third partition wall 4126, namely, in a bottom surface of the third partition wall 4126, without being limited thereto. The water purification filter 4140 may be disposed in the filter mounting space 4134.

The water purification filter 4140 may purify water supplied from the temporary storage space 4132 and supply the purified water to the water storage space 4136.

The water purification filter 4140 may serve to remove foreign matter from the water supplied from the temporary storage space 4132.

The water purification filter 4140 may include typical filters, such as membrane filters, ceramic filters, carbon filters, ion exchange resins, ion filters, or composite filters, applied to water purifiers.

The plural UV LEDs 4150 may be mounted on an inner surface of the main-body cover 4118.

The UV LEDs 4150 may be two-dimensionally arranged on the inner surface of the main-body cover 4118. That is, although not specifically shown in FIG. 23, the main-body cover 4118 may have a circular inner surface, and the UV LEDs 4150 may be arranged in two dimensions, preferably in a circular shape on the inner surface of the main-body cover 4118.

Although not shown in FIG. 23, the UV LEDs 4150 may be mounted on a PCB (not shown). The PCB (not shown) may include an electric circuit that electrically connects the UV LEDs 4150 in series or parallel, and an electrical circuit or interconnection wires that electrically connect the power source 4182, the controller 4184, the display and manipulation unit 4186, and the alarm LED 4188.

The UV LEDs 4150 may emit UV light. The UV LEDs 4150 may include LEDs emitting UV light in the same or various wavelength bands. The UV LEDs 4150 may include LEDs emitting UV light in a wavelength band of 200 nm to 400 nm.

The photocatalyst layer 4160 may be formed on an inner surface of the partition wall 4120, preferably on an inner surface of a portion of the partition wall 4120 corresponding to the temporary storage space 4132. In addition, the photocatalyst layer 4160 may be formed on the inner surface of the partition wall 4160, preferably on a region that receives UV light emitted from the UV LEDs 4150, that is, on inner surfaces of the first and second partition walls 4122, 4124. In other words, the photocatalyst layer 4160 may be formed on an inner surface of at least a portion of the partition wall 4120 corresponding to the temporary storage space 4132.

Alternatively, the photocatalyst layer 4160 may be restrictively formed on the inner surface of the partition wall contacting water in the temporary storage space 4132.

The photocatalyst layer 4160 may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, $CdS$, $ZnSCdSe$, $GaP$, $CdTe$, $MoSe_2$, or $WSe_2$.

The protective cover 4170 may be provided to protect the UV LEDs 4150, namely, to seal the UV LEDs 4150 from water.

The protective cover 4170 may be formed of a light-transmitting material, for example, quartz, capable of transmitting UV light emitted from the UV LEDs 4150.

The protective tube 4170 may be formed of other materials having the aforementioned functions including the sealing function and the UV light transmission function.

Although not shown in FIG. 23, the protective cover 4170 may have a recess (not shown) formed on one surface of the main-body cover 4118 and the UV LEDs 4150 provided on the surface of the recess (not shown). That is, the protective cover 4170 may be provided in the form of a flat plate coplanar with the inner surface of the main-body cover 4118 which has no recess (not shown).

The protective cover 4170 may be omitted. For example, the protective cover 4170 may be omitted from a structure in which the UV LEDs 4150 are sealed by packaging using a material, for example, quartz, having the sealing function and the UV light transmission function in fabrication of the UV LEDs 4150. In addition, the protective cover 4170 may be omitted by individually or collectively coating and sealing the UV LEDs 4150 using.

The peripheral device 4180 may include the power source 4182, the controller 4184, the display and manipulation unit 4186, and the alarm LED 4188.

The peripheral device 4180 may be disposed on an inner or outer surface of the main-body cover 4118.

The power source 4182 may be disposed on an inner or outer surface of the main-body cover 4118.

The power source 4182 may include a battery such as a secondary cell or a circuit configuration electrically connected to an external power source.

The controller 4184 may be electrically connected to the UV LEDs 4150, the power source 4182, the display and manipulation unit 4186, and the alarm LED 4188. The controller 4184 may receive electric power from the power source 4182 and control the display and manipulation unit 4186 to process or display signals that are input through the display and manipulation unit 4186. In addition, the controller may control the UV LEDs 4150 and the alarm LED 4188.

The controller 4184 may include a microcomputer and a control circuit. In addition, although not specifically shown in FIG. 23, the controller 4184 may further include a memory that stores data for controlling the UV LEDs 4150. The controller 4184 may control overall operation of the portable water purification system 4000 using UV LEDs according to the embodiment of the invention and may store information.

The display and manipulation unit 4186 may be electrically connected to the controller 4184, and although not specifically shown in FIG. 23, may include a manipulation unit including a plurality of manipulation buttons through which a user inputs signals, and a display unit for displaying information.

The display unit may include a touchscreen such that information can be displayed and input therethrough.

Through the manipulation unit, it is possible to instruct the UV LEDs 4150 to operate, input operating time, or control the UV LEDs 4150.

The alarm LED 4188 may be electrically connected to the controller 4184 and may display an operating state of the portable water purification system 4000 using UV LEDs according to the embodiment of the invention, for example, an operating state of the UV LEDs 4150.

The alarm LED 4188 may include at least one LED and display the operating state with at least one color.

As described above, the portable water purification system 4000 using UV LEDs according to the embodiment of the invention may include the main body 4110, the partition wall 4120, the main-body internal space 4130, the water purification filter 4140, the plural UV LEDs 4150, the photocatalyst layer 4160, the protective cover 4170, and the peripheral device 4180. After a user pours water into the temporary storage space 4132 of the main-body internal space 4130, the UV LEDs 4150 emit UV light according to a user input signal through the display and manipulation unit 4186 of the peripheral device 4180, or settings stored in the controller 4184. The photocatalyst layer 4160 formed on the region of the partition wall 4120 corresponding to the temporary storage space 4132 sterilizes the water stored in the temporary storage space 4132 through reaction with UV light. The sterilized water is introduced into the water purification filter 4140 by gravity, purified in the water purification filter 4140, and stored in the water storage space 4136 of the main-body internal space 4130. Then, a user can drink and use the water stored in the water storage space 4136.

FIG. 24 is a sectional view of a portable water purification system using UV LEDs according to yet another embodiment of the present invention.

Referring to FIG. 24, a portable water purification system 4001 using UV LEDs according to the embodiment of the invention may include a main body 4210, a partition wall 4220, a main-body internal space 4230, a water purification filter 4240, a plurality of UV LEDs 4250, a sealing cover 4260, a photocatalyst layer 4270, and a peripheral device 4280.

The main body 4210 may include a body 4212, a water outlet 4214, a handle 4216, and a main-body cover 4218.

The partition wall 4220 may include first to third partition walls 4222, 4224, and 4226.

The main-body internal space 4230 may include a temporary storage space 4232, a filter mounting space 4234, and a water storage space 4236.

The peripheral device 4280 may include a power source 4282, a controller 4284, a display and manipulation unit 4286, and an alarm LED 4288.

The main body 4210 has the main-body internal space 4230 defined inside of the main body 4210, and may include the water outlet 4214 at a location on an outer surface of the main body 4210, the handle 4216 at another location on the outer surface of the main body 4210, and the main-body cover 4230 that protects the main-body internal space 4218 from external environments.

For user convenience, the water outlet 4214 and the handle 4216 may be placed to be opposite each other on the outer surface of the body 4212.

The water outlet 4214 is connected to the main-body internal space 4230, particularly, to the water storage space 4230 of the main-body internal space 4236 such that water stored in the water storage space 4236 can be drained through the water outlet 4214.

Although not specifically shown in FIG. 24, the main-body cover 4218 may be detachably coupled to the main body 4210, or coupled to the handle 4216 through a hinge.

The partition wall 4220 is disposed within the main body 4210 and may divide the main-body internal space 4230 into the temporary storage space 4232, the filter mounting space 4234, and the water storage space 4236. Particularly, the partition wall 4220 may divide the water storage space 4236 from the temporary storage space 4232 and the filter mounting space 4234.

The first and second partition walls 4222, 4224 defines the temporary storage space 4232 and the third partition wall 4226 defines the filter mounting space 4234. The partition wall 4220 including the first to third partition walls 4222, 4224, 4226 defines a lower region of the main-body internal space 4230 as the water storage space 4236 by dividing the water storage space 4236 from the temporary storage space 4232 and the filter mounting space 4234.

In other words, the first partition wall 4222 may refer to a portion of the partition wall 4220 corresponding to the temporary storage space 4232 for storing water supplied by a user, the second partition wall 4224 may refer to a portion of the partition wall 4220 corresponding to a portion of the temporary storage space 4232 obliquely formed to allow the water to be easily introduced into the water purification filter 4240 by gravity, and the third partition wall 4226 may refer to a portion of the partition wall 4220 corresponding to the filter mounting space 4234 in which the water purification filter 4240 is placed.

Alternatively, the second partition wall 4224 may be formed horizontally.

The third partition wall 4226 may have a plurality of openings 4228 through which water purified in the water purification filter 4240 flows into the water storage space 4236. The openings 4228 may be formed at the lowest location of the third partition wall 4226, namely, in a bottom surface of the third partition wall 4226, but is not limited thereto.

The partition wall 4220, particularly, the first partition wall 4222 corresponding to the temporary storage space 4232 may be separated by a predetermined distance from an inner surface of the body 4212 to form a space 4238 therebetween.

At least a portion of the partition wall 4220 may be formed of a light-transmitting material capable of transmitting UV light emitted from the UV LEDs 4250. Among the partition wall 4220, the first partition wall 4222 corresponding to the temporary storage space 4232 may be formed of a light-transmitting material.

This is because the UV LEDs 4250 are arranged in the space 438 and UV light emitted from the UV LEDs 4250 passes through the first partition wall 4222 as will be described below.

The light-transmitting material may include quartz having high UV transmittance, but can include other materials as well.

In FIG. 24, since the partition wall 4220 is constructed as a single body, the entirety of the partition wall 4220 is formed of the light-transmitting material. However, the first partition wall 4222 or the first and second partition walls 4222 and 4224 may be detachably coupled to the rest of the partition wall 4220. In this case, the first or second partition wall 4222 or 4224 may be formed of the light-transmitting material and the rest of the partition wall 4220 may be formed of other materials.

The water purification filter 4240 may be disposed in the filter mounting space 4234. The water purification filter 4232 may purify water supplied from the temporary storage space 4232 and supply the purified water to the water storage space 4236.

The water purification filter 4240 may serve to remove foreign matter from the water supplied from the temporary storage space 4232.

The water purification filter 4240 may include typical filters, such as membrane filters, ceramic filters, carbon filters, ion exchange resins, ion filters, or composite filters, applied to water purifiers.

The plural UV LEDs 4250 may be arranged in the space 4238 between the inner surface of the body 4212 and the first partition wall 4222, preferably on the inner surface of the body 4212 within the space 4238.

The UV LEDs 4250 may be two-dimensionally arranged on the inner surface of the body 4212.

Although not shown in FIG. 24, the UV LEDs 4250 may be mounted on a PCB (not shown). The PCB (not shown) may include an electric circuit that electrically connects the UV LEDs 4250 in series or parallel, and an electrical circuit or interconnection wires that electrically connect the power source 4282, the controller 4284, the display and manipulation unit 4286, and the alarm LED 4288.

The UV LEDs 4250 may emit UV light. The UV LEDs 4250 may include LEDs emitting UV light in the same or various wavelength bands. The UV LEDs 4250 may include LEDs emitting UV light in a wavelength band of 200 nm to 400 nm.

The sealing cover 4260 may be provided to protect the UV LEDs 4250, namely, to seal the UV LEDs 4150 from water.

The sealing cover 4260 may be interposed between the partition wall 4220 and the body 4212 to seal the space 4238. At the same time, the sealing cover 4260 may support the entirety of the partition wall 4220 including the first partition wall 4222 separated from the body 4212.

The photocatalyst layer 4270 may be formed on an inner surface of the partition wall 4220, preferably on an inner surface of the partition wall 4220 corresponding to the temporary storage space 4232. The photocatalyst layer 4270 may be formed on a region that receives UV light emitted from the UV LEDs 4250, particularly, on an inner surface of the first partition wall 4222, and may also be formed on an inner surface of the second partition wall 4224 as shown in FIG. 24.

Alternatively, the photocatalyst layer 4270 may be restrictively formed on the inner surface of the partition wall contacting water in the temporary storage space 4232.

The photocatalyst layer 4270 may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, CdS, ZnSCdSe, GaP, CdTe, $MoSe_2$, or $WSe_2$.

The peripheral device 4280 may include the power source 4282, the controller 4284, the display and manipulation unit 4286, and the alarm LED 4288.

The peripheral device 4280 may be provided on an inner or outer surface of the sealing cover 4270.

The power source 4282 may be disposed on an inner or outer surface of the main-body cover 4218.

The power source 4282 may include a battery such as a secondary cell or a circuit configuration electrically connected to an external power source.

The controller 4284 may be electrically connected to the UV LEDs 4250, the power source 4282, the display and manipulation unit 4286, and the alarm LED 4288. The controller 4284 may receive electric power from the power source 4282 and control the display and manipulation unit 4286 to process or display signals that are input therethrough. In addition, the controller 4284 may control the UV LEDs 4250 and the alarm LED 4288.

The controller 4284 may include a microcomputer and a control circuit. In addition, although not specifically shown in FIG. 24, the controller 4284 may further include a memory that stores data for controlling the UV LEDs 4250. The controller 4284 may control overall operation of the portable water purification system 4001 using UV LEDs according to the embodiment of the invention and may store information.

The display and manipulation unit 4286 may be electrically connected to the controller 4284, and although not specifically shown in FIG. 24, may include a manipulation unit including a plurality of manipulation buttons through which a user inputs signals, and a display unit for displaying information.

The display unit may include a touchscreen for inputting and displaying information.

Through the manipulation unit, it is possible to instruct the UV LEDs 4250 to operate, input operating time, or control the UV LEDs 4250.

The alarm LED 4288 may be electrically connected to the controller 4284 and display an operating state of the portable water purification system 4001 using UV LEDs according to the embodiment of the invention, for example, an operating state of the UV LEDs 4250.

The alarm LED 4288 may include at least one LED and display the operating state with at least one color.

As described above, the portable water purification system 4001 using UV LEDs according to the embodiment of the invention may include the main body 4210, the partition wall 4220, the main-body internal space 4230, the water purification filter 4240, the plural UV LEDs 4250, the sealing cover 4260, the photocatalyst layer 4270, and the peripheral device 4280. After a user pours water into the temporary storage space 4232 of the main-body internal space 4230, the UV LEDs 4250 emit UV light according to a user input signal through the display and manipulation unit 4286 of the peripheral device 4280, or settings stored in the controller 4284. The photocatalyst layer 4270, formed on the region of the partition wall 4220 corresponding to the temporary storage space 4232, sterilizes the water stored in the temporary storage space 4232 through reaction with UV light. The sterilized water is introduced into the water purification filter 4240 by gravity, purified in the water purification filter 4240, and stored in the water storage space 4236 of the main-body internal space 4230. Then, a user can drink and use the water stored in the water storage space 4236.

FIG. 25 is a sectional view of a portable water purification system using UV LEDs according to yet another embodiment of the present invention.

Referring to FIG. 25, a portable water purification system 4003 using LEDs according to the embodiment of the invention may include a main body 4310, a partition wall 4320, a main-body internal space 4330, a water purification filter 4340, a plurality of UV LEDs 4350, a protective cover 4360, a photocatalyst layer 4370, and a peripheral device 4380.

The main body 4310 may include a body 4312, a water outlet 4314, a handle 4316, and a main-body cover 4318.

The partition wall 4320 may include first to third partition walls 4322, 4324, and 4326.

The main-body internal space 4330 may include a temporary storage space 4332, a filter mounting space 4334, and a water storage space 4336.

The peripheral device 4380 may include a power source 4382, a controller 4384, a display and manipulation unit 4386, and an alarm LED 4388.

The main body 4310 has the main-body internal space 4330 defined inside of the main body 4310, and may include the water outlet 4314 at a location on an outer surface of the main body 4310, the handle 4316 at another location on the outer surface of the main body 4310, and the main-body cover 4318 that protects the main-body internal space 4330 from external environments.

For user convenience, the water outlet 4314 and the handle 4316 may be placed to be opposite each other on the outer surface of the body 4312.

The water outlet 4314 is connected to the main-body internal space 4330, particularly, to the water storage space 4336 of the main-body internal space 4330 such that water stored in the water storage space 4336 can be drained therethrough.

Although not specifically shown in FIG. 25, the main-body cover 4318 may be detachably coupled to the main body 4310, or coupled to the handle 4316 through a hinge.

The partition wall 4320 is disposed within the main body 4310 and may divide the main-body internal space 4330 into the temporary storage space 4332, the filter mounting space 4334, and the water storage space 4336. Particularly, the partition wall 4320 may divide the water storage space 4336 from the temporary storage space 4332 and the filter mounting space 4334.

The first and second partition walls 4322 and 4324 define the temporary storage space 4332 and the third partition wall 4326 defines the filter mounting space 4334. The partition wall 4320 including the first to third partition walls 4322, 4324 and 4326 defines a lower region of the main-body internal space 4330 as the water storage space 4336 by dividing the water storage space 4336 from the temporary storage space 4332 and the filter mounting space 4334.

In other words, the first partition wall 4322 may refer to a portion of the partition wall 4320 corresponding to the temporary storage space 4332 for storing water supplied by a user, the second partition wall 4324 may refer to a portion of the partition wall 4320 corresponding to a portion of the temporary storage space 4332 obliquely formed to allow the water to be easily introduced into the water purification filter 4340 by gravity, and the third partition wall 4326 may refer to a portion of the partition wall 4320 corresponding to the filter mounting space 4334 in which the water purification filter 4340 is placed.

Alternatively, the second partition wall 4324 may be formed horizontally.

At least a part of the third partition wall 4326 may have a recess 4338. The recess 4338 may be formed in a region of the third partition wall 4326 having a greater thickness than the rest of the third partition wall 4326. Alternatively, the recess 4338 may be defined by protrusions protruding from the third wall 4326.

The third partition wall 4326 may have a plurality of openings 4328 through which water purified in the water purification filter 4340 flows into the water storage space 4336. The openings 4328 may be formed at the lowest location of the third partition wall 4326, namely, in a bottom surface of the third partition wall 4326. Although not limited, the number, size and location of the openings 4328 may be suitably adjusted to allow the water purified in the water purification filter 4340 to remain in the filter mounting space 4334 as long as possible such that the photocatalyst layer 4370 reacting with UV light emitted from the UV LEDs 4350 can contact the water as long as possible.

The water purification filter 4340 may be disposed in the filter mounting space 4334. The water purification filter 4340 may purify water supplied from the temporary storage space 4332 and supply the purified water to the water storage space 4336.

The water purification filter 4340 may serve to remove foreign matter from the water supplied from the temporary storage space 4332.

The water purification filter 4340 may include typical filters, such as membrane filters, ceramic filters, carbon filters, ion exchange resins, ion filters, or composite filters, applied to water purifiers.

The plural UV LEDs 4350 may be two-dimensionally arranged on an inner surface of the recess 4338 of the third partition wall 4326.

The UV LEDs 4350 may be disposed not only on the inner surface of the recess 4338 but also on the bottom surface of the third partition wall 4326. The UV LEDs 4350 disposed on the bottom surface of the third partition wall 4326 may be omitted.

Although not shown in FIG. 25, the UV LEDs 4350 may be mounted on a PCB (not shown). The PCB (not shown) may include an electric circuit that electrically connects the UV LEDs 4350 in series or parallel, and an electrical circuit or interconnection wires that electrically connect the power source 4382, the controller 4384, the display and manipulation unit 4386, and the alarm LED 4388.

The UV LEDs 4350 may emit UV light. The UV LEDs 4350 may include LEDs emitting UV light in the same or various wavelength bands. The UV LEDs 4350 may include LEDs emitting UV light in a wavelength band of 200 nm to 400 nm.

The protective cover 4360 may be provided to protect the UV LEDs 4350, namely, to seal the UV LEDs 4350 from water.

The protective cover 4360 may seal the recess 4388 of the third partition wall 4326. In addition, when the UV LEDs 4350 are disposed on the bottom surface of the third partition wall 4326, the protective cover 4360 may cover the UV LEDs 4350 on the bottom surface of the third partition wall 4326.

The protective cover 4360 may be formed of a light-transmitting material. The light-transmitting material may include quartz having high UV transmittance, but is not limited thereto.

The protective cover 4360 may be omitted. For example, the protective cover 4360 may be omitted from a structure in which the UV LEDs 4350 are sealed by packaging using a material, for example, quartz, having the sealing function and the UV light transmission function in fabrication of the UV LEDs 4350. In addition, the protective cover 4360 may be omitted by individually or collectively coating and sealing the UV LEDs 4350.

The photocatalyst layer 4370 may be formed on an outer surface of the protective cover 4360. Although not shown in FIG. 25, the photocatalyst layer 4370 may also be formed on an outer surface of the water purification filter 4340.

In addition, the photocatalyst layer 4370 may be formed on a region that receives UV light emitted from the UV LEDs 4350, particularly, on a region adjoining the filter mounting space 4334.

The photocatalyst layer 4370 may be formed of at least one of $TiO_2$, $ZnO$, $Nb_2O_5$, $SnO_2$, $ZrO_2$, $SrTiO_3$, $KTaO_3$, $N_1\text{-}K_4Nb_6O_{17}$, $CdS$, $ZnSCdSe$, $GaP$, $CdTe$, $MoSe_2$, or $WSe_2$.

The peripheral device 4380 may include the power source 4382, the controller 4384, the display and manipulation unit 4386, and the alarm LED 4388.

The peripheral device 4380 may be provided on an inner or outer surface of the protective cover 4360.

The power source 4382 may be disposed on an inner or outer surface of the main-body cover 4318.

The power source 4382 may include a battery such as a secondary cell or a circuit configuration electrically connected to an external power source.

The controller 4384 may be electrically connected to the UV LEDs 4350, the power source 4382, the display and manipulation unit 4386, and the alarm LED 4388. The controller 4384 may receive electric power from the power source 4382 and control the display and manipulation unit 4386 to process or display signals that are input through the display and manipulation unit 4386. In addition, the controller 4384 may control the UV LEDs 4350 and the alarm LED 4388.

The controller 4384 may include a microcomputer and a control circuit. In addition, although not specifically shown in FIG. 25, the controller 4384 may further include a memory that stores data for controlling the UV LEDs 4350. The controller 4384 may control overall operation of the portable water purification system 4003 using UV LEDs according to the embodiment of the invention and may store information.

The display and manipulation unit 4386 may be electrically connected to the controller 4384, and although not specifically shown in FIG. 25, may include a manipulation unit including a plurality of manipulation buttons through which a user inputs signals, and a display unit for displaying information.

The display unit may include a touchscreen such that information can be displayed and input therethrough.

Through the manipulation unit, it is possible to instruct the UV LEDs 4350 to operate, input operating time, or control the UV LEDs 4350.

The alarm LED 4388 may be electrically connected to the controller 4384 and display an operating state of the portable water purification system 4003 using UV LEDs according to the embodiment of the invention, for example, an operating state of the UV LEDs 4350.

The alarm LED 4388 may include at least one LED and display the operating state with at least one color.

As described above, the portable water purification system 4003 according to the embodiment of the invention may include the main body 4310, the partition wall 4320, the main-body internal space 4330, the water purification filter 4340, the plural UV LEDs 4350, the protective cover 4360, the photocatalyst layer 4370, and the peripheral device 4380. After a user pours water into the temporary storage space 4332 of the main-body internal space 4330, the UV LEDs 4350 emit UV light according to a user input signal through the display and manipulation unit 4386 of the peripheral device 4380, or settings stored in the controller 4384. The water in the temporary storage space 4332 is introduced into the water purification filter 4340 by gravity and then purified by the water purification filter 4340. The purified water is sterilized by contact with the photocatalyst layer 4370 reacting with the UV light emitted from the UV LEDs 4350. The sterilized water is stored in the water storage space 4336 and a user can drink or use the water stored in the water storage space 4336.

FIG. 26 is a sectional view of a portable water purification system using UV LEDs according to yet another embodiment of the present invention.

FIG. 27 shows a layout of UV LEDs of the portable water purification system using UV LEDs shown in FIG. 26.

Referring to FIGS. 26 and 27, a portable water purification system 4004 using UV LEDs according to the embodiment of the invention may include a main body 4410, a partition wall 4420, a main-body internal space 4430, a water purification filter 4440, a light-transmitting cover 4450, a photocatalyst layer 4460, a cradle 4470, and a plurality of UV LEDs 4480.

The main body 4410 may include a body 4412, a water outlet 4414, a handle 4416, and a main-body cover 4418.

The partition wall 4420 may include first to third partition walls 4422, 4424, and 4426.

The main-body internal space 4430 may include a temporary storage space 4432, a filter mounting space 4434, and a water storage space 4436.

The cradle 4470 may include a power source 4472, a controller 4474, a display and manipulation unit 4476, and an alarm LED 4478, therein or on surfaces thereof.

The main body 4410 has the main-body internal space 4430 defined inside of the main body 4410, and may include the water outlet 4414 at a location on an outer surface of the main body 4410, the handle 4416 at another location on the outer surface of the main body 4410, and the main-body cover 4418 that protects the main-body internal space 4430 from external environments.

For user convenience, the water outlet 4414 and the handle 4416 may be placed to be opposite each other on the outer surface of the body 4412.

The water outlet 4414 is connected to the main-body internal space 4430, particularly, to the water storage space 4436 of the main-body internal space 4430 such that water stored in the water storage space 4436 can be drained through the water outlet 4414.

Although not specifically shown in FIG. 26, the main-body cover 4418 may be detachably coupled to the main body 4410, or coupled to the handle 4416 through a hinge.

The partition wall 4420 is disposed within the main body 4410 and may divide the main-body internal space 4430 into the temporary storage space 4432, the filter mounting space 4434, and the water storage space 4436. Particularly, the partition wall 4420 may divide the water storage space 4436 from the temporary storage space 4432 and the filter mounting space 4334.

The first and second partition walls 4422, 4424 defines the temporary storage space 4432 and the third partition wall 4426 defines the filter mounting space 4434. The partition wall 4420 including the first to third partition walls 4422, 4424, 4426 defines a lower region of the main-body internal space 4430 as the water storage space 4436 by dividing the water storage space 4436 from the temporary storage space 4432 and the filter mounting space 4434.

In other words, the first partition wall 4422 may refer to a portion of the partition wall 4420 corresponding to the temporary storage space 4432 for storing water supplied by a user, the second partition wall 4424 may refer to a portion of the partition wall 4420 corresponding to a portion of the temporary storage space 4432 obliquely formed to allow the water to be easily introduced into the water purification filter 4440 by gravity, and the third partition wall 4426 may refer to a portion of the partition wall 4420 corresponding to the filter mounting space 4434 in which the water purification filter 4440 is placed.

Alternatively, the second partition wall 4424 may be formed horizontally.

The third partition wall 4426 may include a plurality of openings 4428 through which water purified in the water purification filter 4440 flows into the water storage space 4446. The openings 4428 may be formed at the lowest location of the third partition wall 4426, namely, in a bottom surface of the third partition wall 4426, but is not limited thereto.

The water purification filter 4440 may be disposed in the filter mounting space 4434. The water purification filter 4440 may purify water supplied from the temporary storage space 4432 and supply the purified water to the water storage space 4336.

The water purification filter 4440 may serve to remove foreign matter from the water supplied from the temporary storage space 4432.

The water purification filter 4440 may include typical filters, such as membrane filters, ceramic filters, carbon filters, ion exchange resins, ion filters, or composite filters, applied to water purifiers.

The light-transmitting cover 4450 may be disposed in a region corresponding to an upper end of a depression 4492 formed at the bottom of the body 4412. That is, as shown in FIG. 26, the depression 4492 may have a hollow cylindrical shape having an open upper end to which the light-transmitting cover 4450 is coupled to seal the water storage space 4436.

The light-transmitting cover 4450 may be coupled to a location below the upper end of the depression 4492 such that a pure water retention region 4438 is formed between the light-transmitting cover 4450 and the upper end of the depression 4492. The pure water retention region 4438 serves to allow water, purified by the water purification filter 4440, to remain therein for a while. The purified water kept in the pure water retention region 4438 may be sterilized by reaction of the photocatalyst layer 4460 with UV light emitted from the UV LEDs 4480. Residence time of the purified water in the pure water retention region 4438 can be controlled by adjusting the size of the pure water retention region 4428 or a rate at which water is purified in the water purification filter 4440, thereby controlling sterilization time of the purified water.

The light-transmitting cover 4450 may be formed of a light-transmitting material, for example, quartz, capable of transmitting UV light emitted from the UV LEDs 4480.

The light-transmitting cover 4450 may also be formed of other materials having the aforementioned functions including the sealing function and the UV light transmission function.

The light-transmitting cover 4450 may be separated a gap of 1 mm to 5 mm from the water purification filter 4440, preferably from the bottom surface of the third partition wall 4426. The water purified in the water purification filter 4440 remains in the region between the light-transmitting cover 4450 and the water purification filter 4440, preferably the bottom surface of the third partition wall 4426. The gap therebetween may be determined based on transmittance of UV light emitted from the UV LEDs 4480.

The photocatalyst layer 4460 may be formed on an inner surface of the light-transmitting cover 4450, preferably on the inner surface exposed to the water storage space 4436. In addition, the photocatalyst layer 4460 may be formed on a region, which receives UV light emitted from the UV LEDs 4480, of the inner surface of the light-transmitting cover 4450.

The photocatalyst layer 4460 may be formed of at least one of $TiO_2$, ZnO, $Nb_2O_5$, $SnO_2$, $ZrO_2$, $SrTiO_3$, $KTaO_3$, $N_1$-$K_4Nb_6O_{17}$, CdS, ZnSCdSe, GaP, CdTe, $MoSe_2$, or $WSe_2$.

The cradle 4470 may be placed under the main body 4410.

The cradle 4470 may include a protrusion 4494 corresponding to the depression 4492 of the main body 4410.

The main body 4410 and the cradle 4470 may be provided such that the depression 4492 and the protrusion 4494 correspond to each other and are coupled to each other.

The cradle 4470 may include the power source 4472, the controller 4474, the display and manipulation unit 4476, and the alarm LED 4478.

The power source 4472 may be disposed within the cradle 4470 or on an outer surface of the cradle 4470.

The power source 4472 may include a battery such as a secondary cell or a circuit configuration electrically connected to an external power source.

The controller 4474 may be electrically connected to the UV LEDs 4480, the power source 4472, the display and manipulation unit 4476, and the alarm LED 4478. The controller 4474 may receive electric power from the power source 4472 and control the display and manipulation unit 4476 to process or display signals that are input through the display and manipulation unit 4476. In addition, the controller 4474 may control the UV LEDs 4480 and the alarm LED 4478.

The controller 4474 may include a microcomputer and a control circuit. In addition, although not specifically shown in FIG. 26, the controller 4474 may further include a memory that stores data for controlling the UV LEDs 4480. The controller 4474 may control overall operation of the portable water purification system 4004 using UV LEDs according to the embodiment of the invention and may store information.

The display and manipulation unit 4476 may be electrically connected to the controller 4474, and although not specifically shown in FIG. 26, may include a manipulation unit including a plurality of manipulation buttons through which a user inputs signals, and a display unit for displaying information.

The display unit may include a touchscreen such that information can be displayed and input through the display unit.

Through the manipulation unit, it is possible to instruct the UV LEDs 4476 to operate, input operating time, or control the UV LEDs 4480.

The alarm LED 4478 may be electrically connected to the controller 4474 and display an operating state of the portable water purification system 4004 using UV LEDs according to the embodiment of the invention, for example, an operating state of the UV LEDs 4480.

The alarm LED 4478 may include at least one LED and display the operating state with at least one color.

The plural UV LEDs 4480 may be mounted on an upper surface of the protrusion 4494 of the cradle 4470.

The UV LEDs 4480 may be two-dimensionally arranged on the upper surface of the protrusion 4494. The UV LEDs 4480 may be arranged at locations corresponding to the openings 4428 of the third partition wall 4426 to illuminate the water purified by the water purification filter 4440 as long as possible. That is, as shown in FIG. 27, the protrusion 4494 may have a circular upper surface and the UV LEDs 4480 may be arranged on the upper surface of the protrusion 4494. In this case, the UV LEDs 4480 may be placed directly below the openings 4428 so as to correspond to the openings 4428. Although five UV LEDs 4480 are shown in FIG. 27, more or fewer UV LEDs may be provided.

Although not shown in FIG. 26, the UV LEDs 4480 may be mounted on a PCB (not shown). The PCB (not shown)

may include an electric circuit that electrically connects the UV LEDs 4250 in series or parallel, and an electrical circuit or interconnection wires that electrically connect the power source 4472, the controller 4474, the display and manipulation unit 4476, and the alarm LED 4478.

The UV LEDs 4480 may emit UV light. The UV LEDs 4480 may include LEDs emitting UV light in the same or various wavelength bands. The UV LEDs 4480 may include LEDs emitting UV light in a wavelength band of 200 nm to 400 nm.

As described above, the portable water purification system 4004 using UV LEDs according to the embodiment of the invention may include the main body 4410, the partition wall 4420, the main-body internal space 4430, the water purification filter 4440, the light-transmitting cover 4450, the photocatalyst layer 4460, the cradle 4470, and the plural UV LEDs 4480. After a user pours water into the temporary storage space 4432 of the main-body internal space 4430, the UV LEDs 4480 emit UV light according to a user input signal through the display and manipulation unit 4476 of the cradle 4470, or settings stored in the controller 4474. The water stored in the temporary storage space 4432 is naturally introduced into the water purification filter 4440 by gravity, purified in the water purification filter 4440, and then drained toward the water storage space 4436. Then, while being kept in the pure water retention region 4438, the purified water can be sterilized by the photocatalyst layer 4460 reacting with UV light emitted from the UV LEDs 4480. The sterilized water is stored in the water storage space 4436 and a user can drink or use the water stored in the water storage space 4436.

FIG. 28 shows a portable water purification system using UV LEDs according to the present invention.

Referring to FIG. 28, a portable water purification system 10 using UV LEDs according to the present invention may include a housing 11, a plurality of UV LEDs 12, and a photocatalyst layer 13.

The housing 11 may include an inlet 11*a* for introducing water into the housing 11 and an outlet 11*b* for draining the water from the housing 11.

The plural UV LEDs 12 emit UV light 12*a* incident upon the photocatalyst layer 13.

The photocatalyst layer 13 can sterilize germs or protozoa in water within the housing 11, particularly, in water 14 contacting the photocatalyst layer 13, through reaction with UV light 12*a* emitted from the UV LEDs 12.

The portable water purification system 10 using UV LEDs according to the present invention induces the water 14, introduced through the inlet 11*a*, to contact the photocatalyst layer 13, sterilizes germs or protozoa in the water 14 using the photocatalyst layer 13 reacting with UV light 12*a* for effectively increased contact time, and then drains the sterilized water 14 through the outlet 11*b*.

The portable water purification system 10 according to the present invention includes a sterilizing filter. The sterilizing filter is described above with reference to FIGS. 14 to 22 and thus detailed descriptions thereof are omitted.

FIGS. 29 to 33 are views showing a portable water purification system using UV LEDs according to yet another embodiment of the present invention.

Referring to FIGS. 29 and 33, a portable water purification system 5500 using UV LEDs according to the embodiment of the invention may include a plurality of support members 5510, a plurality of UV LEDs 5520, a first fastening member 5530, a second fastening member 5540, a protective tube 5550, a housing 5560, a photocatalyst layer 5570, and a sealing cover 5580.

The support members 5510 may be substrates, such as PCBs or ceramic substrates, on which the UV LEDs 5520 can be mounted.

In addition, although not specifically shown in FIG. 30, on an outer or inner surface of each of the support members 5510, an electric circuit that electrically connects the UV LEDs 5520 may be provided.

At the ends of each of the support members 5510, first and second fastening protrusions 5512 and 5514 may be provided.

As shown in FIG. 30, the support members 5510 may be fastened to the first and second fastening members 5530 and 5540 to have a prismatic shape, for example, a hexagonal prism, having an empty space or a heat sink therein.

The UV LEDs 5520 may emit UV light. The UV LEDs 5520 may include LEDs emitting UV light in the same or various wavelength bands. The UV LEDs 5520 may include LEDs emitting UV light in a wavelength band of 200 nm to 400 nm.

The UV LEDs 5520 may be suitably selected depending upon a state of water purified by the sterilizing filter 5500 using UV LEDs according to the embodiment of the invention.

The first and second fastening members 5530 and 5540 are fastened to both ends of the support members 5510 to support the support members 5510.

The first and second fastening members 5530 and 5540 may have first and second fastening recesses 5532 and 5542 corresponding to the first and second fastening protrusions 5512 and 5514 of each of the support members 5510, respectively. The first and second fastening protrusions 5512, 5514 of the support members 5510 are fit into the first and second fastening recesses 5532 and 5542 of the first and second fastening members 5530 and 5540, whereby the support members 5510 can be supported by the first and second fastening members 5530 and 5540.

As shown in FIG. 32, at an edge of the first fastening member 5530, a protective tube fastening recess 5534 into which the protective tube 5550 is fitted may be provided. The protective tube 5550 is fastened to and supported by the protective tube fastening recess 5534.

In addition, the first fastening member 5530 may have a first vent-hole 5536 at a central portion of the first fastening member 5530. The first vent-hole 5536 serves as a pathway for introducing external air into the empty space or the heat sink (not shown) within the support members 5510 to discharge heat of the support members 5510, specifically, heat transferred from the UV LEDs 5520 by heat conduction.

The protective tube 5550 may have a cylindrical or prismatic shape. However, the protective tube 5550 can have other shapes. The protective tube 5550 may have a glass test tube shape where one end is open and the other end is closed in the hemispherical shape.

The protective tube 5550 may receive the support members 5510, which are fastened to the first and second fastening members 5530 and 5540 and have the plural UV LEDs 5520 mounted thereon, through the open end of the protective tube 5550.

At the open end of the protective tube 5550, the protective tube 5550 is fitted into the protective fastening recess 5534 of the first fastening member 5530.

The protective tube 5550 serves to protect the interior components including the UV LEDs 5520, and prevent water flowing between the protective tube 5550 and the housing 5560 from contacting the UV LEDs 5520.

The protective tube 5550 may be formed of quartz capable of transmitting UV light emitted from the UV LEDs 5520. The protective tube 5550 may also be formed of other materials having the aforementioned functions including the sealing function and the UV light transmission function.

The protective tube 5550 may be omitted. For example, the protective tube 5550 may be omitted from a structure in which the UV LEDs 5520 are sealed by packaging using a material, for example, quartz, having the sealing function and the UV light transmission function in fabrication of the UV LEDs 5520. In addition, the protective tube 5550 may be omitted by individually or collectively coating and sealing the UV LEDs 5520.

The housing 5560 may include an inlet 5562 for introducing water into the housing 5560 and an outlet 5564 for draining the water from the housing 5560.

The housing 5560 may have a cylindrical or prismatic shape. However, the housing 5560 is not limited thereto and may have a glass test tube shape where one end is open and the other end is closed in the hemispherical shape.

Both the inlet 5562 and the outlet 5564 may be formed on a side surface of the housing 5560, namely, on a side surface of the circular cylinder. Alternatively, the inlet 5562 may also be formed at the other end of the housing 5560 and the outlet 5564 may be formed on a side surface of one end of the housing 5560.

In this case, it is desirable that the inlet 5562 and the outlet 5564 be separated from each other as far as possible. This structure helps water remain in the housing 5560 as long as possible.

As shown in FIGS. 31 and 33, the housing 5560 has a helical groove 5566 formed on an inner surface thereof. The helical groove 5566 may be formed in a helical shape on the inner surface of the housing 5560 from one end of the housing 5560 to which the inlet 5562 is provided to the other end thereof to which the outlet 5564 is provided.

When introduced into the housing through the inlet 5562, water flows along the helical groove 5566 on the inner surface of the housing 5560 from one end to the other end of the housing 5566. Hence, until the water drained through the outlet 5564, the water flows along a flow path longer than the housing 5560, whereby the water can be sterilized while remaining within the housing 5560 for a longer period of time. The helical groove 5566 serves as a feature for providing a complex flow passage of water.

The housing 5560 receives the support members 5510, the UV LEDs 5520, the first and second fastening members 5530, 5540, and the protective tube 5550 therein.

The housing 5560 may be provided on an inner surface at one end thereof with a stopper 5568, an inner diameter of which is the same as an outer diameter of the first fastening member 5530.

That is, as shown in FIG. 31, the housing 5560 has the stopper 5568 at one end thereof to prevent the first fastening member 5530 from being inserted into the housing 5560 to a predetermined depth or more.

In addition, the housing 5560 may have an empty space within the other end portion thereof. That is, the protective tube 5550 may not extend to the other end of the housing 5560. This structure helps water, introduced through the inlet 5562 at one end of the housing 5560, become turbulent within the empty space at the other end of the housing 5560 and thus remain in the housing 5560 for a longer period of time.

Further, although not shown in FIGS. 29 to 33, the housing 5560 may be formed on the outer surface of one end thereof with an external thread (not shown) that allows the sealing cover 5580 to be fastened to the housing 5560.

The protective tube 5550 and the housing 5560 may contact each other or may be separated from each other. That is, the protective tube 5550 may have an outer diameter equal to an inner diameter of the housing 5560, or the protective tube 5550 may have an outer diameter smaller than the inner diameter of the housing 5560, whereby a space (shown in FIG. 31) can be formed between the protective tube 5550 and the housing 5560. This structure may have an influence on the flow path of water introduced into the housing 5560. That is, when an outer surface of the protective tube 5550 contacts an inner surface of the housing 5560, the water can flow only along the helical groove 5566 of the housing 5560, whereas when the protective tube 5550 is separated from the housing 5560, another flow path may be formed therebetween.

The photocatalyst layer 5570 may be formed on the inner surface of the housing 5560, the surface of the helical groove 5566, or the outer surface of the protective tube 5550.

The photocatalyst layer 5570 may be formed on all regions where UV light emitted from the UV LEDs 5520 reaches and water contacts.

The photocatalyst layer 5570 may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, $CdS$, $ZnSCdSe$, $GaP$, $CdTe$, $MoSe_2$, and $WSe_2$.

The sealing cover 5580 is fastened to one end of the housing, which receives the support members 5510, the UV LEDs 5520, the first and second fastening members 5530, 5540 and the protective tube 5550, thereby securing the components within the housing 5560.

The sealing cover 5580 may have a second vent-hole 5582 formed at a central portion thereof. The second vent-hole 5582 is connected to the first vent-hole 5536 to serve as a pathway for introducing external air into the empty space or the heat sink (not shown) within the support members 5510 to discharge heat of the support members 5510, specifically, heat transferred from the UV LEDs 5520 by heat conduction.

Although not shown in the drawings, the sealing cover 5580 may be provided on the inner surface thereof with an internal thread corresponding to the external thread (not shown) of the housing 5560, whereby the sealing cover 580 can be easily fastened to the housing 5560.

As described above, the portable water purification system 5500 using UV LEDs according to the embodiment of the invention may include the plural support members 5510, the plural UV LEDs 5520, the first and second fastening members 5530, 5540, the protective tube 5550, the housing 5560, the photocatalyst layer 5570, and the sealing cover 5580. Water is introduced into the housing 5560 through the inlet 5562 and flows within the housing 5560. At this time, the flow path and rate of the water are controlled by the helical groove 5566 formed on the inner surface of the housing 5560. Germs or protozoa in the water are sterilized by reaction of UV light emitted from the UV LEDs 5520 with the photocatalyst layer 5570 formed on the surface of the helical groove 5566 or the inner surface of the housing 5560. The sterilized water is drained from the housing 5560 through the outlet 5564.

FIG. 34 is a diagram of a water purification system using UV LEDs according to yet another embodiment of the present invention.

Referring to FIG. 34, a water purification system 6000 using UV LEDs according to one embodiment of the invention may include a water purification filter unit 6100, a pure water storage tank 6200, a hot water storage tank 6300, and a cold water storage tank 6400.

The water purification system 6000 using UV LEDs according to the embodiment of the invention may further include a sterilizer.

The sterilizer may include one or more filters described with reference to FIGS. 14 to 22.

That is, as shown in FIG. 34, the sterilizer may include a sterilizing filter 6500 disposed between the water purification filter unit 6100 and the pure water storage tank 6200. Although the sterilizing filter 6500 is illustrated as being disposed between the water purification filter unit 6100 and the pure water storage tank 6200 in FIG. 34, the sterilizing filter 6500 may be disposed between filters 61110, 6120, 6130, 6140 of the water purification filter unit 6100. Alternatively, the sterilizing filter 6500 may be disposed between the pure water storage tank 6200 and the hot water storage tank 6300 or the cold water storage tank 6400. Alternatively, the sterilizing filter 6500 may also be disposed between the pure water storage tank 6200 and a pure water stopcock 6210, between the hot water storage tank 6300 and a hot water stopcock 310, or between the cold water storage tank 6400 and a cold water stopcock 6410.

In addition, the sterilizer may be formed by fitting one of sterilization units 7100, 7200, which will be described with reference to FIGS. 35 and 36, into one or more of the pure water storage tank 6200, the hot water storage tank 6300, and the cold water storage tank 6400.

Further, the sterilizer may be formed by fitting one of sterilization units 7300, 7400, 7500, 7600, 7700, which will be described with reference to FIGS. 37 and 47, into one or more of the pure water stopcock 6210, the hot water stopcock 6310, and the cold water stopcock 6410.

The sterilizer may one of the sterilizing filter 6500 and the sterilization units 7100, 7200, 700, 7400, 7500, 7600, 7700. Since the sterilizing filter 6500 has been described with reference to FIGS. 14 to 22 and the sterilization units 7100, 7200, 700, 7400, 7500, 7600, 7700 will be described with reference to FIGS. 35 to 47, detailed descriptions thereof are omitted.

The water purification filter unit 6100 may be connected to a water source, for example, a water pipe, and may purify water supplied from the water source.

The water purification filter unit 6100 may include a sediment filter 6110, a carbon pre-filter 6120, a membrane filter 6130, and a carbon post-filter 6140. The water purification filter unit 6100 may include an ultra-filtration (UF) filter instead of the membrane filter 6130.

The water purification filter unit 6100 is not limited thereto and may be changed freely.

The pure water storage tank 6200 may be a tank that stores water purified in the water purification filter unit 6100.

The pure water storage tank 6200 may include one of the sterilization units 7100, 7200 which will be described with reference to FIGS. 35 and 36.

The pure water storage tank 6200 may be connected to the pure water stopcock 6210 exposed to the outside.

The hot water storage tank 6300 may be a tank that heats and stores water supplied from the pure water storage tank 6200.

The hot water storage tank 6300 may include one of the sterilization units 7100, 7200 which will be described with reference to FIGS. 35 and 36.

The hot water storage tank 6300 may include a heater (not shown) applied to typical water purifiers.

The hot water storage tank 6300 may be connected to the hot water stopcock 6310 exposed to the outside.

The cold water storage tank 6400 may be a tank that cools and stores water supplied from the pure water storage tank 6200.

The cold water storage tank 6400 may include one of the sterilization units 7100, 7200 which will be described with reference to FIGS. 35 and 36.

The cold water storage tank 6400 may include a cooler (not shown) applied to typical water purifiers.

The cold water storage tank 6400 may be connected to the cold water stopcock 6410 exposed to the outside.

The pure water stopcock 6210, the hot water stopcock 6310, and the cold water stopcock 6410 may include one of the sterilization units 7300, 7400 which will be described with reference to FIGS. 37 and 38.

Although not shown in FIG. 34, the water purification system 600 using UV LEDs according to the embodiment of the invention may further include a pump (not shown) that compresses water, and the pure water storage tank 6200, the hot water storage tank 6300 or the cold water storage tank 6400 may further include a sensor that measures a level of water stored therein, or a sensor that measures temperature of water stored therein.

Although not shown in FIG. 34, the water purification system 6000 using UV LEDs according to the embodiment of the invention may further include a controller (not shown), a power source (not shown), a manipulation unit (not shown), and a display unit (not shown) or output unit (not shown). The controller (not shown) is electrically connected to the components of the water purification system 6000 and electrically controls the components. The power source (not shown) is connected to the controller and supplies electric power. The manipulation unit (not shown) is connected to the controller and receives user input signals. The display unit (not shown) is connected to the controller and displays text, image, and video signals, output from the controller. The output unit (not shown) is connected to the controller and outputs voice or sound signals, output from the controller.

FIG. 35 is a sectional view showing one example of the storage tanks of the water purification system using the LEDs shown in FIG. 34.

Referring to FIG. 35, a sterilization unit 7100 according to the present invention may be fitted into the storage tanks 6200, 6300, 6400.

Each of the storage tanks 6200, 6300, 6400 may include a tank body 7110 and a tank cover 7120.

The sterilization unit 7100 may include a plurality of UV LEDs 7130, a protective cover 7140, and a photocatalyst layer 7150.

The tank body 7110 may have a storage space therein, and the storage space may be used to store purified water, hot water or cold water.

The tank cover 7120 is disposed on the tank body 7110 and covers the storage space of the tank body 7110 to protect the storage space from external environments.

The UV LEDs 7130 may be two-dimensionally arranged on an inner surface of the tank cover 7120. That is, although not specifically shown in FIG. 35, the tank cover 7120 may have a circular inner surface, and the UV LEDs 7130 may be arranged in two dimensions, preferably in a circular shape on the inner surface of the tank cover 7120.

Although not shown in FIG. 35, the UV LEDs 7130 may be mounted on a PCB (not shown). The PCB (not shown) may include an electric circuit that electrically connects the UV LEDs 7130 in series or parallel, and an electrical circuit or interconnection wires that electrically connect the UV LEDs 7130 to the controller (not shown).

The UV LEDs 7130 may emit UV light. The UV LEDs 7130 may include LEDs emitting UV light in the same or various wavelength bands. The UV LEDs 7130 may include LEDs emitting UV light in a wavelength band of 200 nm to 400 nm.

The protective cover 7140 may be provided to protect the UV LEDs 7130, namely, to seal the UV LEDs 4350 from water.

The protective cover 7140 may be formed of a light-transmitting material, for example, quartz, capable of transmitting UV light emitted from the UV LEDs 7130.

The protective cover 7140 may also be formed of other materials having the aforementioned functions including the sealing function and the UV light transmission function.

Although not shown in FIG. 35, the protective cover 7140 may be configured to cover a recess (not shown) which is formed on one surface of the tank cover 7120 to accommodate the UV LEDs 7130 therein. That is, the protective cover 4170 may be provided in the form of a flat plate coplanar with the inner surface of the tank cover 7120 which has no recess (not shown) thereon.

The protective cover 7140 may be omitted. For example, the protective cover 7140 may be omitted from a structure in which the UV LEDs 7130 are sealed by packaging using a material, for example, quartz, having the sealing function and the UV light transmission function in fabrication of the UV LEDs 7130. In addition, the protective cover 7140 may be omitted by individually or collectively coating and sealing the UV LEDs 7130.

The photocatalyst layer 7150 may be formed on an inner surface of the tank body 7110.

The photocatalyst layer 7150 may be formed on the overall inner surface of the tank body 7110, on a region of the tank body 7110 that receives UV light emitted from the UV LEDs 7130, or on a region of the tank body 7110 that is submerged when purified water, hot water or cold water is stored to a maximum level in the tank body 7110.

The photocatalyst layer 7150 may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, $CdS$, $ZnSCdSe$, $GaP$, $CdTe$, $MoSe_2$, or $WSe_2$.

As described above, the sterilization unit 7100 according to the present invention includes the plural UV LEDs 7130, the protective cover 140, and the photocatalyst layer 7150. The sterilization unit 7100 is mounted on the inner surface of the tank body 7110 of the storage tanks 6200, 6300 and 6400, or on the inner surface of the tank cover 7120 to sterilize purified water, hot water or cold water stored in the storage space of the tank body 7110 by reaction of the photocatalyst layer 7150 with UV light emitted from the UV LEDs 7130.

FIG. 36 is a sectional view showing another example of the storage tanks of the water purification system using the LEDs shown in FIG. 34.

Referring to FIG. 36, a sterilization unit 7200 according to the present invention may be fitted into the storage tanks 6200, 6300 and 6400.

Each of the storage tanks 6200, 6300 and 6400 may include a tank body 7210 and a tank cover 7220.

The sterilization unit 7200 may include an inner tank 7230, a plurality of UV LEDs 7240, and a protective cover 7250.

The tank body 7210 may have an empty space therein.

The tank cover 7220 is disposed on the tank body 7110 and may cover the empty space within the tank body 7110 to protect the empty space from external environments. That is, the tank cover 7220 may cover a storage space of the inner tank 7230 to protect the storage space from external environments.

The inner tank 7230 may be disposed within the empty space of the tank body 7210 and may have the storage space therein. The storage space may be used to store purified water, hot water or cold water.

The inner tank 7230 may be separated by a predetermined distance from an inner surface of the tank body 7210. The UV LEDs 7240 may be arranged in a space between the tank body 7210 and the inner tank 7230.

The inner tank 7230 may be formed of a light-transmitting material, for example, quartz, capable of transmitting UV light emitted from the UV LEDs 7240.

The inner tank 7230 may also be formed of other materials having an UV light transmission function.

The inner tank 7230 may be omitted. For example, the inner tank 7230 may be omitted from a structure in which the UV LEDs 7240 are sealed by packaging using a material, for example, quartz, having the sealing function and the UV light transmission function in fabrication of the UV LEDs 7240. In addition, the inner tank 7230 may be omitted by individually or collectively coating and sealing the UV LEDs 7240.

The UV LEDs 7240 may be disposed between the tank body 7120 and the inner tank 7230. Specifically, the UV LEDs 7240 may be two-dimensionally arranged on the inner surface of the tank body 7120.

Although not shown in FIG. 36, the UV LEDs 7240 may be mounted on a PCB (not shown). The PCB (not shown) may include an electric circuit that electrically connects the UV LEDs 7240 in series or parallel, and an electrical circuit or interconnection wires that electrically connect the UV LEDs 7240 to the controller (not shown).

The UV LEDs 7240 may emit UV light. The UV LEDs 7240 may include LEDs emitting UV light in the same or various wavelength bands. The UV LEDs 7240 may include LEDs emitting UV light in a wavelength band of 200 nm to 400 nm.

The photocatalyst layer 7250 may be formed on an inner surface of the inner tank 7230.

The photocatalyst layer 7250 may be formed on the overall inner surface of the inner tank 7230, on a region of the inner tank 7230 that receives UV light emitted from the UV LEDs 7240, or on a region of the inner tank 7230 that is submerged when purified water, hot water or cold water is stored to a maximum level in the inner tank 7230.

The photocatalyst layer 7250 may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, $CdS$, $ZnSCdSe$, $GaP$, $CdTe$, $MoSe_2$, or $WSe_2$ As described above, the sterilization unit 7200 according to the present invention includes the inner tank 7230, the plural UV LEDs 7240, and the photocatalyst layer 7250. The inner tank 7230 is disposed within the tank body 7210 of the storage tanks 6200, 6300 and 6400 and the UV LEDs 7240 are mounted on the inner surface of the tank body 7210. The photocatalyst layer 7250 is formed on the inner surface of the inner tank 7230 to sterilize purified water, hot water or cold water stored in the storage space of the inner tank 7230 through reaction with UV light emitted from the UV LEDs 7240.

FIG. 37 is a sectional view showing one example of the stopcocks of the water purification system using UV LEDs shown in FIG. 34.

Referring to FIG. 37, a sterilization unit 7300 according to the present invention may be fitted into the stopcocks 6210, 6310 and 6410.

Each of the stopcocks 6210, 6310 and 6410 may include a stopcock body 7311, a stopcock inflow pipe 7312, a stopcock outlet 7313, a safety button 7314, and a water dispensing lever 7315.

The sterilization unit 7300 may include a support member 7320, a plurality of UV LEDs 7330, a protective tube 7340, a plurality of discs 7350, and a photocatalyst layer 7360.

The stopcock body 7311 is connected to the stopcock inflow pipe 7312, the stopcock outlet 7313, the safety button 7314, and the water dispensing lever 7315.

In addition, the stopcock body 7311 may serve to support the stopcock inflow pipe 7312, the stopcock outlet 7313, the safety button 7314, and the water dispensing lever 7315.

The stopcock inflow pipe 7312 may be part of pipes that connect the stopcocks 6210, 6310 and 6410 to the storage tanks 6200, 6300 and 6400 and may be a passage through which purified water, hot water or cold water is introduced into the stopcocks 6210, 6310 and 6410.

The stopcock inflow pipe 7312 may be provided with the sterilization unit 7300. That is, as shown in FIG. 37, the sterilization unit 7300 including the support member 7320, the plural UV LEDs 7330, the protective tube 7340, the plural discs 7350, and the photocatalyst layer 7360 may be inserted into the stopcock inflow pipe 7312.

The support member 7320, the plural UV LEDs 7330, the protective tube 7340, the plural discs 7350, and the photocatalyst layer 7360 of the sterilization unit 7300 are illustrated above and detailed descriptions thereof are omitted.

The stopcock outlet 7313 is connected to the stopcock body 7311 and serves to drain purified water, hot water or cold water introduced into the stopcock body 7311 through the stopcock inflow pipe 7312.

The safety button 7314 is connected to the stopcock body 7311.

The safety button 7314 may serve to prevent safety accidents. That is, the safety button 7314 may permit the water dispensing lever 7315 to operate normally only when the safety button 7414 is operated.

The safety button 7314 may be omitted, as needed.

The water dispensing lever 7315 is connected to the stopcock body 7311 and may serve to control discharge of purified water, hot water or cold water from the stopcock body 7311 through the stopcock outlet 7313.

As described above, the sterilization unit 7300 according to the present invention includes the support member 7320, the plural UV LEDs 7330, the protective tube 7340, the plural discs 7350, and the photocatalyst layer 7360. The sterilization unit 7300 is inserted into the stopcocks 6210, 6310 and 6410 including the stopcock body 7311, the stopcock inflow pipe 7312, the stopcock outlet 7313, the safety button 7314, and the water dispensing lever 7315, specifically, into the stopcock inflow pipe 7312. With this configuration, the sterilization unit 7300 sterilizes purified water, hot water or cold water introduced into the stopcocks 6210, 6310 and 6410 by reaction of the photocatalyst layer 7360 with UV light emitted from the UV LEDs 7330.

FIG. 38 is a sectional view showing another example of the stopcocks of the water purification system using UV LEDs shown in FIG. 34.

Referring to FIG. 38, a sterilization unit 7400 according to the present invention may be fitted into the stopcocks 6210, 6310 and 6410.

Each of the stopcocks 6210, 6310 and 6410 may include a stopcock body 7411, a stopcock inflow pipe 7412, a stopcock outlet 7413, a safety button 7414, and a water dispensing lever 7415.

The sterilization unit 7400 may include a support member 7420, a spiral blade 7430, a plurality of UV LEDs 7440, a protective cover 7450, a photocatalyst layer 7460, and a drive unit 7470.

The stopcock body 7411 is connected to the stopcock inflow pipe 7412, the stopcock outlet 7413, the safety button 7414, and the water dispensing lever 7415.

In addition, the stopcock body 7411 may serve to support the stopcock inflow pipe 7412, the stopcock outlet 7413, the safety button 7414, and the water dispensing lever 7415.

The stopcock inflow pipe 7412 may be a part of pipes that connect the stopcocks 6210, 6310, and 6410 to the storage tanks 6200, 6300, and 6400 and may be a passage through which purified water, hot water or cold water is introduced into the stopcocks 6210, 6310, and 6410.

The stopcock inflow pipe 7412 may be provided with the sterilization unit 7400. That is, as shown in FIG. 38, the sterilization unit 7400 including the support member 7420, the spiral blade 7430, the plural UV LEDs 7440, the protective cover 7450, the photocatalyst layer 7460, and the drive unit 7470 may be inserted into the stopcock inflow pipe 7412. The drive unit 7470 may be omitted, as needed.

The support member 7420, the spiral blade 7430, the plural UV LEDs 7440, the protective cover 7450, the photocatalyst layer 7460, and the drive unit 7470 of the sterilization unit 7400 have the same configuration as those of the sterilizing filter 6500 and detailed descriptions thereof are omitted.

The stopcock outlet 7413 is connected to the stopcock body 7411 and serves to drain purified water, hot water or cold water introduced into the stopcock body 7411 through the stopcock inflow pipe 7412.

The safety button 7414 is connected to the stopcock body 7411.

The safety button 7414 may serve to prevent safety accidents. That is, the safety button 7414 may permit the water dispensing lever 7414 to operate normally only when the safety button 7414 is operated.

The safety button 7414 may be omitted, as needed.

The water dispensing lever 7415 is connected to the stopcock body 7411 and may serve to control discharge of purified water, hot water or cold water from the stopcock body 7411 through the stopcock outlet 7413.

As described above, the sterilization unit 7400 according to the present invention includes the support member 7420, the spiral blade 7430, the plural UV LEDs 7440, the protective cover 7450, the photocatalyst layer 7460, and the drive unit 7470. The sterilization unit 7400 is inserted into the stopcocks 6210, 6310, and 6410 including the stopcock body 7411, the stopcock inflow pipe 7412, the stopcock outlet 7413, the safety button 7414, and the water dispensing lever 7415, specifically, into the stopcock inflow pipe 7412. With this configuration, the sterilization unit 7440 sterilizes purified water, hot water or cold water introduced into the stopcocks 6210, 6310, and 6410 by reaction of the photocatalyst layer 7460 with UV light emitted from the UV LEDs 7440.

FIGS. 39 and 40 are sectional views showing a further another example of stopcocks of the water purification system using UV LEDs shown in FIG. 34. FIG. 40 is a sectional view taken along line E-E' shown in FIG. 39.

Referring to FIGS. 39 and 40, a sterilization unit 7500 according to the present invention may be fitted into the stopcocks 6210, 6310, and 6410.

Each of the stopcocks 6210, 6310, and 6410 may include a stopcock body 7511, a stopcock inflow pipe 7512, a stopcock outlet 7513, a safety button 7514, and a water dispensing lever 7515.

The sterilization unit 7500 may include a support member 7520, a plurality of UV LEDs 7530, and a protective cover 7540.

The support member 7520 serves to support the plurality of UV LEDs 7530.

The support member 7520 may have the UV LEDs 7530 mounted on one surface of the support member 7520.

The support member 7520 may be a PCB, a ceramic substrate, or the like.

The UV LEDs 7530 may emit UV light. The UV LEDs 7530 may include LEDs emitting UV light in the same or various wavelength bands. The UV LEDs 7530 may include LEDs emitting UV light in a wavelength band of 200 nm to 400 nm.

The protective cover 7540 seals the interior components including the UV LEDs 7530 from the outside, particularly, to prevent water flowing into the stopcock inflow pipe 7512 from contacting the UV LEDs 7530.

The protective cover 7540 may be formed of quartz capable of transmitting UV light emitted from the UV LEDs 7530. The protective cover 7540 may also be formed of other materials having the aforementioned functions including the sealing function and the UV light transmission function.

The protective cover 7540 may be omitted. For example, the protective cover 7540 may be omitted from a structure in which the UV LEDs 7530 are sealed by packaging using a material, for example, quartz, having the sealing function and the UV light transmission function in fabrication of the UV LEDs 7530. In addition, the protective cover 7540 may be omitted by individually or collectively coating and sealing the UV LEDs 7530.

The UV LEDs 7530 serve to sterilize water introduced into the stopcock inflow pipe 7512. In order to enhance sterilization effects, a photocatalyst layer (not shown) may be formed on an outer surface of the protective cover 7540, or an inner surface of the stopcock inflow pipe 7512. The photocatalyst layer (not shown) may be formed on all regions where UV light emitted from the UV LEDs 7530 reaches and water contacts.

The photocatalyst layer (not shown) may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, CdS, ZnSCdSe, GaP, CdTe, $MoSe_2$, or $WSe_2$.

The stopcock body 7511 is connected to the stopcock inflow pipe 7512, the stopcock outlet 7513, the safety button 7514, and the water dispensing lever 7515.

In addition, the stopcock body 7511 may serve to support the stopcock inflow pipe 7512, the stopcock outlet 7513, the safety button 7514, and the water dispensing lever 7515.

The stopcock inflow pipe 7512 may be a part of pipes that connect the stopcocks 6210, 6310, and 6410 to the storage tanks 6200, 6300, and 6400 and may be a passage through which purified water, hot water or cold water is introduced into the stopcocks 6210, 6310, and 6410.

The sterilization unit 7500 may be mounted on an inner surface of the stopcock inflow pipe 7512. As shown in FIGS. 39 and 40, at a portion of the stopcock inflow pipe 7512, a mounting recess 7516 may be provided.

Since the stopcock inflow pipe 7512 has a circular cross-section, the sterilization unit 7500 is difficult to mount to the stopcock inflow pipe 7512. For this reason, the stopcock inflow pipe 7512 may have the mounting recess 7516. When a rear surface of the sterilization unit 7500, namely, a surface contacting the stopcock inflow pipe 7512 is convex, the mounting recess 7516 may be omitted.

The stopcock outlet 7513 is connected to the stopcock body 7511 and serves to drain purified water, hot water or cold water introduced into the stopcock body 7511 through the stopcock inflow pipe 7512.

The safety button 7514 is connected to the stopcock body 7511.

The safety button 7514 may serve to prevent safety accidents. That is, the safety button 7514 may permit the water dispensing lever 7514 to operate normally only when the safety button 7515 is operated.

The safety button 7514 may be omitted, as needed.

The water dispensing lever 7515 is connected to the stopcock body 7511 and may serve to control discharge of purified water, hot water or cold water from the stopcock body 7511 through the stopcock outlet 7513.

As described above, the sterilization unit 7500 according to the present invention includes the support member 7520, the plural UV LEDs 7530, and the protective cover 7540. The sterilization unit 7500 is inserted into the stopcocks 6210, 6310, and 6410 including the stopcock body 7511, the stopcock inflow pipe 7512, the stopcock outlet 7513, the safety button 7514, and the water dispensing lever 7515, specifically, into the stopcock inflow pipe 7512. With this configuration, the sterilization unit 7500 sterilizes purified water, hot water or cold water introduced into or remaining in the stopcocks 6210, 6310, and 6410 using UV light emitted from the UV LEDs 7560.

FIGS. 41 and 42 are sectional views showing yet another example of the stopcocks of the water purification system using UV LEDs shown in FIG. 34. FIG. 42 is a sectional view taken along line F-F' shown in FIG. 41.

Referring to FIGS. 41 and 42, a sterilization unit 7600 according to the present invention may be fitted into stopcocks 6210, 6310, and 6410.

Each of the stopcocks 6210, 6310, 6410 may include a stopcock body 7611, a stopcock inflow pipe 7612, a stopcock outlet 7613, a safety button 7614, and a water dispensing lever 7615.

The sterilization unit 7600 may include a support member 7620, a plurality of UV LEDs 7630, a protective cover 7640, and a fastening cap 7650.

The support member 7620 serves to support the plurality of UV LEDs 7630.

The support member 7620 may have a cylindrical or prismatic shape.

The support member 7620 is not limited to the prismatic shape. Alternatively, the support member 7620 may have a structure in which at least two plates are stacked one above another.

UV LEDs 7630 may be provided on a cylindrical surface or prism surface of the support member 7620.

The support member 7620 may have a triangular prismatic shape having a triangular cross-section or a poly-prismatic shape having a polygonal cross-section. The support member 7620 may be formed by coupling three PCBs in a triangular prismatic shape. In addition, the support member 7620 may be formed by filling a space among three PCBs with a heat sink (not shown) having a triangular prismatic shape, or by respectively attaching three PCBs to three surfaces of a heat sink (not shown) having a triangular prismatic shape.

The UV LEDs 7630 may emit UV light. The UV LEDs 7630 may include LEDs emitting UV light in the same or various wavelength bands. The UV LEDs 7630 may include LEDs emitting UV light in a wavelength band of 200 nm to 400 nm.

The protective cover 7640 seals the interior components including the UV LEDs 7630 from the outside, particularly, to prevent water flowing into the stopcock inflow pipe 7612 from contacting the UV LEDs 7630.

The protective cover 7640 may be formed of quartz capable of transmitting UV light emitted from the UV LEDs 7630. The protective cover 7640 may also be formed of other materials having the aforementioned functions including the sealing function and the UV light transmission function.

The protective cover 7640 may be omitted. For example, the protective cover 7640 may be omitted from a structure in which the UV LEDs 7630 are sealed by packaging using a material, for example, quartz, having the sealing function and the UV light transmission function in fabrication of the UV LEDs 7630. In addition, the protective cover 7640 may be omitted by individually or collectively coating and sealing the UV LEDs 7630.

The fastening cap 7650 is fastened to the support member 7620 and the protective cover 7640 and serves to support the support member 7620 and the protective cover 7640 while sealing the protective cover 7640.

Although not shown in FIGS. 41 and 42, the fastening cap 7650 may be connected to interconnection wires (not shown) for transferring electric power or control signals to the UV LEDs 7630.

The UV LEDs 7630 serve to sterilize water introduced into the stopcock inflow pipe 7612. In order to enhance sterilization effects, a photocatalyst layer (not shown) may be formed on an outer surface of the protective cover 7640, or an inner surface of the stopcock inflow pipe 7612. The photocatalyst layer (not shown) may be formed on all regions where UV light emitted from the UV LEDs 7630 reaches and water contacts.

The photocatalyst layer (not shown) may be formed of at least one of $TiO_2$, ZnO, $Nb_2O_5$, $SnO_2$, $ZrO_2$, SrTiO3, $KTaO_3$, $N_1$-$K_4Nb_6O_{17}$, CdS, ZnSCdSe, GaP, CdTe, $MoSe_2$, or $WSe_2$.

The stopcock body 7611 is connected to the stopcock inflow pipe 7612, the stopcock outlet 7613, the safety button 7614, and the water dispensing lever 7615.

In addition, the stopcock body 7611 may serve to support the stopcock inflow pipe 7612, the stopcock outlet 7613, the safety button 7614, and the water dispensing lever 7615.

The stopcock inflow pipe 7612 may be part of pipes that connect the stopcocks 6210, 6310, and 6410 to the storage tanks 6200, 6300, and 6400 and may be a passage through which purified water, hot water or cold water is introduced into the stopcocks 6210, 6310, and 6410.

The stopcock inflow pipe 7612 may be provided with the sterilization unit 7600 penetrating a predetermined region of the stopcock inflow pipe 7612. In this case, the sterilization unit 7600 may include a mounting seal 7616 at a portion of the stopcock inflow pipe 7612.

The mounting seal 7616 serves to protect the sterilization unit 7600 penetrating the predetermined region of the stopcock inflow pipe 7612, and is detachable from the stopcock inflow pipe 7612 such that the sterilization unit 7600 can be separated from the stopcock inflow pipe 7612.

The stopcock outlet 7613 is connected to the stopcock body 7611 and serves to drain purified water, hot water or cold water introduced into the stopcock body 7611 through the stopcock inflow pipe 7612.

The safety button 7614 is connected to the stopcock body 7611.

The safety button 7614 may serve to prevent safety accidents. That is, the safety button 7614 may permit the water dispensing lever 7615 to operate normally only when the safety button 7614 is operated.

The safety button 7614 may be omitted, as needed.

The water dispensing lever 7615 is connected to the stopcock body 7611 and may serve to control discharge of purified water, hot water or cold water from the stopcock body 7611 through the stopcock outlet 7613.

As described above, the sterilization unit 7600 according to the present invention includes the support member 7620, the plural UV LEDs 7630, the protective cover 7640, and the fastening cap 7650. The sterilization unit 7600 penetrates the interior of the stopcocks 6210, 6310, and 6410, each of which includes the stopcock body 7611, the stopcock inflow pipe 7613, the stopcock outlet 7614, the safety button 7615 and the water dispensing lever 7612, specifically, a predetermined region of the stopcock inflow pipe 7612. With this configuration, the sterilization unit 7600 sterilizes purified water, hot water or cold water introduced into or remaining in the stopcocks 6210, 6310, and 6410 using UV light emitted from the UV LEDs 7630.

FIGS. 43 and 44 are sectional views showing yet another example of the stopcocks of the water purification system using UV LEDs shown in FIG. 34. FIG. 44 is a sectional view taken along line G-G' shown in FIG. 43.

Referring to FIGS. 43 and 44, sterilization units 7700 according to the present invention may be fitted into each of the stopcocks 6210, 6310, and 6410.

Each of the stopcocks 6210, 6310, and 6410 may include a stopcock body 7711, a stopcock inflow pipe 7712, a stopcock outlet 7713, a safety button 7714, and a water dispensing lever 7715.

Each of the sterilization units 7700 may include a support member 7720, a plurality of UV LEDs 7730, and a protective member 7740.

The support member 7720 serves to support the plurality of UV LEDs 7730.

The UV LEDs 7730 may be mounted on one surface of the support member 7720.

The support member 7720 may be a PCB, a ceramic substrate, or the like.

The UV LEDs 7730 may emit UV light. The UV LEDs 7730 may include LEDs emitting UV light in the same or various wavelength bands. The UV LEDs 7730 may include LEDs emitting UV light in a wavelength band of 200 nm to 400 nm.

The protective member 7740 covers the UV LEDs 7730 and the support member 7720, and seals the internal components from the outside, particularly, to prevent water flowing into the stopcock inflow pipe 7712 from contacting the UV LEDs 7730.

The protective member 7740 may be formed of quartz capable of transmitting UV light emitted from the UV LEDs 7730. The protective member 7740 may also be formed of other materials having the aforementioned functions including the sealing function and the UV light transmission function.

The protective member 7740 may be omitted. For example, the protective member 7740 may be omitted from a structure in which the UV LEDs 7730 are sealed by packaging using a material, for example, quartz, having the sealing function and the UV light transmission function in fabrication of the UV LEDs 7730, or mounting the UV LEDs 7730 on the support member 7720. In addition, the protective member 7740 may be omitted by individually or collectively coating and sealing the UV LEDs 7730 and the support member 7720.

In FIG. 44, four sterilization units 7700 are disposed within the stopcock inflow pipe 7712 such that a space surrounded by the sterilization units 7700, namely, a water flow space has a rectangular cross-section. However, three or more sterilization units 7700 may be provided to form a water flow space with a triangular or polygonal cross-section.

Although the protective members 7740 of the sterilization units 7700 are illustrated as being separated from each other in FIG. 44, the protective members 7740 within the stopcock inflow pipe 7712 may also be integrally formed with each other.

In addition, although the sterilization unit 7700, specifically, the protective member 7740, is illustrated as having a flat rear surface in FIGS. 43 and 44, the protective member 7740 may have a convex rear surface to correspond to the inner wall of the stopcock intake tube 7712, whereby the sterilization unit 7700 closely contacts the inner wall of the stopcock inflow pipe 7712.

The UV LEDs 7730 serve to sterilize water introduced into the stopcock inflow pipe 7712. In order to enhance sterilization effects, a photocatalyst layer (not shown) may be formed on an outer surface of the protective member 7740. The photocatalyst layer (not shown) may be formed on all regions where UV light emitted from the UV LEDs 7730 reaches and water contacts.

The photocatalyst layer (not shown) may be formed of at least one of $TiO_2$, $ZnO$, $Nb_2O_5$, $SnO_2$, $ZrO_2$, $SrTiO_3$, $KTaO_3$, $N_1$-$K_4Nb_6O_{17}$, $CdS$, $ZnSCdSe$, $GaP$, $CdTe$, $MoSe_2$, or $WSe_2$.

The stopcock body 7711 is connected to the stopcock inflow pipe 7712, the stopcock outlet 7713, the safety button 7714, and the water dispensing lever 7715.

In addition, the stopcock body 7711 may serve to support the stopcock inflow pipe 7712, the stopcock outlet 7713, the safety button 7714, and the water dispensing lever 7715.

The stopcock inflow pipe 7712 may be part of pipes that connect the stopcocks 6210, 6310, and 6410 to the storage tanks 6200, 6300, and 6400 and may be a passage through which purified water, hot water or cold water is introduced into the stopcocks 6210, 6310, and 6410.

The stopcock inflow pipe 7712 may be equipped in a predetermined internal region with the sterilization units 7700.

The stopcock outlet 7713 is connected to the stopcock body 7711 and serves to drain purified water, hot water or cold water introduced into the stopcock body 7711 through the stopcock inflow pipe 7712.

The safety button 7714 is connected to the stopcock body 7711.

The safety button 7714 may serve to prevent safety accidents. That is, the safety button 7714 may permit the water dispensing lever 7715 to operate normally only when the safety button 7714 is operated.

The safety button 7714 may be omitted, as needed.

The water dispensing lever 7715 is connected to the stopcock body 7711 and may serve to control discharge of purified water, hot water or cold water from the stopcock body 7711 through the stopcock outlet 7713.

As described above, each of the sterilization units 7700 according to the present invention includes the support member 7720, the plural UV LEDs 7730, and the protective member 7740. The sterilization units 7700 are disposed within the stopcocks 6210, 6310, and 6410 including the stopcock body 7711, the stopcock inflow pipe 7712, the stopcock outlet 7713, the safety button 7714, and the water dispensing lever 7715, specifically, within the stopcock inflow pipe 7712. With this configuration, the sterilization units 7700 sterilize purified water, hot water or cold water introduced into or remaining in the stopcocks 6210, 6310, and 6410 using UV light emitted from the UV LEDs 7730.

FIG. 45 is a diagram of a water purification system using UV LEDs according to yet another embodiment of the present invention.

Referring to FIG. 45, a water purification system 6000 according to the embodiment of the invention has the same configuration as the water purification system shown in FIG. 34, except for an auxiliary cold water storage tank 6420. Therefore, detailed descriptions of the configuration except for the auxiliary cold water storage tank 6420 will be omitted.

The auxiliary cold water storage tank 6420 has a function of maintaining temperature and quantity of water within a cold water storage tank 6400 at the same level.

The auxiliary cold water storage tank 6420 may include one of the sterilization units 7100 and 7200 shown in FIGS. 35 and 36.

A sterilizing filter 6500 may be disposed between the cold water storage tank 6400 and the auxiliary cold water storage tank 6420, and between a cold water stopcock 6410 and the auxiliary cold water storage tank 6420.

FIG. 46 is a sectional view showing one example of stopcocks of the water purification system using UV LEDs according to the embodiment of the present invention, and FIG. 47 shows sectional views of the first and second sterilization units shown in FIG. 46.

Referring to FIGS. 46 and 47, first and second sterilization units 7600 and 8600 may be fitted into each of the stopcocks 6210, 6310, and 6410 according to the present invention.

Each of the stopcocks 6210, 6310, and 6410 may include a stopcock body 7611, a stopcock inflow pipe 7612, a stopcock outlet 7613, a safety button 7614, and a water dispensing lever 7615.

The stopcock inflow pipe 7612 includes a reflective layer 8612 on the inner wall of the stopcock inflow pipe 7612 for enhancing a sterilizing function by total reflection of UV light emitted from the first and second sterilization units 7600 and 8600.

The reflective layer 8612 may be formed by insert molding, press-fitting, and the like. The reflective layer 8612 may be formed of stainless steel, silver, and the like. However, the reflective layer 8612 is not limited thereto and may also be formed of any material with a high reflectivity.

The first and second sterilization units 7600 and 8600 fitted into the stopcocks 6210, 6310, and 6410 can further enhance the sterilizing function. Although each of the stopcocks 6210, 6310, and 6410 is provided with two sterilization units 7600 and 7800 in the embodiment of the invention, the present invention is not limited thereto and each stopcock may be provided with three or more sterilization units.

The first sterilization unit 7600 has the same structure as the sterilization unit shown in FIG. 41. That is, the first sterilization unit 7600 includes first support members 7620, a plurality of first UV LEDs 7630, a first protective cover 7640, and a first mounting seal 7616.

In addition, the first sterilization unit 7600 further includes a first heat sink 7670 having a rectangular prismatic shape, and the first support members 7620 are mounted on outer surfaces of the first heat sink 7670.

The first mounting seal 7616 has first exposed sections 7617 that face the first UV LEDs 7630 and are open to pass UV light.

The second sterilization unit 8600 includes second support members 8620, a plurality of second UV LEDs 8630, a second protective cover 8640, and a second mounting seal 8616.

The second sterilization unit 8600 further includes a second heat sink 8670 having a T-shaped cross-section.

The second support members 8620 may be mounted on one surface of the second heat sink 8670 and on opposite surfaces of an extension that perpendicularly extends from a central portion of the surface toward an opposite surface of the second heat sink.

The second sterilization unit 8600 emits UV light in all directions within the stopcock inflow pipe 7612. Therefore, the second sterilization unit 8600 may have fewer UV LEDs than the first sterilization unit 7600.

As described above, each of the stopcocks 6210, 6310, and 6410 is provided with at least two sterilization units 7600 and 8600 and the reflective layer 8612 is disposed on the inner wall of the stopcock inflow pipe 7612, thereby making it possible to maximize sterilization effects within the stopcocks 6210, 6310, and 6410.

Although some embodiments have been described herein, it should be understood by those skilled in the art that the present invention is not limited thereto and that various modifications, variations, and alterations can be made without departing from the spirit and scope of the present invention.

The invention claimed is:

1. A water purification system, comprising:
   a water purification filter that purifies water supplied from a water source; and
   a stopcock connected to the water purification filter through a pipe, the stopcock comprising:
      a stopcock body;
      a stopcock inflow pipe to introduce purified water to the stopcock body; and
      a stopcock outlet to drain the purified water from the stopcock body,
   wherein the stopcock inflow pipe has a first surface located over a second surface of the stopcock inflow pipe, the purified water flowing under the first surface and above the second surface, and wherein the stopcock inflow pipe includes a sterilization unit disposed inside a mounting recess of the stopcock inflow pipe and includes:
      a support member disposed in an upper part of the mounting recess and having a top surface and a mounting surface that are opposite to each other;
      a UV LED disposed on the mounting surface of the support member and configured to emit UV light; and
      a protective cover disposed in a lower part of the mounting recess to cover the UV LED and configured to operate to prevent the purified water flowing in the stopcock inflow pipe from contacting the UV LED,
   wherein the stopcock inflow pipe further includes the mounting recess disposed to mount the sterilization unit and having outwardly protruding portions disposed on side surfaces of the supporting member that are opposite to each other, each outwardly protruding portion having a shape outwardly protruding from the mounting surface of the support member,
   wherein the stopcock inflow pipe is laterally connected to the stopcock body and the stopcock outlet is configured to vertically drain the purified water from the stopcock body,
   wherein the side surfaces of the support member are in direct contact with an inner surface of the mounting recess, and
   wherein the mounting surface of the support member is disposed between the outwardly protruding portions of the mounting recess and the top surface of the support member is disposed at a same level as surfaces of the outwardly protruding portions of the mounting recess.

2. The water purification system according to claim 1, further comprising a storage tank that is connected to the water purification filter and stores the purified water, wherein the storage tank comprises: a pure water storage tank for storing the purified water from the water purification filter, a hot water storage tank for storing hot water obtained by heating the purified water from the water purification filter, a cold water storage tank for storing cold water obtained by cooling the purified water from the water purification filter, and an auxiliary cold water storage tank for controlling temperature and quantity of the cold water in the cold water storage tank.

3. The water purification system according to claim 2, further comprising: a sterilizer that sterilizes the water with at least one UV LED, wherein the sterilizer is disposed within the pure water storage tank, the hot water storage tank, or the cold water storage tank.

4. The water purification system according to claim 3, wherein the at least one UV LED is mounted on a cover of the pure water storage tank, the hot water storage tank, or the cold water storage tank.

5. The water purification system according to claim 3, wherein the sterilizer further comprises a photocatalyst layer formed on an inner surface of the pure water storage tank, the hot water storage tank, or the cold water storage tank.

6. The water purification system according to claim 1, wherein the sterilization unit further comprises an additional UV LED mounted on the support member the protective cover covering the additional UV LED.

7. The water purification system according to claim 1, wherein the sterilization unit penetrates a portion of the stopcock inflow pipe, and comprises: an additional UV LED mounted on the support member; and a fastening cap fastened to the support member and the protective cover to seal the protective cover.

8. The water purification system according to claim 1, wherein the stopcock inflow pipe has an inner space surrounded by the sterilization unit and having a polygonal cross-section, and the water flows within the inner space.

9. The water purification system according to claim 1, wherein a reflective layer formed on an inner wall of the stopcock inflow pipe.

10. The water purification system according to claim 1, wherein the protective cover seals the sterilization unit.

11. The water purification system according to claim 1, further comprising a storage tank that stores the purified water from the water purification filter and connected to the stopcock through the pipe.

12. The water purification system according to claim 1, wherein the stopcock further includes a water dispensing lever controlling a discharge of water.

13. The water purification system according to claim 12, wherein the stopcock further includes a safety button controlling an operation of the water dispensing lever.

14. The water purification system of claim 1, wherein the stopcock inflow pipe provides a passage for the purified water inside the stopcock inflow pipe and the support member is located above the passage.

15. The water purification system of claim 1, wherein the mounting recess mounts the sterilization unit such that the UV LED emit the UV light downward.

16. A water purification system provided in a stopcock,
wherein the stopcock includes a stopcock body, a stopcock inflow pipe to introduce a water to the stopcock body, and a stopcock outlet to drain the water from the stopcock body,
wherein the stopcock inflow pipe has a first surface located over a second surface of the stopcock inflow pipe, the water flowing under the first surface and above the second surface, and wherein the stopcock inflow pipe includes a sterilization unit disposed inside a mounting recess of the stopcock inflow pipe and includes:
a support member disposed in an upper part of the mounting recess and having a top surface and a mounting surface that are opposite to each other;
a UV LED disposed on the mounting surface of the support member and configured to emit UV light; and
a sealing disposed to prevent the water flowing in the stopcock inflow pipe from contacting the UV LED, and
wherein the stopcock inflow pipe further includes the mounting recess disposed to mount the sterilization unit and having outwardly protruding portions disposed on side surfaces of the supporting member that are opposite to each other, each outwardly protruding portion having a shape outwardly protruding from the mounting surface of the support member,
wherein the stopcock inflow pipe is laterally connected to the stopcock body and the stopcock outlet is configured to vertically drain the water from the stopcock body,
wherein the side surfaces of the support member are in direct contact with an inner surface of the mounting recess, and
wherein the mounting surface of the support member is disposed between the outwardly protruding portions of the mounting recess and the top surface of the support member is disposed at a same level as surfaces of the outwardly protruding portions of the mounting recess.

17. The water purification system of claim 16, wherein the stopcock inflow pipe further comprises a fastening cap fastened to the support member.

18. The water purification system of claim 16, wherein the stopcock inflow pipe further comprises an additional UV LED disposed on the support member.

19. The water purification system of claim 16, wherein the stopcock is connected to a sterilization filter.

20. The water purification system of claim 16, wherein the stopcock inflow pipe further includes a photocatalyst layer formed on an inner surface of the stopcock inflow pipe.

21. The water purification system according to claim 16, wherein the stopcock further includes a water dispensing lever controlling a discharge of the water.

22. The water purification system according to claim 21, wherein the stopcock further includes a safety button controlling an operation of the water dispensing lever.

23. A water purification system, comprising:
a water purification filter configured to provide purified water;
a storage tank connected to the water purification filter and configured to store the purified water provided from the water purification filter;
a stopcock connected to the storage tank through a pipe to introduce the purified water into the stopcock, the stopcock comprising:
a stopcock body;
a stopcock inflow pipe to introduce the purified water to the stopcock body; and
a stopcock outlet to drain the purified water from the stopcock body,
wherein the stopcock inflow pipe has a first surface on which a sterilization unit is provided and a second surface that is convex and the purified water flows under the first surface and above the second surface, and
wherein the stopcock inflow pipe is laterally connected to the stopcock body and the stopcock outlet is configured to vertically drain the purified water from the stopcock body, wherein the stopcock inflow pipe further includes a mounting recess disposed to mount the sterilization unit and having outwardly protruding portions disposed on side surfaces of a support member that are opposite to each other, each outwardly protruding portion having a shape outwardly protruding from a mounting surface of the support member,
wherein the sterilization unit is disposed inside the mounting recess of the stopcock inflow pipe and includes the support member disposed in an upper part of the mounting recess and having a top surface and the mounting surface that are opposite to each other and a UV LED disposed on the mounting surface of the support member, the mounting surface of the support member is disposed between the outwardly protruding portions of the mounting recess, and
wherein the side surfaces of the support member are in direct contact with an inner surface of the mounting recess and the top surface of the support member is disposed at a same level as surfaces of the outwardly protruding portions of the mounting recess.

* * * * *